(12) United States Patent
Takeda et al.

(10) Patent No.: US 7,505,103 B2
(45) Date of Patent: Mar. 17, 2009

(54) LIQUID CRYSTAL DISPLAY DEVICE

(75) Inventors: Arihiro Takeda, Kawasaki (JP); Yoshio Koike, Kawasaki (JP); Takahiro Sasaki, Kawasaki (JP); Kouji Tsukao, Yonago (JP); Shingo Kataoka, Kawasaki (JP); Kimiaki Nakamura, Kawasaki (JP); Yuichi Inoue, Kawasaki (JP); Kazutaka Hanaoka, Kawasaki (JP); Seiji Tanuma, Kawasaki (JP); Takatoshi Mayama, Kawasaki (JP); Hidefumi Yoshida, Kawasaki (JP); Yasutoshi Tasaka, Kawasaki (JP); Takashi Sasabayashi, Kawasaki (JP); Yohei Nakanishi, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 326 days.

(21) Appl. No.: 11/496,941

(22) Filed: Jul. 31, 2006

(65) Prior Publication Data

US 2006/0262261 A1  Nov. 23, 2006

Related U.S. Application Data

(62) Division of application No. 10/791,163, filed on Mar. 2, 2004, now Pat. No. 7,110,074, which is a division of application No. 09/662,236, filed on Sep. 14, 2000, now Pat. No. 6,927,824.

(30) Foreign Application Priority Data

| Sep. 16, 1999 | (JP) | ................... 11-262798 |
| Dec. 28, 1999 | (JP) | ................... 11-374720 |
| Jun. 18, 2000 | (JP) | ................... 2000-194170 |

(51) Int. Cl.
*G02F 1/1337* (2006.01)
*G02F 1/137* (2006.01)

(52) U.S. Cl. ........................................ 349/129; 349/128
(58) Field of Classification Search ......... 349/128–130, 349/132, 136
See application file for complete search history.

(56) References Cited

U.S. PATENT DOCUMENTS

| 6,067,141 | A | 5/2000 | Yamada et al. |
| 6,115,093 | A | 9/2000 | Murai et al. |
| 6,256,082 | B1 | 7/2001 | Suzuki et al. |
| 6,300,996 | B1 | 10/2001 | Matsuyama et al. |
| 6,369,870 | B1 | 4/2002 | Koma |
| 6,509,944 | B2 | 1/2003 | Koma et al. |

(Continued)

FOREIGN PATENT DOCUMENTS

JP  11-084414  3/1999

(Continued)

*Primary Examiner*—Jerry T Rahll
(74) *Attorney, Agent, or Firm*—Greer, Burns & Crain, Ltd.

(57) ABSTRACT

In a vertically aligned liquid crystal display device for controlling liquid crystal molecules alignment in voltage application by providing linear structures or linear slits consisting of a plurality of constituent units to at least one of a pair of substrates having an electrode thereon, there is provided alignment controlling means for forming an alignment singular point s=−1 of liquid crystal molecules at an intersecting point between the structures on the pixel electrode or the slits in the electrode and an edge of a pixel electrode on one of the substrates.

3 Claims, 54 Drawing Sheets

U.S. PATENT DOCUMENTS

| | | | |
|---|---|---|---|
| 6,512,568 | B2 | 1/2003 | Song et al. |
| 6,563,558 | B2 | 5/2003 | Koma |
| 6,661,488 | B1 | 12/2003 | Takeda et al. |
| 6,671,019 | B1 | 12/2003 | Petschek et al. |
| 6,724,452 | B1 | 4/2004 | Takeda et al. |
| 6,750,933 | B1 | 6/2004 | Yakovenko et al. |
| 6,930,740 | B2 | 8/2005 | Yoon et al. |
| 6,937,311 | B2 | 8/2005 | Song et al. |
| 7,167,224 | B1 | 1/2007 | Takeda et al. |
| 7,224,421 | B1 | 5/2007 | Takeda et al. |
| 7,227,606 | B2 | 6/2007 | Takeda et al. |
| 7,304,703 | B1 | 12/2007 | Takeda et al. |
| 2002/0015125 | A1 | 2/2002 | Kim et al. |
| 2003/0020858 | A1 | 1/2003 | Kim et al. |
| 2003/0086043 | A1 | 5/2003 | Seo et al. |

FOREIGN PATENT DOCUMENTS

| | | |
|---|---|---|
| JP | 11-249141 | 9/1999 |
| JP | 11-352489 | 12/1999 |

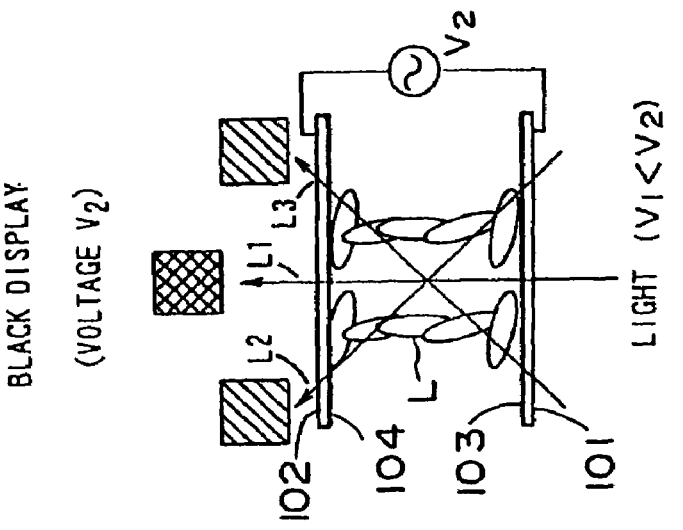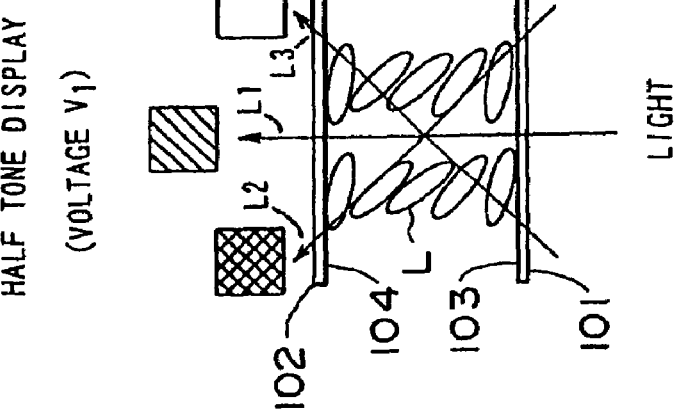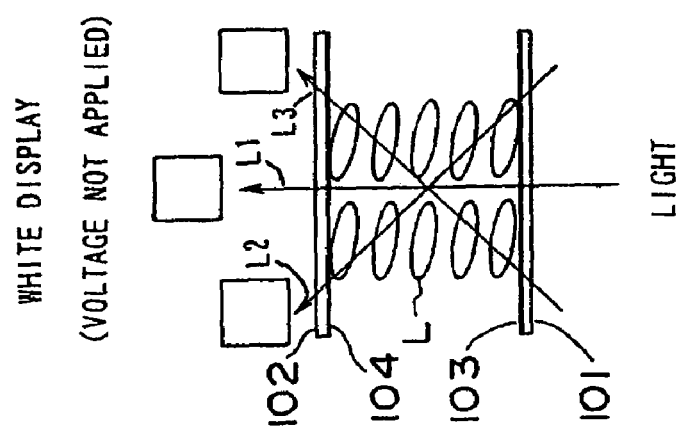

BLACK DISPLAY (VOLTAGE NOT APPLIED)

HALF TONE DISPLAY (VOLTAGE $V_1$)

WHITE DISPLAY (VOLTAGE $V_2$)
($V_1 < V_2$)

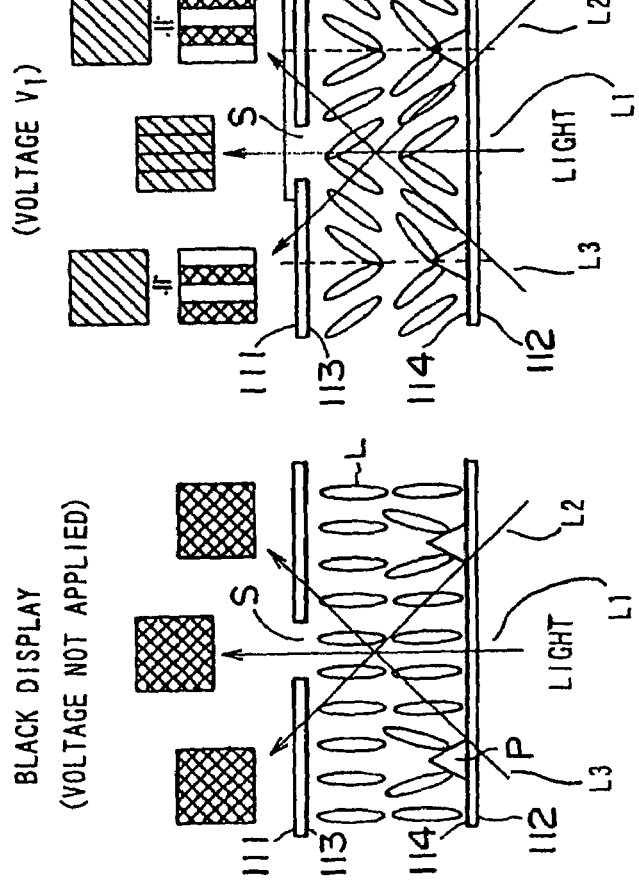

(off state)

① A tilt angle of a liquid crystal molecule is changed in response to a voltage.

② A capacitance is changed by the tone.
③ A capacitance is also changed by light irradiation.

S = −1

S = +1

ALIGNMENT OF LIQUID CRYSTAL MOLECULES
(NO POSITIONAL DISPLACEMENT)

ALIGNMENT OF LIQUID CRYSTAL MOLECULES
(POSITIONAL DISPLACEMENT)

The equipotential lines are pushed out outwardly from the liquid crystal layers.

LIQUID CRYSTAL DISPLAY DEVICE

This is a Divisional of application Ser. No. 10/791,163 filed Mar. 2, 2004 now U.S. Pat. No. 7,110,074, which is a Divisional Ser. No. 09/662,236 filed Sep. 14, 2000 of U.S. Pat. No. 6,927,824 issued Aug. 9, 2005.

BACKGROUND OF THE INVENTION

1. Field of the Invention

The present invention relates to a liquid crystal display (LCD) device and a thin film transistor substrate and, more particularly, a VA (Vertically aligned) mode liquid crystal display device and a thin film transistor substrate.

2. Description of the Prior art

The liquid crystal display device is employed in various electronic devices, e.g., is employed as not only the display of the mobile computer, but also the display of the desk-top computer, the display of the television, the projector, the personal digital assistant (PDA), etc.

The normal TN (Twisted Nematic) mode liquid crystal display device has such a structure that the liquid crystal is sealed between two transparent substrates. Out of two surfaces of these transparent substrates opposing to each other, the common electrode, the color filter, the alignment film, etc. are formed on one surface side, and the thin film transistor (TFT), the pixel electrodes, the alignment film, etc. are formed on the other surface side. Also, polarizing plates are stuck on the opposing surfaces and the opposite side surfaces of the transparent substrates respectively. These two polarizing plates are arranged such that, for example, their polarization axes can intersect perpendicularly to each other. In this case, two polarizing plates give the light display (white display) to transmit the light in the condition that the voltage is not applied between the pixel electrode and the common electrode, while they give the dark display (black display) to cut off the light in the condition that the voltage is applied. In contrast, if the polarization axes of two polarizing plates are arranged in parallel with each other, two polarizing plates give the dark display in the condition that the voltage is not applied between the pixel electrode and the common electrode, while they give the light display in the condition that the voltage is applied. In the following description, the substrate on which TFT and the pixel electrodes are formed is called the TFT substrate, while the substrate on which the color filters and the common electrode are formed is called the opposing substrate.

The TN mode liquid crystal display device has such drawbacks that the viewing angle is narrow and the resolution is not sufficient.

FIGS. 1A to 1C are views showing these drawbacks. FIG. 1A shows the state to display the white by not applying the voltage between two electrodes 101, 102, FIG. 1B shows the state to display the half tone (gray) by applying the intermediate voltage V1 between two electrodes 101, 102, and FIG. 1C shows the state to display the black by applying the predetermined voltage V2 between two electrodes 101, 102.

In FIGS. 1A to 1C, alignment films 103, 104 are formed on the opposing surfaces of two electrodes 101, 102 to differentiate their alignment directions by 90° (degrees) respectively. Also, although not shown, the polarizing plates are arranged on respective outsides of two electrodes 101, 102 in the condition that their linearly polarized directions are twisted mutually by 90 degrees. In this case, actually liquid crystal molecules L shown in FIGS. 1A to 1C are twisted in compliance with the alignment direction of the alignment films 103, 104, but they are illustrated herein not to take account of the twist, for the convenience of explanation.

Meanwhile, as shown in FIG. 1A, in the condition that the voltage is not applied, the liquid crystal molecules L are aligned in the same direction to have a very small tilt angle (about 1 degree to 5 degrees). In this state, the display looks like almost white from all directions.

Also, as shown in FIG. 1C, in the condition that the voltage V2 is applied, the liquid crystal molecules L are aligned in the perpendicular direction to the alignment films 103, 104 except the neighborhood of their surfaces. Since the incident linearly polarized light is intercepted by the plate, the display looks like the black from the outside. At this time, since the light irradiated obliquely into one electrode 101 passes obliquely to the direction of the liquid crystal molecules L aligned in the vertical direction to thus twist its polarization direction to some extent, the display looks like not the perfect black but the half tone (gray) from the outside.

In addition, as shown in FIG. 1B, in the condition that the intermediate voltage V1 lower than the state in FIG. 1C is applied, the liquid crystal molecules L positioned in vicinity of the alignment films 103, 104 are also aligned in the horizontal direction, but the liquid crystal molecules L rise obliquely in the middle area of the cell. Therefore, the double refraction (birefringence) property of the liquid crystal is lost in some degree to lower the transmittance and thus the half tone (gray) display appears. However, this is true of only the light L1 that is irradiated vertically to the liquid crystal panel. The light that is irradiated obliquely to the surface of one electrode 101 exhibits different behaviors when the display is viewed from the left and right directions in FIG. 1B.

In other words, in FIG. 1B, the direction of the liquid crystal molecules L becomes parallel with the light L2 that is directed from the lower right to the upper left. Therefore, since the liquid crystal L seldom exhibits the double refraction effect, the display looks like the black when it is viewed from the left side. On the contrary, the direction of the liquid crystal molecules L becomes perpendicular to the light L3 that is directed from the lower left to the upper right. Therefore, since the liquid crystal L exhibits greatly the double refraction effect to the incident light to twist the incident light, the display looks like a color close to the white. That is, the display intensity is changed according to the viewing angle, and this aspect is the biggest drawback of the TN mode liquid crystal display device.

For this reason, as the mode that can improve the viewing angle characteristic without reduction of the response speed, the VA (Vertically Aligned) mode using the vertical alignment films has been proposed.

FIGS. 2A to 2C are views showing the VA mode. The VA mode uses the negative type liquid crystal material and the vertical alignment films in combination.

First, as shown in FIG. 2A, when the voltage is not applied, the liquid crystal molecules L are aligned in the vertical direction to provide the black display. In the VA mode, the vertically aligning process is applied to the alignment films 103, 104.

Also, as shown in FIG. 2C, when the predetermined voltage V2 is applied between two electrodes 101, 102, the liquid crystal molecules L are aligned in the horizontal direction to provide the while display. The VA mode has the high display contrast, the quick response speed, and the visual characteristic in the white display and the black display rather than the TN mode.

In addition, as shown in FIG. 2B, when the predetermined voltage V1 smaller than that in the white display is applied between two electrodes 101, 102, the liquid crystal molecules L are aligned in the oblique direction. In this case, the light that is perpendicular to the surface of the electrode 101 is displayed as the half tone on the display panel. However, in FIG. 2B, the liquid crystal molecules L are parallel with the light L2 directed from the lower right to the upper left. Accordingly, since the liquid crystal molecules L seldom exhibits the double refraction effect, the display looks like the black if it is viewed from the left side. In contrast, the liquid crystal molecules L are vertical to the light L3 directed from the lower left to the upper right. Accordingly, since the liquid crystal molecules L exhibits greatly the double refraction effect to the incident light to twist the incident light, the display that is close to the white is given.

In this manner, since the liquid crystal molecules positioned in the neighborhood of the alignment films become substantially vertical when the voltage is not applied, the VA mode has the especially high contrast and also is excellent in the viewing angle characteristic rather than the TN mode. However, the VA mode has the problem similar to the TN mode, i.e., when the half tone display is performed in the VA mode, the display intensity is changed if the viewing angle is changed. Thus, the VA mode is still not enough in the aspect of the viewing angle characteristic.

In Patent Application Hei 10-185836, the applicant of this application discloses the configuration in which vertical alignment in the prior art is used, the liquid crystal material having the negative dielectric anisotropy, so-called negative type liquid crystal, is sealed between the electrodes, and the domain defining means for defining the liquid crystal molecules to differentiate their tilt directions in a plurality of regions in one pixel when the voltage is not applied is provided.

FIGS. 3A to 3C are views showing the visual characteristic improving principle by using alignment division. In this case, the structure is employed in which the slit S is formed in one pixel electrode 111 on the first substrate side as the domain defining means and the projection P is provided in one pixel on the electrode 112 on the second substrate side.

As shown in FIG. 3A, when the voltage is not applied, the liquid crystal molecules are aligned perpendicularly to the substrate surface. Also, as shown in FIG. 3C, when the predetermined voltage V2 is applied between the opposing electrodes 111, 112, the liquid crystal molecules are aligned in parallel with the substrate surface to provide the white display.

In addition, as shown in FIG. 3B, when the intermediate voltage V1 is applied between the opposing electrodes 111, 112, the electric field that is oblique to the substrate surface is generated due to the slit (electrode edge portion) S. Also, the liquid crystal molecules L in the neighborhood of the surface of the projection P are slightly tilted from the state when no voltage is applied. The tilt directions of the liquid crystal molecules L are decided by the influence of inclined surfaces of the projection P and the oblique electric field. Thus, the alignment directions of the liquid crystal molecules 113 are divided in the middle of the projection P and in the middle of the slit portion 111s respectively.

At this time, since the liquid crystal molecules L are slightly tilted, for example, the light L1 that is transmitted from the bottom of the substrate to the top is affected slightly by the double refraction to suppress the transmission. Thus, the half tone display of gray can be obtained. The light L2 transmitted from the lower right to the upper left is hard to transmit in the area in which the liquid crystal molecules L are tilted to the left direction, but such light L2 is very easy to transmit in the area in which the liquid crystal molecules L are tilted to the right direction. Thus, the half tone display of gray can be obtained as the average. In addition, the light L3 transmitted from the lower left to the upper right exhibits the gray display based on the similar principle. As a result, the uniform half tone display can be obtained in all directions in one pixel.

Therefore, in FIG. 3B, the good display that has the small viewing angle dependency can be obtained in all the black, half tone, and white display states.

In FIGS. 3A to 3C, the slit S is formed in one pixel electrode 111 on the first substrate side as the domain defining means, and the projection P is provided in one pixel on the electrode 112 on the second substrate side. But such structure may be accomplished by other means. Such new VA mode is referred to as the MVA (Multi-domain Vertical Alignment) mode in the following.

FIGS. 4A to 4C are views showing examples for implementing the domain defining means.

FIG. 4A shows an example in which the domain defining means is implemented only by using the electrode shapes, FIG. 4B shows an example in which shapes of the substrate surfaces are designed, and FIG. 4C shows an example in which shapes of the electrodes and the substrate surfaces are designed. Although the alignments shown in FIGS. 3A to 3C can be obtained in all these examples, respective structures are slightly different.

Next, the case where projections are provided on the opposing surfaces of two substrates, as shown in FIG. 4B, will be explained as an example hereunder.

In FIG. 4B, projections P1, P2 for dividing the alignment directions alternatively are formed on the electrodes 111, 112 on the opposing surfaces of two substrates, and also vertical alignment films 113, 114 are provided on the inner surfaces of them. The vertical aligning process is applied to the vertical alignment films. The liquid crystal injected between two substrates is the negative type one. When no voltage is applied, the liquid crystal molecules L are aligned perpendicularly to the substrate surface on the vertical alignment films. Since the liquid crystal molecules L tend to be aligned perpendicularly to the inclined surfaces of the projections P1, P2, such liquid crystal molecules L on the projections P1, P2 are also tilted. However, since the liquid crystal molecules L are aligned almost perpendicularly to the substrate surface in most areas except for the projections P1, P2 when no voltage is applied, the good black display can be obtained, as shown in FIG. 3A.

When the voltage is applied, the liquid crystal molecules L are parallel with the substrate (the electric field is perpendicular to the substrate) in areas in which the projections P1, P2 are not provided, but such liquid crystal molecules L are tilted in vicinity of the projections P1, P2. In other words, when the voltage is applied, the liquid crystal molecules L are tilted in response to the intensity of the electric field but the electric field is directed perpendicularly to the substrate. Therefore, unless the tilt direction of the liquid crystal molecules L is defined by the rubbing, the liquid crystal molecules L may take all directions of 360 degrees as the tilted azimuth to the electric field. Since the electric field is inclined in the direction parallel with the inclined surfaces of the projections P1, P2 on the projections P1, P2, the liquid crystal molecules L are tilted in the direction perpendicular to the electric field when the voltage is applied. This direction coincides with the original direction inclined by the projections P1, P2, and thus the liquid crystal molecules L are aligned more stably. In this manner, the projections P1, P2 can provide the stable alignment by both effects of their inclination and the electric field on the inclined surface. In addition, if the large voltage is applied, the liquid crystal molecules L are aligned in almost parallel with the substrate.

As described above, the projections P1, P2 can perform a role of the trigger that decides the alignment azimuth of the liquid crystal molecules L when the voltage is applied.

In FIG. 4A, slits S1, S2 are provided on both or either of electrodes 111, 112. The vertical aligning process is applied to the alignment films 113, 114, and the negative type liquid crystal is sealed between the substrates. The liquid crystal molecules L are aligned perpendicularly to the substrate surface when no voltage is applied, whereas the electric field is generated at the slits (electrode edge portions) S1, S2 in the oblique direction to the substrate surface when the voltage is applied. The tilt directions of the liquid crystal molecules L are decided by the influence of this oblique electric field, and thus the alignment directions of the liquid crystal molecules are divided in the right and left directions, as shown in FIG. 4A.

FIG. 4C shows an example in which the modes in FIG. 4A and FIG. 4B are combined together. The slits S are formed in one electrode 111 while the projections are provided on the other electrode 112. Though examples for implementing three domain defining means are illustrated as above, various variations may be adopted.

FIG. 5 is a plan view showing positional relationships among bus lines, projections, pixels, and electrodes in the liquid crystal display panel in which the alignment of the liquid crystal molecules are divided into four directions. FIG. 6 is a sectional view taking along a I-I line in FIG. 5.

In FIG. 5 and FIG. 6, a plurality of gate bus lines 122 extending in the X direction (the lateral direction in FIG. 5 and FIG. 6) are formed on the TFT substrate 121 at a distance along the Y direction (the longitudinal direction in FIG. 5 and FIG. 6). Also, capacitive bus lines 123 extending in the X direction are formed between the gate bus lines 122. Auxiliary capacitive branch lines 123a that have a length not to touch the gate bus lines 122 are formed from the capacitive bus lines 123 in the Y direction so as to oppose to a part of drain bus lines (also called data bus lines), described later.

The gate bus lines 122 and the capacitive bus lines 123 are covered with a first insulating film 124. Then, a plurality of drain bus lines 125 extending in the Y direction are formed in the X direction on the first insulating film 124 at a distance. The TFTs 126 are formed to correspond to crossing portions between the gate bus lines 122 and the drain bus lines 125. The TFT 126 has a semiconductor layer 126a formed on the gate bus line 122 via the first insulating film 124, a drain electrode 126d formed on the semiconductor layer 126a, and a source electrode 126s formed on the semiconductor layer 126a. The drain electrode 126d is connected to the neighboring drain bus lines 125. The drain bus lines 125 and the TFTs 126 are covered with a second insulating film 127.

A pixel electrode 128 made of ITO (indium-tin oxide) is formed on the second insulating film 127 and in the area surrounded by two drain bus lines 125 and two gate bus lines 122. The pixel electrode 128 is connected to the source electrode 126s via a hole in the second insulating film 127.

The capacitive bus line 123 is hold at a constant potential. If the potential of the drain bus line 125 is varied, the potential of the pixel electrode 128 is also varied based on the capacitive coupling due to the stray capacitance. According to the configuration in FIG. 6, since the pixel electrode 128 is connected to the capacitive bus line 123 via auxiliary capacitances, variation in potential of the pixel electrode 128 can be reduced.

In FIG. 6, a color filter 132, a black matrix 133, a common electrode 134, and an alignment film 135 are formed in sequence on an opposing substrate 131 opposing to the TFT substrate 121.

Also, projections 130, 136 that have zig-zag bending patterns to extend in the Y direction are formed on the opposing surfaces of the opposing substrate 131 and the TFT substrate 121 respectively. A bending angle of the bending pattern is roughly 90 degrees.

The projections 130 formed on the TFT substrate 121 side are aligned at an equal interval in the X direction, and their bending points are positioned in the almost center of the gate bus lines 122. The projections 136 formed on the opposing substrate 131 have a pattern substantially similar to the projections 130 formed on the TFT substrate 121, and are formed on the common electrodes 134 such that they are positioned in the almost middle portion between a plurality of projections 130 on the TFT substrate 121.

The projections 130 on the TFT substrate 121 side and the pixel electrodes 128 are covered with the alignment film 129, while the projections 136 on the opposing substrate 131 side are also covered with another alignment film 135. Both the projections 130 on the TFT substrate 121 side and the projections 136 on the opposing substrate 131 side intersect with edges of the pixel electrodes 128 at an angle of 45 degrees respectively.

Also, polarizing plates (not shown) are arranged on the surfaces of the TFT substrate 121 and the opposing substrate 131, which do not put the liquid crystal material between them, respectively. These polarizing plates are arranged such that their polarization axes intersect with linear portions of the projections 130, 136 by 45 degrees to form cross-nicol. That is, the polarization axis of one polarizing plate is parallel with the X direction in FIG. 6 and the polarization axis of the other polarizing plate is parallel with the Y direction in FIG. 6.

The TFT substrate 121 and the opposing substrate 131 are arranged in parallel at a distance mutually, and the liquid crystal material 139 is filled into a space between them. The liquid crystal material 139 having the negative dielectric anisotropy is employed, as described above. The projections 130, 136 are formed of material that has the dielectric constant equivalent to or less than that of the liquid crystal material 139.

Next, the alignment of the liquid crystal molecules L when the intermediate voltage is applied to the pixel electrodes will be explained, by taking as an example the case where the slits are formed in the pixel electrode, hereunder.

FIG. 7 is a plan view showing positional relationship among the gate bus lines, the drain bus lines, the capacitive bus lines, and the pixel electrode 128 formed on the TFT substrate on which the slits S are provided on the pixel electrode in place of the projections 130 shown in FIG. 5.

In FIG. 7, the pixel electrode 128a is divided into a plurality of areas by a plurality of slits S passing between upper projections 136a. These areas are conductively connected mutually by connecting portions 128b that are formed to cross the slits S. Two slits S formed in the neighborhood of the center of the pixel electrode 128a are intersected with each other at the edge portion of the pixel electrode 128a.

Then, when the intermediate voltage is applied to the pixel electrode 128a, the liquid crystal molecules L on the pixel electrode 128a are tilted to the surface of the pixel electrode 128a. The liquid crystal molecule L in FIG. 7 is indicated by a circular cone. A vertex of the circular cone indicates a position of one end of the liquid crystal molecule on the TFT substrate side, and a base of the circular cone indicates a position of the other end of the liquid crystal molecule. Four types of the tilt direction of the liquid crystal molecule L are given based on the principle shown in FIG. 4.

As described above, the MVA mode is the mode in which the liquid crystals having the negative dielectric anisotropy are aligned substantially perpendicularly to the substrate surface. Since the MVA mode can have the high contrast and can improve the visual characteristic without reduction of the switching speed, its display quality is good. In addition, the viewing angle characteristic can be improved much more by using the domain defining means.

FIG. 8 is a sectional view showing another MVA liquid crystal display device in the prior art. First projections 167 are formed on the opposing surface of a glass substrate 151, and second projections 168 are formed on the opposing surface of a glass substrate 186. The first projections 167 and the second projections 168 extend in the direction perpendicular to the sheet of FIG. 8, and are arranged alternately along the lateral direction in FIG. 8. A vertical alignment film 178 is formed on the opposing surfaces of the glass substrates 151, 186 respectively to cover the projections 167, 168.

Liquid crystal material 179 containing liquid crystal molecules 180 is filled between the glass substrate 151 and the glass substrate 186. The liquid crystal molecules 180 have the negative dielectric anisotropy. The dielectric constant of the projections 167, 168 is lower than that of the liquid crystal material 179. Polarizing plates 181, 182 are cross-nicol-arranged on the outside of the glass substrate 151 and the glass substrate 186 respectively. Since the liquid crystal molecules 180 are aligned vertically to the substrate surface when the voltage is not applied, the good dark state can be obtained.

When the voltage is applied between the substrates, equipotential surfaces indicated by a broken line 166 appear. Since the dielectric constant of the projections 167, 168 is smaller than that of the liquid crystal layers, the equipotential surfaces 166 in the neighborhood of the side surfaces of the projections 167, 168 are inclined to come down in the projections. Therefore, the liquid crystal molecules 180a in the neighborhood of the side surfaces of the projections 167, 168 are tilted to become parallel to the equipotential surfaces 166. The peripheral liquid crystal molecules 180a are tilted by the influence of the tilting of the liquid crystal molecules 180a. For this reason, the liquid crystal molecules 180 between the first projections 167 and the second projections 168 are aligned such that their major axis (director) is inclined right-upward in FIG. 8. The liquid crystal molecules 180 positioned on the left side rather than the first projections 167 and the liquid crystal molecules 180 positioned on the right side rather than the second projections 168 are aligned such that their major axis (director) is inclined right-downward in FIG. 8.

In this manner, a plurality of domains in which the tilt directions of the liquid crystal molecules are different are defined in one pixel. The first projections 167 and the second projections 168 define boundaries of the domains. Two type domains can be formed by arranging the first projections 167 and the second projections 168 in parallel with the substrate surface mutually. Four type domains can be formed in total by bending patterns of these projections by 90 degrees. Since plural domains are formed in one pixel, the visual characteristic in the half tone display state can be improved.

The inventors of the present invention point out that the above liquid crystal display device in the prior art has problems described in the following.

The MVA mode liquid crystal display device can achieve the high picture quality, the high reliability, and the high productivity. However, the VA mode has essentially such a nature that it easily accepts the influence of the electric field because of its weak anchoring force in contrast to the horizontally aligned mode such as the TN mode, and thus the MVA mode partakes of such nature of the VA mode.

Accordingly, as shown in FIGS. 9A and 9B, the alignment state of the liquid crystal molecules L around the pixel electrode 128 is changed because of changes of the gate bus line potential Egc and the drain bus line potential (data voltage) Egs in some case. Such phenomenon occurs similarly in the case of the TN mode, nevertheless the phenomenon is ready to occur in the VA mode rather than the TN mode.

Also, as the phenomenon peculiar to the MVA mode, sometimes the projections are charged under various conditions such as the driving state. At this time, the alignment of the liquid crystals at the intersecting portions between the drain bus lines and the gate bus lines is changed by the influence of the charge of the projections.

When the alignment around the pixel is changed, values of the stray capacitances, e.g., a gate-common electrode capacitance Cgc, a gate-source capacitance Cgs, a drain-common electrode capacitance Cdc, etc. are also changed correspondingly. As a result, the potential of the pixel electrode 126s is also changed by the capacitive coupling. Normally the potential variation of the pixel electrode is reduced by the auxiliary capacitance, but such variation cannot be perfectly compensated in some cases. The potential variation of the pixel electrode is easily caused if the auxiliary capacitance is reduced to increase the aperture ratio especially. If the potential of the pixel electrode is varied, the flicker appears on the screen.

It may be considered that the auxiliary capacitance is increased to such extent that the potential variation of the pixel electrode can be eliminated completely. If so, the aperture ratio is reduced correspondingly.

Next, generation of residual images in the MVA liquid crystal display device will be explained hereunder.

The generation of residual images in the liquid crystal display device is caused by the abnormality of the response speed. This is because the domain control direction on the above projections on the electrode and on the above slits is not defined.

Such unstability of the domain control direction is generated due to variation in cell thickness, etc. Hence, the liquid crystal display device in which the residual images are caused is not forwarded as the defective product.

As the result of the examination to check the cause for the long-time remaining residual images, followings become apparent.

In other words, as shown in FIGS. 10A and 10B, in the liquid crystal display device employing the configuration in which a plurality of projections or slits are formed on the electrodes, it can be understood that, if there is a difference between the domain state when the display is changed from the black to the white and the domain state when the display is changed from the half tone to the white, the long-time remaining residual images are generated.

In FIG. 10A, the number of domains on the slits S after the display is changed from the black to the white are six because the domain is divided by boundaries at middle positions (center positions of the slits S) between all the connecting portions 128b of the pixel electrode 128a. Therefore, the liquid crystal molecules L in the neighborhood of the slits S are aligned in the perpendicular direction to the straight portions of the slits S.

In contrast, in FIG. 10B, the number of domains on the slits S after the display is changed in the order of the black, the half tone, and the white are two or four because the domain is divided by boundaries between a part of the connecting portions 128b. Therefore, there exists an area in which the domains are not changed by boundaries between the connecting portions 128b and their middle portions. The liquid crystal molecules L in vicinity of the slits S are aligned obliquely to the straight portions of the slits S in this area.

One of the causes may be considered as follows. That is, since the voltage is not sufficiently applied to the liquid crystal molecules L on the projections 130 or the slits S in the half tone display, the liquid crystal molecules L are aligned almost perpendicularly to the substrate surface, as shown in FIG. 11. Thus, influences of the electric field at the edge of the pixel electrode 128a and the alignment of the display domains being affected by such electric field affect the divided portions of the alignment controlling means as the connecting portions. As a result, the alignment control effect achieved by dividing the alignment controlling means cannot be sufficiently performed. In other words, when the liquid crystal molecules L on the slits S or the projections 130 are aligned perpendicularly in the half tone display, such neighboring liquid crystal molecules L are affected by the electric field at the edges of the pixel electrode 128a and then tilted to the straight portions of the slits S or the projections 130.

Accordingly, when the display is changed from the half tone display to the white display, the domain ③ shown in FIG. 10A disappears to connect the domains ② and ④,and then the domain ⑤ disappears to connect the domains ④ and ⑥. As a result, as shown in FIG. 10B, the right-upward directed domains are connected and the left-downward directed domains are disappeared, so that the domains on the slits S after the white display are reduced into two domains ① and ②.

As another one of the causes for generating the residual images, it may be considered that the bending portions of the patterns of the projections 130 or the slits S of the alignment controlling means are arranged at the edges of the pixel electrode 128a. The alignment states of the liquid crystal molecules L at the bending portions are any of three types shown in FIGS. 12A to 12C.

However, the alignment at the bending portions becomes as shown in FIG. 12C since it is affected by the influence of the alignment by the edges of the pixel electrode 128a. As a result, as indicated by a dot-dash line in FIG. 13, the alignment control direction by the edges of the pixel electrode 128a is extended into the pixel. Since this extension affects the alignment of the domains on the slits S in the case of the half tone display, the alignment control effect given by dividing the alignment controlling means cannot sufficiently be brought about.

Also, as shown in FIG. 14A and FIG. 14B, in the TFT substrate, sometimes the area in which a plurality of electrodes are stacked, especially the pixel electrode 128a and the capacitance electrode (capacitive bus line) 123 are punched through the insulating film between them to generate the short-circuit. At this time, in the liquid crystal display device having the structure in which the pixel electrode 128a is divided into a plurality of areas by using the slits S as the alignment controlling means and then these areas are electrically connected by the connecting portions 128b, as indicated by an X mark in FIGS. 14A and 14B, the short-circuited area is disconnected from other areas by cutting off the connecting portions 128b near the TFT 126 in the area of the pixel electrode 128a, that is short-circuited to the capacitive bus line 123, so that the liquid crystal molecules in the pixel can be partially driven.

However, since the area that is short-circuited to the capacitive bus line 123 of the pixel electrode 128a is positioned in the center of the pixel, merely the half area or less of the pixel electrode 128a can be driven, as indicated by a dot-dash line in FIG. 14A, whereby this pixel area acts as the point defect failure to lower yield of the device.

When the voltage is not applied, the liquid crystal molecules in vicinity of the edges of the projections 167, 168 in the MVA liquid crystal display device in the prior art shown in FIG. 8 are aligned almost perpendicularly in the area in which the projections 167, 168 are not formed. However, the liquid crystal molecules in the neighborhood of the edges of the projections 167, 168 are affected by the inclined surfaces of the projections and thus tilted to the substrate surface. Therefore, the double refraction effect appears against the light being transmitted in the thickness direction of the liquid crystal layer. Because of this double refraction effect, the light is transmitted slightly when the display is to be in the dark state, and thus lowering of the contrast is brought out.

The leakage of light in the dark state can be prevented by covering the areas located in the neighborhood of the inclined surfaces of the projections with a light-shielding film. Nevertheless, if such light-shielding film is provided, the light is shielded even in the light state and thus reduction of the transmittance (the aperture ratio) is brought about.

Also, in the MVA liquid crystal display device shown in FIG. 8 in the prior art, the liquid crystal molecules 180 are tilted when the voltage is applied, but the tilt directions of the liquid crystal molecules in the area located far from the projections 167, 168 are not directly decided. That is, the liquid crystal molecules 180a in the neighborhood of the projections 167, 168 are tilted and the tilt is propagated sequentially up to the area far from the projections 167, 168. In this manner, the tilt directions of the liquid crystal molecules 180 in the area far from the projections 167, 168 are indirectly decided. Since distortion of the electric field is small at the time of the half tone display state, the propagation speed of the tilt of the liquid crystal molecules is lowered. Therefore, the response from the dark state to the half tone state is delayed.

Also, the transmission loss of the light is ready to generate in the neighborhood of the projections provided in the MVA liquid crystal display device. Therefore, there is such a tendency that the transmittance (aperture ratio) is reduced in contrast to the TN mode liquid crystal display device. In case the liquid crystal display device is used as the floor type one, the reduction in the transmittance does not become a large issue. Nevertheless, in order to install the liquid crystal display device onto the mobile device, it is desired to enhance the transmittance.

Upon the progress of the lower consumption power of the liquid crystal display device, it is one of important subjects to increase the aperture ratio. In the MVA mode liquid crystal display device, the alignment division (multi-domain) can be accomplished by forming the domain defining projections (so-called banks) on the TFT substrate and the opposing substrate respectively, and thus the good viewing angle characteristic and the good picture quality can be derived. In this case, the aperture ratio is reduced because of the projections in the pixel area.

SUMMARY OF THE INVENTION

It is an object of the present invention to provide a liquid crystal display device capable of achieving a good picture quality.

The above subjects can be overcome by providing, as shown in FIG. 25, a vertically aligned liquid crystal display device for controlling liquid crystal molecules alignment in voltage application by providing linear structures or linear slits consisting of a plurality of constituent units to at least one of a pair of substrates having an electrode thereon, comprising: alignment controlling means for forming an alignment singular point $s=-1$ of liquid crystal molecules at an intersecting point between the structures on the electrode or the slits in the electrode and an edge of a pixel electrode on one of the substrates.

According to the present invention, in the liquid crystal display device having at least one of the structures on the electrode, that is used as the domain defining means, or the slits in the electrode, the alignment singular point s=−1 or s=+1 of the liquid crystal molecules is formed in the neighborhood of the intersecting portion between the prolonged line of the structures or the slits and the edge of the pixel electrode.

As for the change of the domains of the liquid crystal molecules on the slits if the present invention is applied, as shown in FIG. 32A, for example, when the display is changed from the black display to the white display, the number of domains divided by the connecting portions on the slit is eight such as ① to ⑧. Also, according to FIG. 32A, the domains ⑧ and ⑨ are increased in number rather than FIG. 10A indicating the problem in the prior art. This is because the singular point s=−1 of the alignment vector is formed at the edge of the pixel electrode. Then, as shown in FIG. 32B, when the display is changed from the black display to the white display via the half tone display, the domains and ⑥ and ⑧ are connected and thus the domain ⑦ disappears. In other words, the change of domains on the slits can be suppressed at a very small level rather than FIG. 10A in the neighborhood of the edge of the pixel electrode.

Accordingly, difference of the domain states between the white monitored when the display of the pixel is changed from the black display to the white display and the white monitored when the display of the pixel is changed from the half tone display to the white display can be reduced to an unobtrusive level, so that the domain change can be reduced up to a undistinguishable level as the residual image.

BRIEF DESCRIPTION OF THE DRAWINGS

FIGS. 1A to 1C are views showing changes in images according to a viewing angle of the TN mode liquid crystal display device in the prior art;

FIGS. 3A to 3C are views showing an effect of alignment division in the VA mode in the prior art;

DESCRIPTION OF THE PREFERRED EMBODIMENTS

Embodiments of the present invention will be explained in detail with reference to the accompanying drawings hereinafter.

First Embodiment

Figure 15:
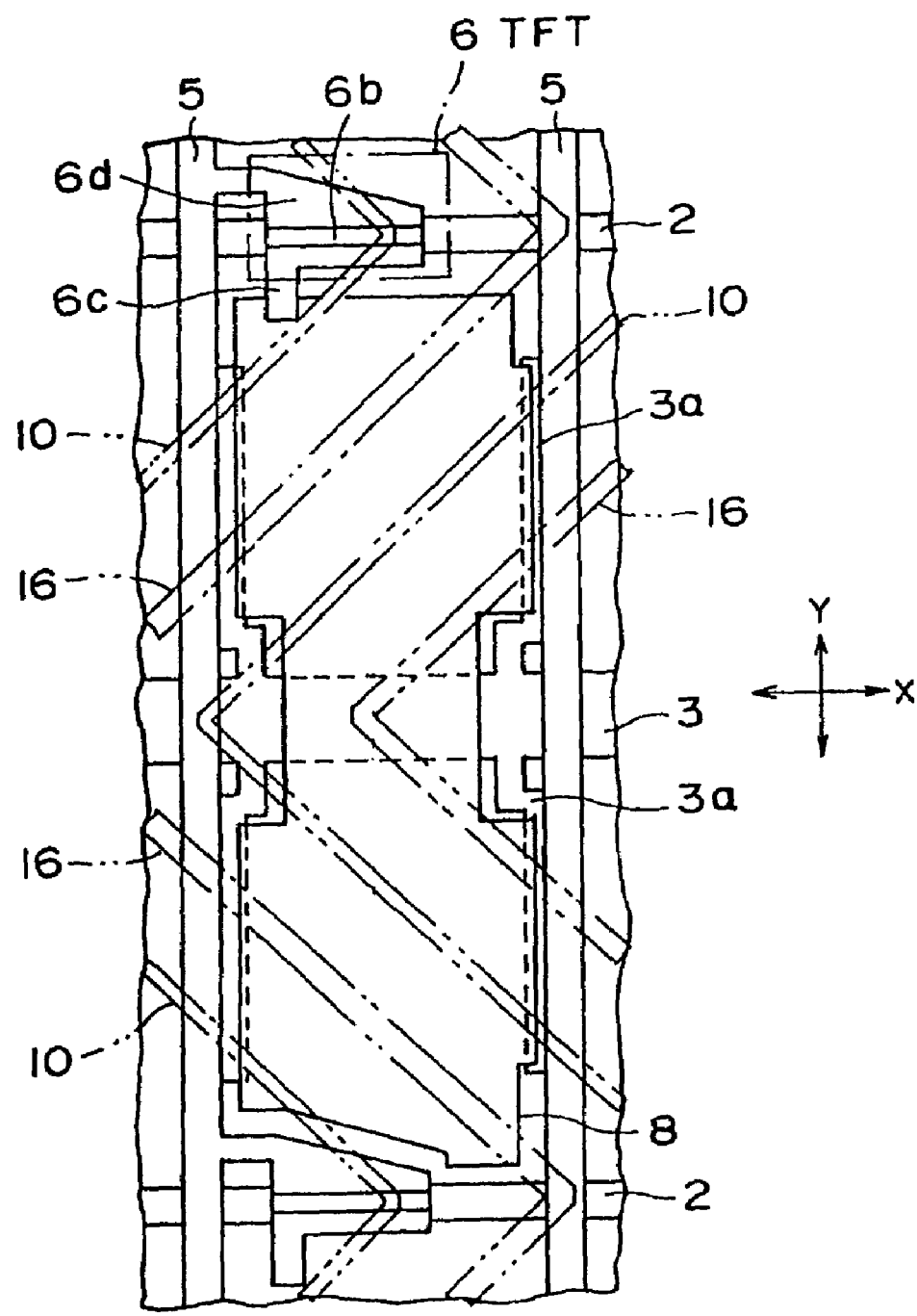
FIG. 15 is a plan view showing arrangement of domain defining means in a pixel area according to a first embodiment of the present invention.
Figure 16:
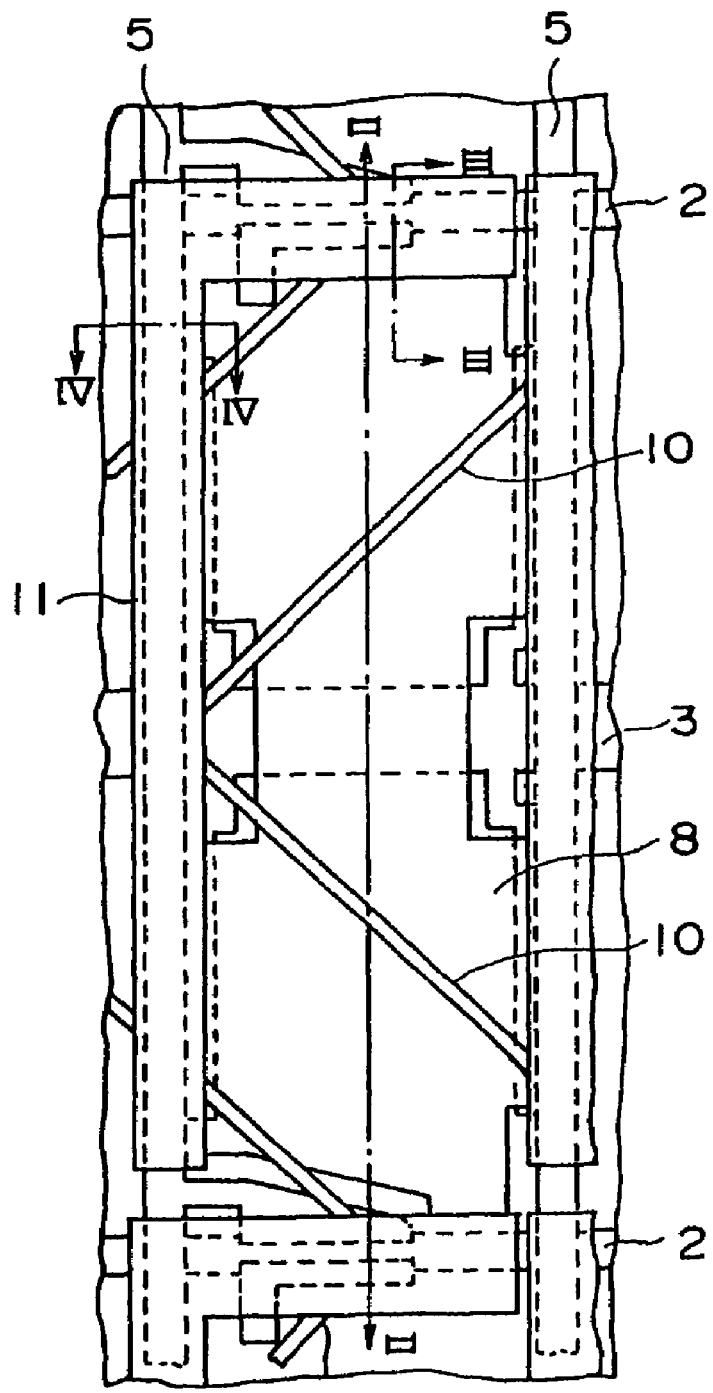
FIG. 16 is a plan view showing the pixel area in which a dielectric structure and projections are formed, according to the first embodiment of the present invention.
Figure 17:
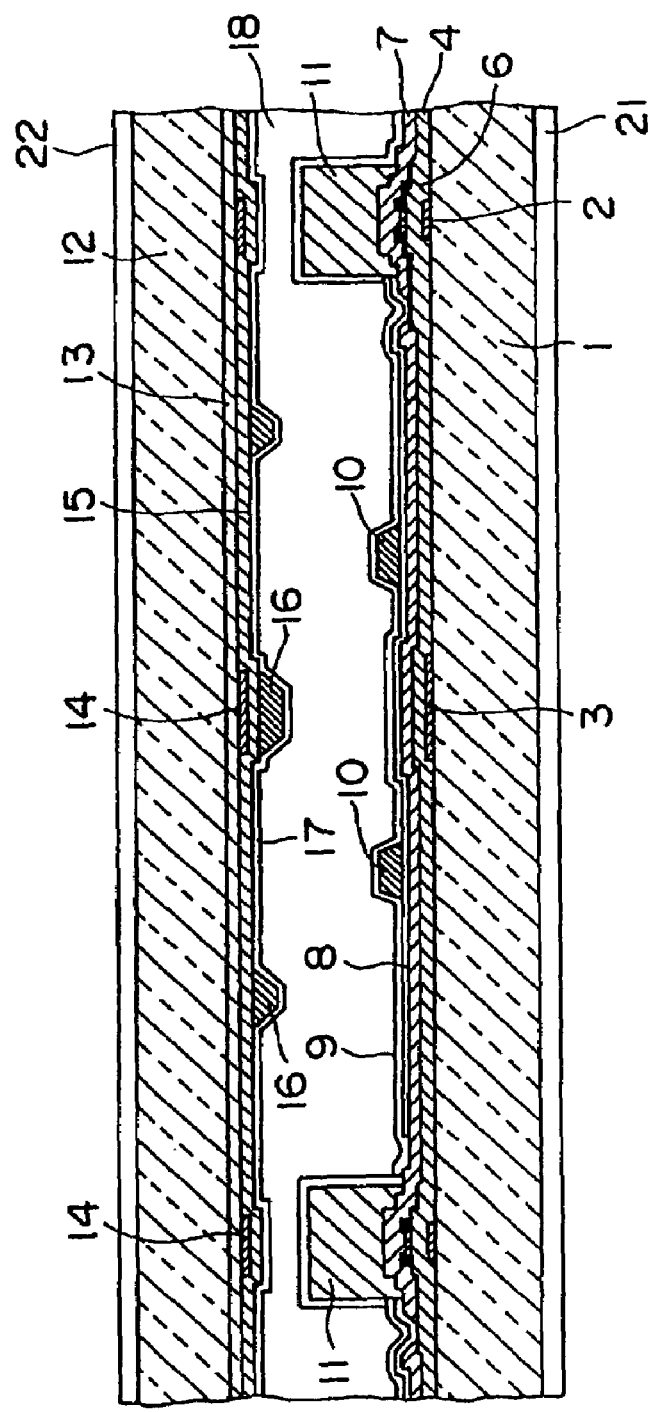
FIG. 17 is a sectional view showing the pixel area according to the first embodiment of the present invention, taken along a II-II line in FIG. 16.
Figure 18:
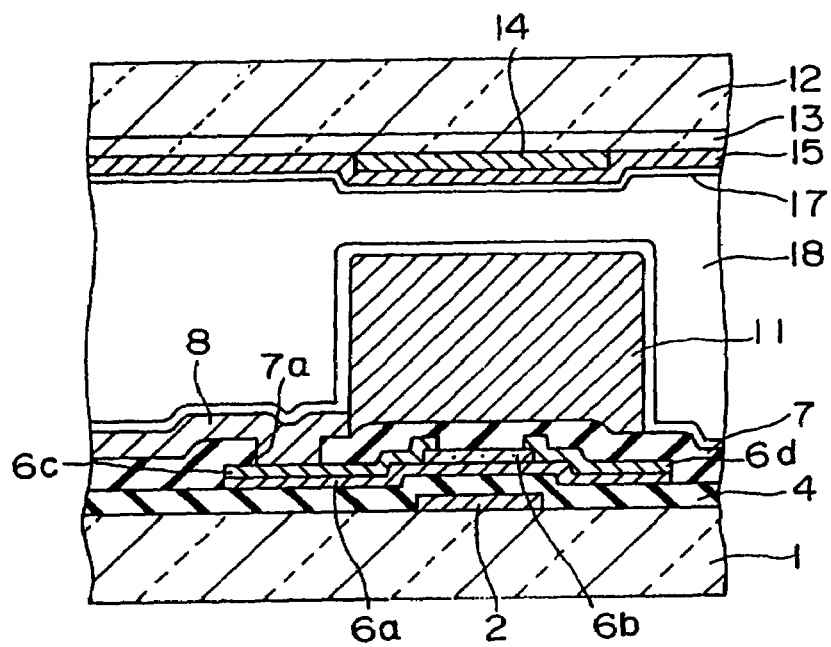
FIG. 18 is a sectional view showing the pixel area according to the first embodiment of the present invention, taken along a III-III line in FIG. 16.
Figure 19:
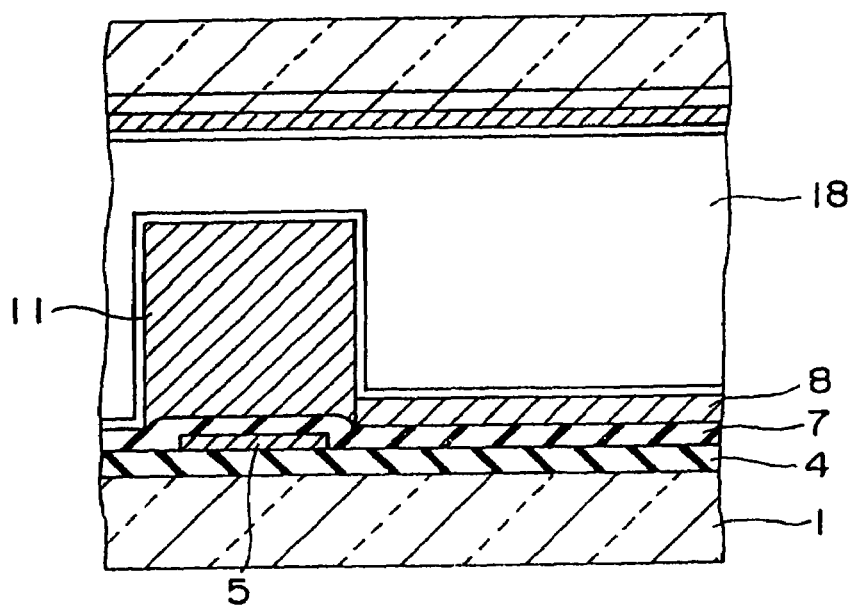
FIG. 19 is a sectional view showing the pixel area according to the first embodiment of the present invention, taken along a IV-IV line in FIG. 16.

FIG. 15 shows a planar state of a TFT substrate of one pixel of an MVA mode liquid crystal display device according to a first embodiment of the present invention, except for an insulating film and dielectric projections. FIG. 16 is a plan view showing the state in which a dielectric structure is formed on the TFT substrate shown in FIG. 15. FIG. 17 is a sectional view taken along a II-II line in FIG. 16. FIG. 18 is a sectional view taken along a III-III line in FIG. 16. FIG. 19 is a sectional view taken along a IV-IV line in FIG. 16.

In FIG. 15, a plurality of gate bus lines 2 that extend in the X direction (lateral direction in FIG. 15) are formed at a distance in the Y direction (longitudinal direction in FIG. 15) on a first glass substrate (TFT substrate) 1 on which TFTs are formed.

A capacitive bus line (storage capacitance forming electrode) 3 extending in the X direction is formed between the gate bus lines 2. Auxiliary capacitive branch lines 3a that have a length not to touch the gate bus lines 2 are formed from the capacitive bus line 3 in the Y direction so as to oppose to a part of drain bus lines, described later.

The gate bus lines 2, the capacitive bus lines 3, and the auxiliary capacitive branch lines 3a are formed simultaneously.

In other words, the gate bus lines 2, the capacitive bus lines 3, and the auxiliary capacitive branch lines 3a are formed by forming an aluminum film of 100 nm thickness and a titanium film of 50 nm thickness on the first glass substrate 1 by the sputtering and then patterning these films by the photolithography method. The reactive ion etching (RIE) method using a mixed gas of $BCl_3$ and $Cl_2$ is employed in the patterning.

As shown in FIG. 17, the gate bus line 2 and the capacitive bus line 3 is covered with a gate insulating film 4 formed of silicon nitride that is formed by the plasma-enhanced chemical vapor deposition (PE-CVD) method to have a thickness of 400 nm. A plurality of drain bus lines 5 extending in the Y direction are formed on the gate insulating film 4 in the X direction at a distance.

A TFT (thin film transistor) 6 is formed as the active element in the neighborhood of an intersection point between the gate bus line 2 and the drain bus line 5.

As shown in FIG. 18, the TFT 6 has an active layer 6a formed via the gate insulating film 4 in a region to cross a part of the gate bus line 2, a drain electrode 6d formed on the active layer 6a on one side of the gate bus line 2, and a source electrode 6s formed on the active layer 6a on the other side of the gate bus line 2. The drain electrode 6d is connected to the adjacent drain bus line 5.

The drain electrode 6d and the source electrode 6s are separated on a channel protection film 6b formed on a channel region of the active layer 6a.

The channel protection film 6b is formed by the following method.

In other words, a silicon nitride film of 140 nm thickness is formed on the active layer 6a and the gate insulating film 4 by the PE-CVD method, and then photoresist (photosensitive resin) is coated on the silicon nitride film. Then, a resist pattern is formed by exposing and developing the photoresist. The exposure process has a first exposure step of irradiating the exposure light onto the photoresist from the lower surface of the glass substrate 1 by using the gate bus line 2 as an exposure mask and a second exposure step of irradiating the exposure light onto the photoresist from the upper surface of the glass substrate 1 by using the normal exposure mask. Accordingly, edges of the resist pattern are defined by edges of the gate bus line 2. Then, the channel protection film 6b made of the silicon nitride film is formed by etching the silicon nitride film in the region, that is not covered with such resist pattern, by the wet method using the buffer hydrofluoric acid or the RIE method the hydrofluoric acid group gas.

In this case, the active layer 6a is formed by patterning an undoped amorphous silicon film that is formed on the gate insulating film 4 by the PE-CVD method to have a thickness of 30 nm.

Also, all the source electrode 6s, the drain electrode 6d, and the drain bus line 5 are formed by forming an $n^+$-type amorphous silicon film of 30 nm thickness, a titanium film of 20 nm thickness, an aluminum film of 75 nm thickness, and a titanium film of 80 nm thickness in sequence on the gate insulating film 4 and the channel protection film 6b and then patterning these films by using as a sheet of mask. This etching is carried out by the RIE method using a mixed gas of $BCl_3$ and $Cl_2$. The channel protection film 6b acts as an etching stopper in this etching.

The TFT 6 and the drain bus line 5 are covered with a protection insulating film 7 formed of silicon oxide or silicon nitride.

Also, a transparent pixel electrode 8 made of ITO having a thickness of 70 nm is formed on the protection insulating film 7 in a region surrounded by two drain bus lines 5 and two gate bus lines 2. The patterning of the ITO film is carried out by the wet etching method using oxalic acid group etchant.

The pixel electrode 8 is electrically connected to the source electrode 6s through a hole 7a in the protection insulating film 7.

Insulating projections 10 having zig-zag bending patterns extending in the Y direction are formed on the protection insulating film 7 and the pixel electrode 8 at a distance in positions indicated by a chain double-dashed line shown in FIG. 15. A bending angle of the zig-zag bending patterns is roughly 90 degrees, and its bending point is arranged in the almost center of the gate bus line 2. Side surfaces of the projection 10 are inclined to the substrate surface.

Also, as shown in FIG. 16 to FIG. 19, dielectric structures 11 are formed on the protection insulating film 7 to be interposed between the gate bus line 2, the drain bus line 5, and the pixel electrode 8 respectively.

The dielectric structure 11 and the projection 10 are formed by the following method, for example.

In other words, high-sensitivity negative type resist and low-sensitivity negative type resist are coated in sequence on the protection insulating film 7 and the pixel electrode 8. Then, latent images of the bending patterns are formed on the high-sensitivity negative type resist by the first exposure. In the first exposure, luminous exposure is set not to expose the low-sensitivity negative type resist. Then, latent images are formed by irradiating the exposure light onto regions of the low-sensitivity negative type resist on the gate bus line 2 and the drain bus line 5 and their peripheral portions. For example, the exposure light is irradiated at least onto an area extended from the gate bus line 2 to an edge of the pixel electrode 8 and an area extended from the drain bus line 5 to an edge of the pixel electrode 8 in one pixel area. The high-sensitivity negative type resist is exposed at the same pattern simultaneously with the exposure of the low-sensitivity negative type resist. In this case, it is possible to say that the resists having different sensitivities are substantially the same dielectric material.

After this, if the patterns are formed by developing simultaneously the low-sensitivity negative type resist and the high-sensitivity negative type resist, the L-shaped dielectric structures 11 shown in FIG. 16 and the projections 10 having the bending patterns are formed integrally. In this case, since the projections 10 is formed of the high-sensitivity negative type resist while the dielectric structures 11 are formed of both the low-sensitivity negative type resist and the high-sensitivity negative type resist, the dielectric structures 11 become thicker than the projections 10.

In the above example, the dielectric structure 11 and the projection 10 are formed to have different heights. Since only one layer of the above photosensitive resist is needed if they have the same height, the above structures can be implemented by the same process as the prior art. For example, a film thickness of the dielectric structure 11 and the projection 10 is set to more than 1 μm.

Such projection 10 and the dielectric structure 11 as well as the pixel electrode 8 and the protection insulating film 7 are covered with the alignment film (vertical alignment film) 9 formed of resin.

Next, the opposing substrate that opposes to the first glass substrate 1 will be explained hereunder.

The opposing substrate consists of the second glass substrate 12 shown in FIG. 17, and then a red (R), green (G), blue (B) color filter film 13 is formed on the opposing substrate. Also, a black matrix 14 that has a pattern to oppose to the gate bus line 2, the drain bus line 5, and the capacitive bus lines 3 is formed on the color filter film 13. In addition, a transparent common electrode 15 made of ITO is formed on the color filter film 13 to cover the black matrix 14.

Projections 16 having zig-zag bending patterns are formed on the common electrode 15. As indicated by a chain double-dashed line in FIG. 15, the projections 16 are arranged on the first glass substrate 1 at positions in the almost middle between a plurality of projections 10.

The projections 10 on the first glass substrate 1 side and the projections 16 on the second glass substrate 12 side intersect with edges of the pixel electrodes 8 respectively by an angle of 45 degrees.

In addition, an alignment film (vertical alignment film) 17 for covering the projections 16 is formed on the common electrode 15.

The first glass substrate 1 and the second glass substrate 12, formed as above, are stuck to each other at a predetermined distance to direct the alignment films 9, 17 inward. Then, liquid crystal material 18 having negative dielectric anisotropy is filled into a space between the alignment films 9, 17. The liquid crystal molecules in the liquid crystal material 18 are aligned perpendicularly to the substrate surface under the condition that no voltage is applied between the common electrode 15 and the pixel electrode 8. Also, the liquid crystal molecules are tilted in the direction orthogonal to straight portions of the patterns of the projections 10, 16 under the condition that the intermediate voltage is applied between the common electrode 15 and the pixel electrode 8.

In this case, it is desired that the projections 10, 16 are formed of material having the dielectric constant equivalent to or less than the relative dielectric constant of the liquid crystal material 18.

A first polarizing plate 21 is arranged on an outer surface of the first glass substrate 1, and a second polarizing plate 22 is arranged on an outer surface of the second glass substrate 12. An arrangement of the first polarizing plate 21 and the second polarizing plate 22 is cross-nicol. When the substrate is viewed vertically, polarization axes of the first polarizing plate 21 and the second polarizing plate 22 intersect with straight portions of the patterns of the projections 10, 16 by an angle of 45 degrees.

In the first embodiment, the structure is formed in which respective spaces between the pixel electrode 8, the gate bus line 2, and the drain bus line 5 are covered with the dielectric structure 11. Accordingly, a gap between the alignment film 9 on the gate bus line 2 and the alignment film 17 on the common electrode 15 becomes narrow, and thus a defining force of the alignment films against the liquid crystal molecules can be enhanced. In addition, a voltage drop is generated between the gate bus line 2 and the common electrode 15 by the dielectric structure, and also the voltage applied to the liquid crystal layer is lowered.

Figure 20A:
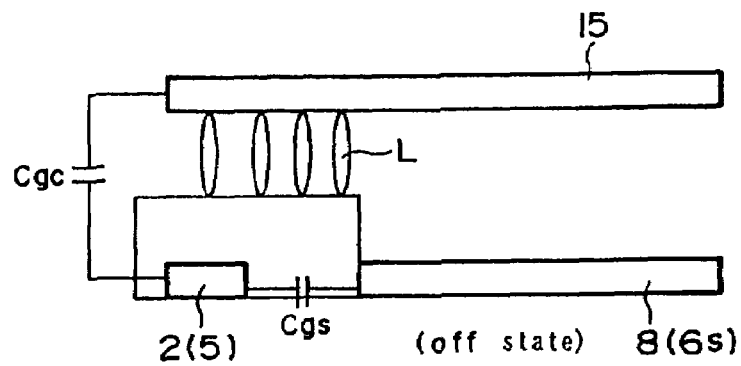
FIGS. 20A and 20B are sectional views showing an operation in the pixel area according to the first embodiment of the present invention.
Figure 20B:
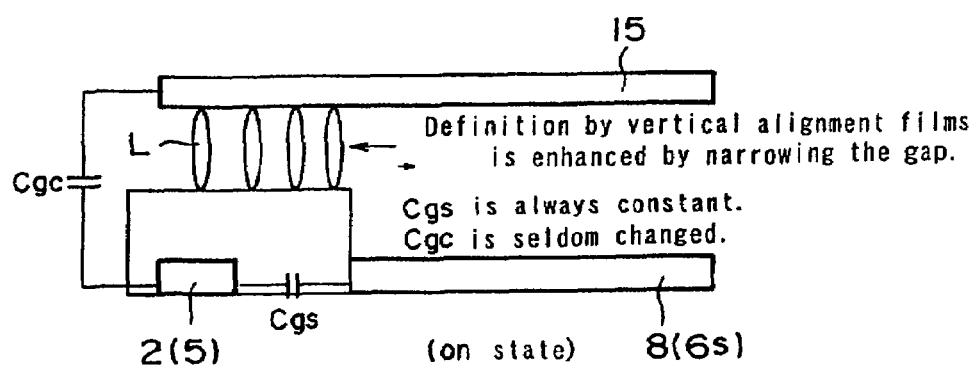

As results of them, as shown in FIGS. 20A and 20B, the liquid crystal molecules L over the gate bus line 2 are difficult to tilt since they receive the strong vertical alignment definition by the alignment films 9, 17. Accordingly, the alignment direction of the liquid crystal molecules L is hardly affected by the variation of the surrounding electric field, and thus the variation of the stray capacitance can be reduced.

Also, the relative dielectric constant of the dielectric structure 11 is not varied and constant such as about 2 to 5, and is smaller than the relative dielectric constant of the liquid crystal in many cases. For example, the dielectric structure 11 having the relative dielectric constant of 3.2 is used. The liquid crystal for the MVA mode has $\epsilon$ (dielectric constant in the perpendicular direction to the liquid crystal molecules) =3.6, $\epsilon//$(dielectric constant in the parallel direction to the liquid crystal molecules)=8.4.

Accordingly, as shown in FIG. 20A and FIG. 20B, the capacitance Cgc between the pixel electrode 8 and the gate bus line 2 and the capacitance Cds between the pixel electrode 8 and the drain bus line 5 are seldom changed. Further, because the voltage drop is generated by the dielectric structure 11, the voltage applied to the liquid crystal layer on the gate bus line 2 is also lowered. As a result, the stray capacitances between the bus lines can be reduced and the stray capacitance between the bus line and pixel electrode can be reduced.

With the above, since the variation of the stray capacitances becomes extremely small and the constant pixel potential can be always obtained, the aperture ratio can be increased by reducing the width of the capacitive bus line 3. In addition, when the potential of the pixel electrode is kept constant, generation of the flicker can be prevented.

For example, in the liquid crystal display panel employing the above structure, the variation of the common voltage is less than 10 mV and also the flicker rate can be improved below 3%, which is reduced below a half of the flicker rate in the prior art. Accordingly, yield of the liquid crystal display panel can be improved.

In the above first embodiment, since formation of the dielectric structures 11 and formation of the projections 10 can be performed by the same step, the above liquid crystal display device can be formed to hardly increase the number of processes rather than the prior art.

In this case, the above dielectric structure 11 may be formed to protrude to such extent that it overlaps slightly with the pixel electrode 8.

Second Embodiment

In the first embodiment, only spaces between the gate bus lines 2 and the drain bus lines 5 for driving the pixel electrodes and the pixel electrodes 8 are covered with the dielectric structures 11 in one pixel area.

Figure 21:
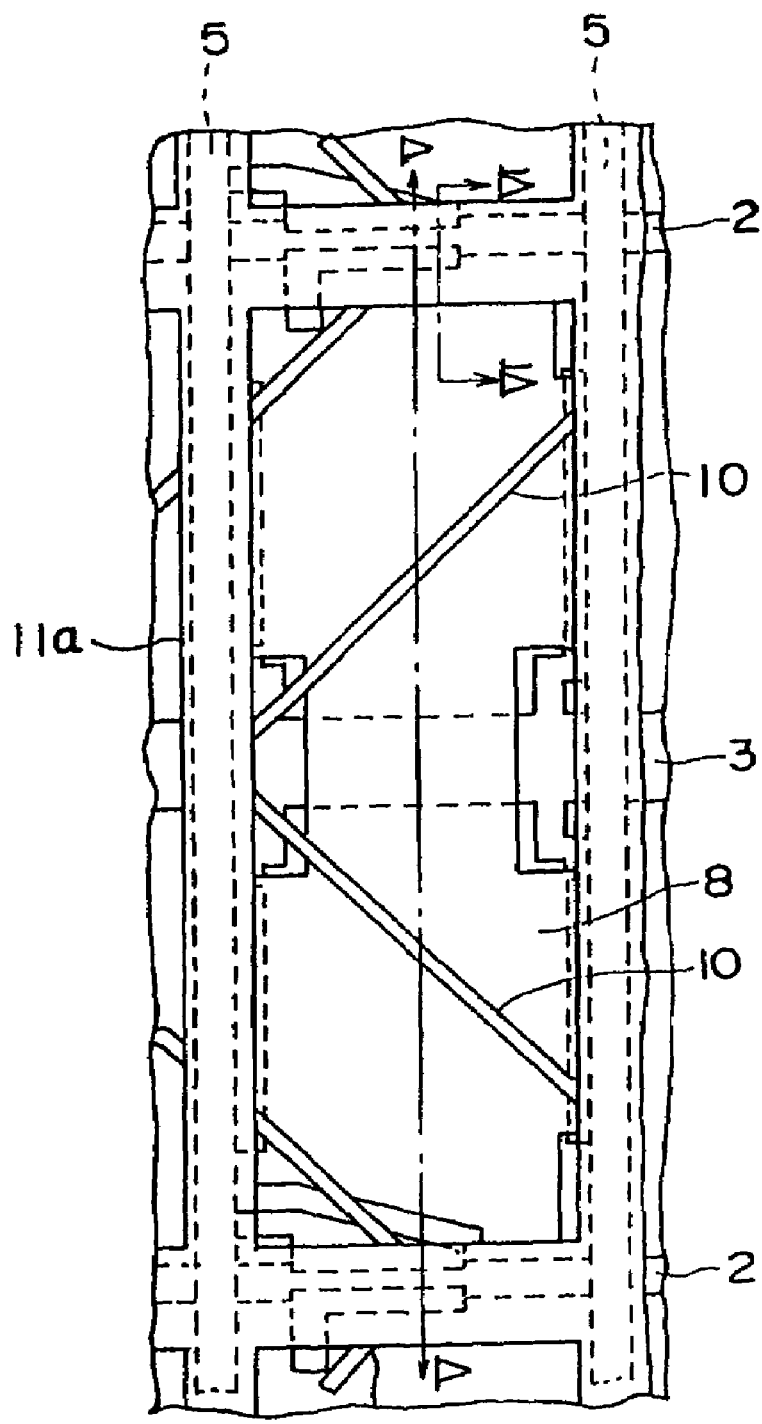
FIG. 21 is a plan view showing a pixel area of a liquid crystal display device according to a second embodiment of the present invention.

Arrangement areas of the dielectric structures are not limited to the above. For example, as shown in FIG. 21, dielectric structures 11a may be provided between neighboring pixel electrodes 8. In such structure, a peripheral area of the pixel electrode 8 and the gate bus line 2 and the drain bus line 5 are covered with the dielectric structure 11a.

The flicker rate can be improved by employing such structure rather than the first embodiment.

Further, only spaces between the gate bus line 2 and the pixel electrode 8 may be covered with the dielectric structure, or only spaces between the drain bus line 5 and the pixel electrode 8 may be covered with the dielectric structure. According to these structures, the effect by the dielectric structures 11, 11a shown in FIG. 16 or FIG. 21 cannot be achieved, but both the common voltage variation and the flicker rate are good.

Furthermore, in FIG. 15, the dielectric structure may be formed only in intersecting areas of the gate bus lines 2 and the projections 11 and their neighboring areas. Otherwise, the dielectric structure may be formed only in intersecting areas of the drain bus lines 5 and the projections 11 and their neighboring areas. According to these structures, such effects can be derived that the influence of the charge of the projections 10 can be reduced rather than the first embodiment and also the alignment change between the gate bus lines 2 and the pixel electrodes 8 in the neighborhood of the projections 10 can be suppressed. In this case, the flicker rate cannot be so improved in contrast to the dielectric structures shown in FIG. 16 or FIG. 21, but both the common voltage variation and the flicker rate are good.

Figure 22:
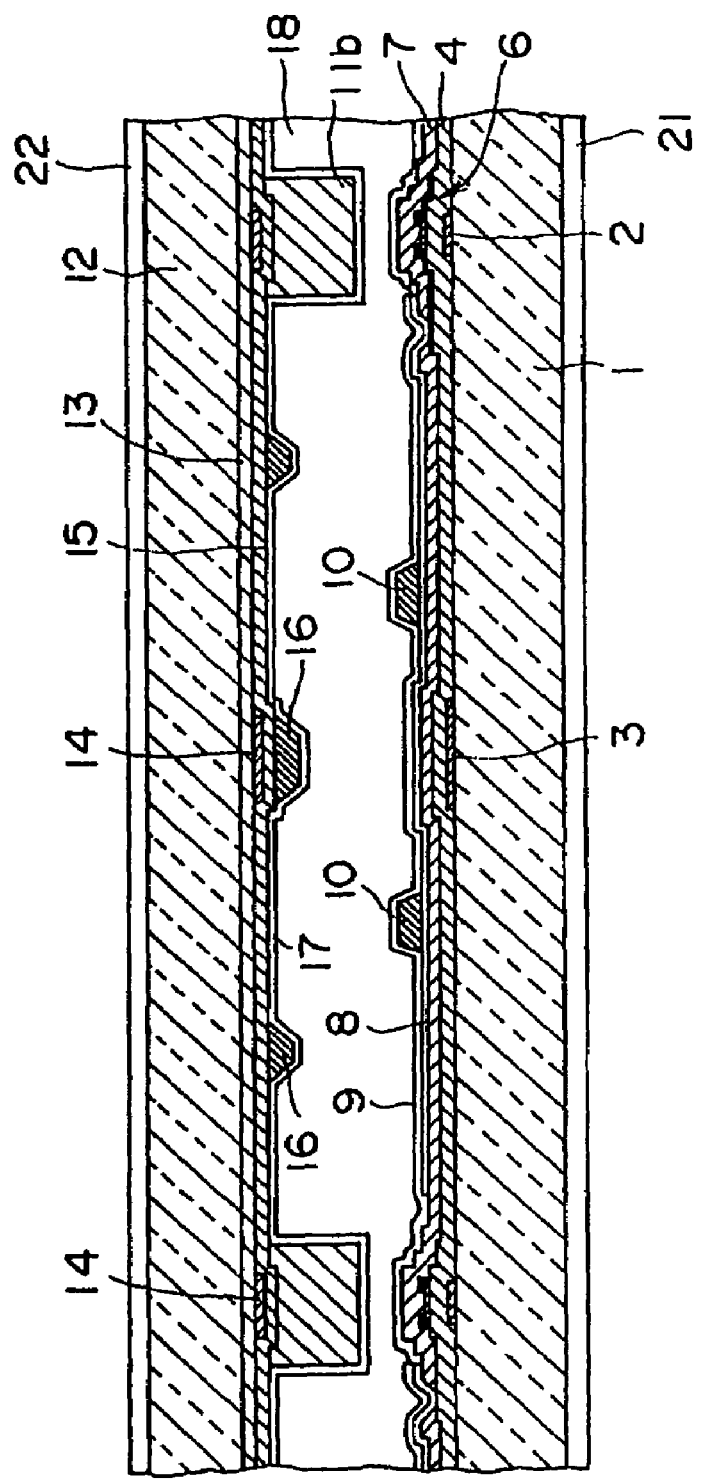
FIG. 22 is a sectional view showing the pixel area of the liquid crystal display device according to the second embodiment of the present invention, taken along a V-V line in FIG. 21.

The above descriptions are all directed to the embodiments in which the dielectric structures are formed on the first glass substrate 1 side, but the dielectric structures may be formed on the second glass substrate (opposing substrate) 12 side. For example, as shown in FIG. 22, such a structure may be employed that dielectric structures 11b are formed on the common electrodes 15 at positions to which the dielectric structures 11, 11a shown in FIG. 16 or FIG. 21 oppose, and then the alignment film 17 is formed thereon. In this case, an effect for fixing perfectly the capacitance Cgs between the gate and the pixel electrode and the capacitance Cds between the drain and the pixel electrode cannot be achieved, but an effect for suppressing the alignment change to the lowest minimum can be expected by the narrower cell gap effect. Such narrower cell gap effect remarkably appears by setting a thickness of the dielectric structure 11b to more than 1 µm, like the first embodiment.

Figure 23:
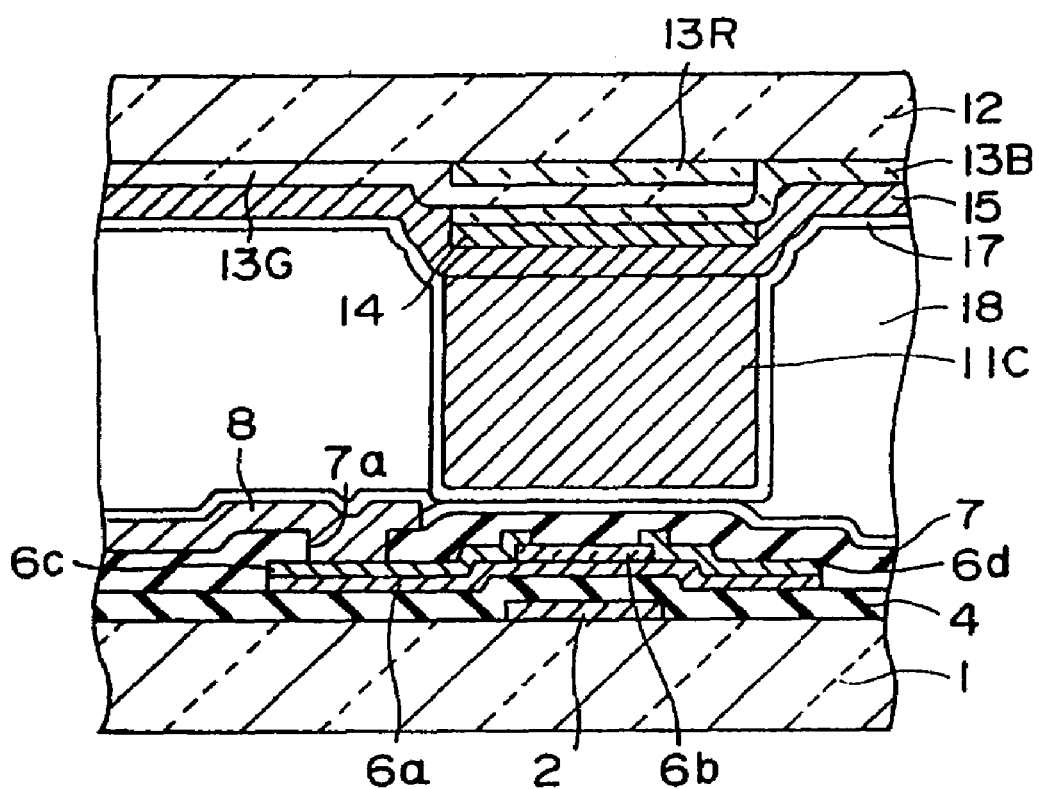
FIG. 23 is a sectional view showing a TFT and its neighboring area according to the second embodiment of the present invention, taken along a VI-VI line in FIG. 21.

Also, in the above examples, the dielectric structure is formed only by the resist, for example. In addition to this, as shown in FIG. 23, overlapped portions may be utilized as a part of the dielectric structure on the opposing substrate side by overlapping red, green, blue color filters 13R, 13G, 13B mutually on the boundary portions between the pixel areas respectively. Accordingly, the liquid crystal can be removed from the areas in which the alignment change is suppressed in the area other than the pixel electrodes 8, and thus change in the capacitance due to the alignment change is not generated. As a result, the similar effect to the first embodiment can be achieved.

As the areas in which the differently-colored color filters 13R, 13G, 13B are overlapped with each other, only the areas between the gate bus lines 2 and the pixel electrodes 8 or the areas between the drain bus lines 5 and the pixel electrodes 8 may be considered. In this case, the dielectric structure may be formed on the first glass substrate 1 so as to oppose to the overlapped portions of the differently-colored color filters 13R, 13G, 13B.

As shown in FIG. 23, a dielectric structure 11c may be formed on the overlapped portions of the red, green, blue color filters 13R, 13G, 13B, or may be omitted. However, in the case that the structure shown in FIG. 23 is employed, spacers (spherical or cylindrical spacers) interposed between the substrates can be omitted if the overlapped portions of the color filters 13R, 13G, 13B and the dielectric structures 11c formed thereon are employed as struts to maintain the cell gap.

In this case, the above dielectric structures may be formed on both the second glass substrate 12 side and the first glass substrate 1 side. Then, the cell gap may be maintained by the vertically-engaged dielectric structures. In addition, the variation of the common voltage of less than 10 mV and the flicker rate of less than 2% can be achieved by employing the optimum structure.

The structure in which at least one of the projection 10 on the first glass substrate 1 side and the projection 16 on the second glass substrate 12 side is not provided in the neighborhood of the area intersecting with the gate bus line 2, the structure in which at least one of them is not provided in the neighborhood of the area intersecting with the drain bus line 5, or the structure in which at least one of them is not provided in areas other than the pixel electrode 8 may be employed.

In the first embodiment and the second embodiment, the projections are employed as the means for defining the alignment direction of the liquid crystals. The slits may be formed on at least one of the pixel electrode and the common electrode in place of the projections.

The dielectric structure shown in the first embodiment and the second embodiment may be applied to not only the MVA mode liquid crystal display device but also other liquid crystal display devices. In this case, the slits formed in the pixel electrode 8 or the common electrode 15 may be used instead of either one of the projections 10 on the first glass substrate 1 side and the projections 16 on the second glass substrate 12 side.

As described above, according to the present invention, since the dielectric structures are arranged in the areas between the gate bus lines (first bus lines) and the pixel electrodes, both intersect with each other, or the areas between the drain bus lines (second bus lines) and the pixel electrodes, variation of the stray capacitance between them can be suppressed by fixing the dielectric constant between the pixel electrodes and the bus lines by the dielectric structures. Also, since the dielectric structures are also formed on the bus lines, the thickness of the liquid crystal layer in the dielectric structures can be reduced. As a result, the liquid crystal molecules in the liquid crystal layer is hardly moved from the vertical alignment and thus the variation of the stray capacitance can be extremely reduced. Besides, since a component of the stray capacitance over the bus lines fixed by the dielectric structures is increased, the variation of the stray capacitance can be reduced.

As mentioned above, since the pixel potential becomes constant by suppressing the variation of the stray capacitance, generation of the flicker can be prevented. In addition, the aperture ratio can be enhanced by reducing the width of the capacitive bus line to suppress the variation of the capacitance.

Third Embodiment

Figure 24:
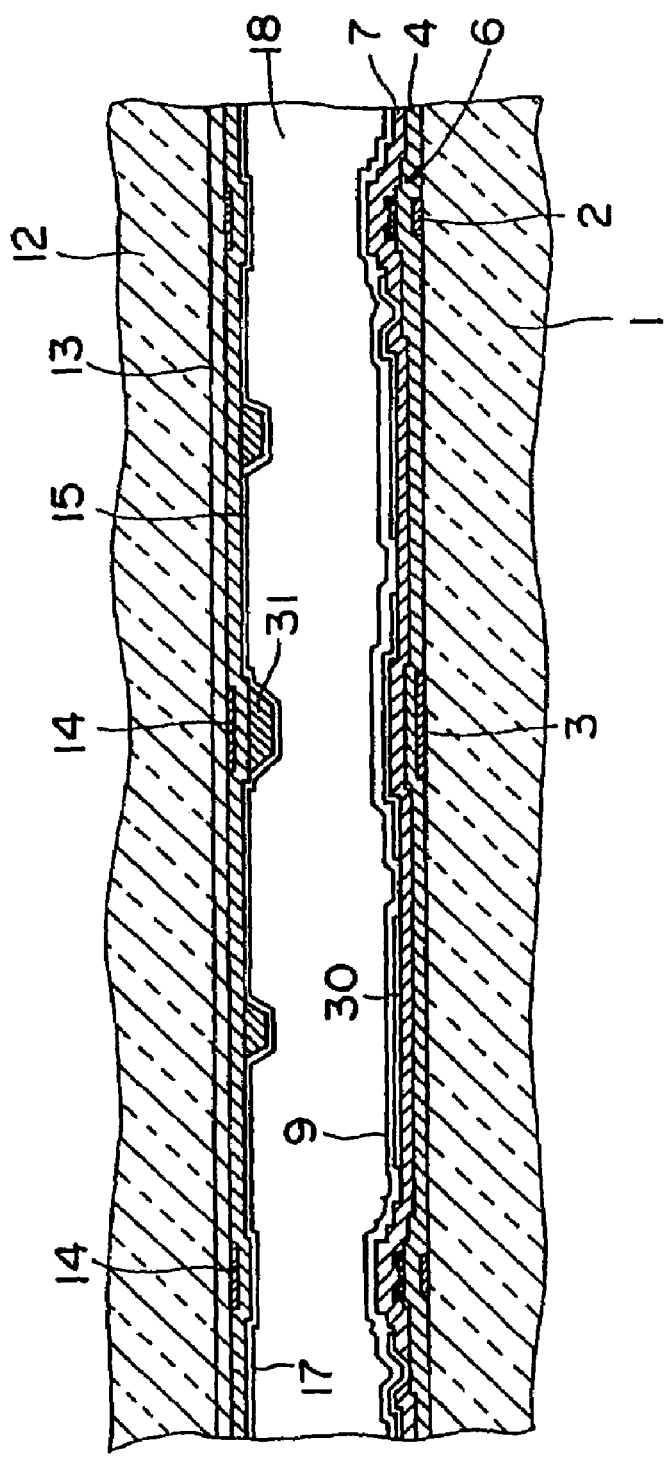
FIG. 24 is a sectional view showing a pixel area of a liquid crystal display device according to a third embodiment of the present invention.

FIG. 24 is a sectional view showing a third embodiment of the present invention, that has the similar structure to the first embodiment other than the pixel electrode, the projection, and the dielectric structure. In FIG. 24, same references as those in FIG. 17 denote same elements.

Figure 25:
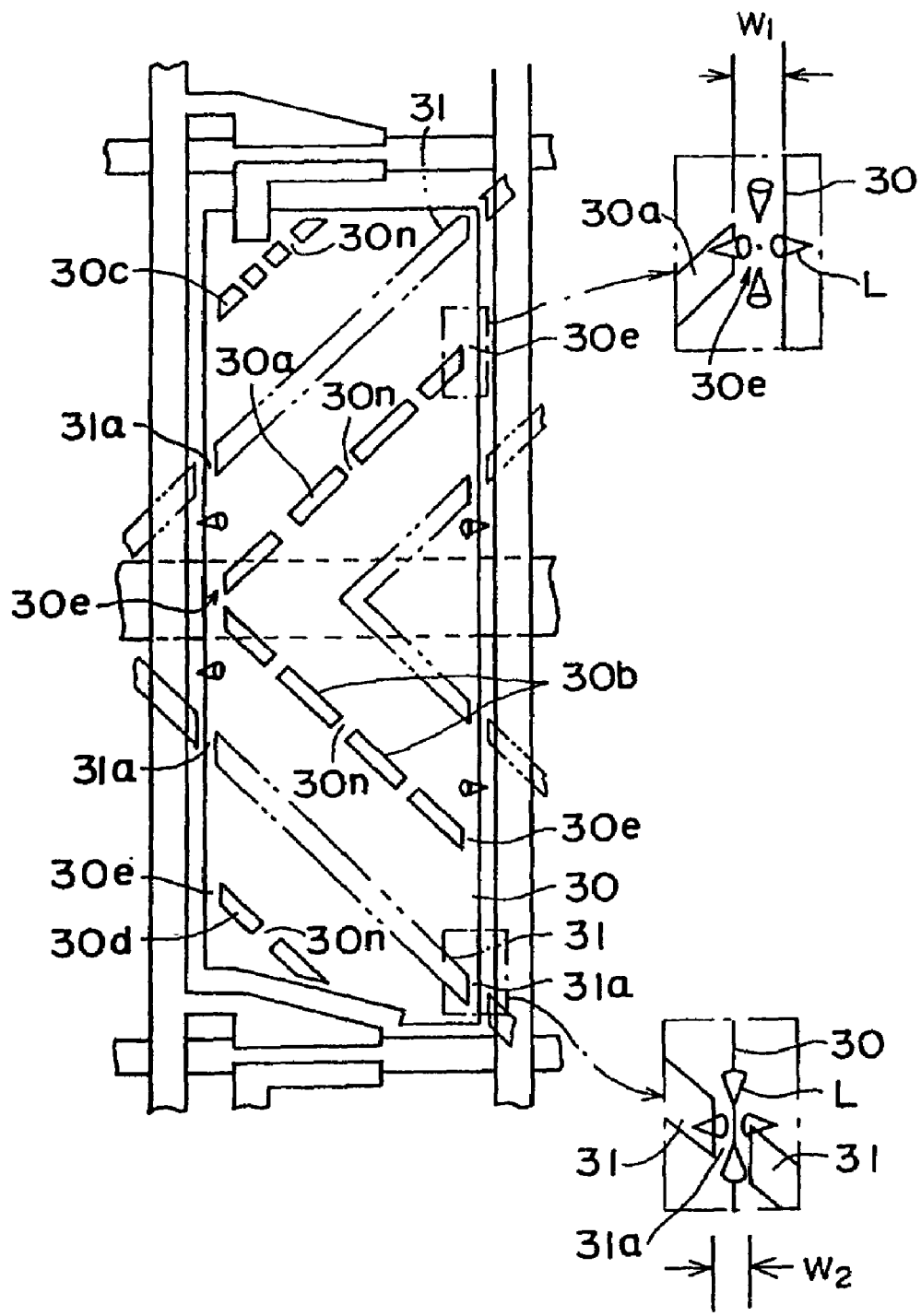
FIG. 25 is a plan view showing the pixel area of the liquid crystal display device according to the third embodiment of the present invention.

In FIG. 24, the gate bus line 2 and the capacitive bus line 3 are formed on the first glass substrate (TFT substrate) 1. Also, like the first embodiment, the drain bus line 5 and the thin film transistor (TFT) 6 are formed on the gate insulating film 4 that covers these bus lines 2, 3. The drain bus line 5 and the thin film transistor (TFT) 6 are covered with the protection insulating film 7, and then a pixel electrode 30 is formed on the protection insulating film 7. As shown in FIG. 25, the pixel electrode 30 is arranged in an area that is surrounded by the gate bus line 2 and the drain bus line 5.

Slits 30a, 30b that extend like the V-shape from edge areas of the pixel electrode 30 existing on the capacitive bus line 3 are formed in the pixel electrode 30. Slits 30c, 30d are formed in parallel with the slits 30a, 30b in the pixel electrode 30. The slit width is 10 µm, for example.

These slits (domain defining means) 30a to 30d divide the pixel electrode 30 into five areas. These areas are electrically connected mutually by connecting portions 30n that separate the slits 30a to 30d into plural areas.

In addition, connecting portions 30e used to connect electrically five areas divided by the slits 30a to 30d are formed within a predetermined width w1, e.g., within a range of 4 µm, from the edge of the pixel electrode 30. End portions of the slits 30a to 30d are separated by the connecting portions 30e.

Figure 26A:
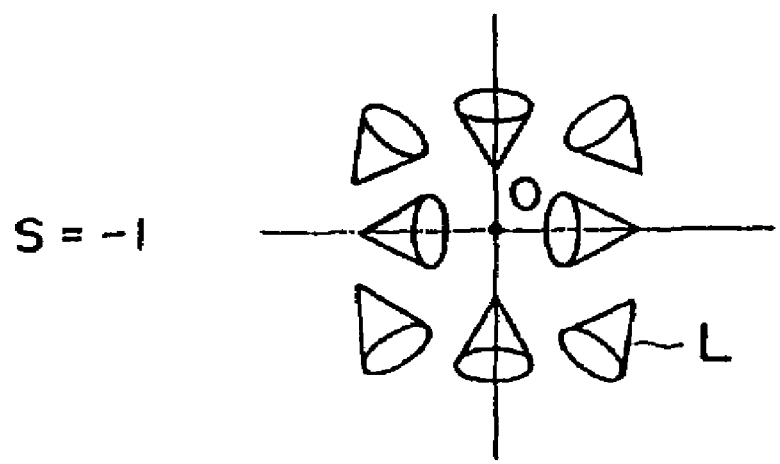
FIGS. 26A and 26B are views showing the alignment direction of the liquid crystal molecules at an alignment singular point according to the third embodiment of the present invention.
Figure 26B:
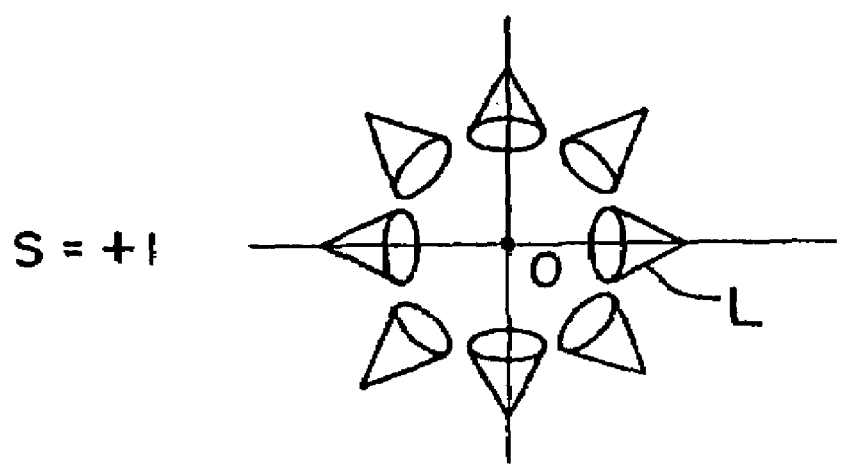

The connecting portions 30e acts as an alignment controlling means for forming an alignment singular point of s=−1. As shown in FIGS. 26A and 26B, according to the alignment controlling means having the alignment singular point of s=−1, the liquid crystal molecules L in one direction out of two orthogonally intersecting directions around a point O are aligned to direct to the point O while the liquid crystal molecules L in the other direction are aligned to direct to the opposite side to the point O. Also, the liquid crystal molecules L inclined to these directions by 45 degrees are directed to different directions respectively.

In this case, as shown in FIG. 26B, according to the alignment controlling means forming an alignment singular point of s=+1 described in following embodiments, all liquid crystal molecules L around the point O are aligned to direct to the point O.

As shown in FIG. 24, the above-mentioned pixel electrode 30 is connected to the TFT 6 and is covered with the alignment film 9.

Like the first embodiment, as shown in FIG. 24, the color filter 13, the black matrix 14, the common electrode 15, dielectric projections (domain defining means) 31, and the alignment film 17 are formed in sequence on the surface of the second glass substrate (opposing substrate) that is arranged to oppose to the pixel electrode 30.

As the alignment films 9, 17 on the first and second glass substrates 1, 12, JALS-684 (product name manufactured by JSR Inc.), for example, is employed.

Like the first embodiment, as indicated by a chain double-dashed line in FIG. 25, the dielectric projections 31 are formed in a zig-zag fashion to oppose to positions that pass through between the slits 30a to 30d of the pixel electrode 30. The projections 31 are formed by photosensitive acrylic resin PC-335 (product name manufactured by JSR Inc.), for example. Patterns of the projections 31 are formed by coating the photosensitive acrylic resin on the substrate by virtue of spin coating, then baking the resin at 90° C. for 20 minutes, then irradiating selectively the ultraviolet rays by using a photo mask, then developing the resin by an organic alkaline liquid developer (TMAHO, 2 wt %), and then baking the resin at 200° C. for 60 minutes. A width of the projection 31 is 10 μm and a height of the projection 31 is 1.5 μm.

A liquid crystal panel is formed by sticking the first glass substrate 1 and the second glass substrate 12 having the above structure together and then injecting the liquid crystal into a space between them. In this case, MJ961213 (product name manufactured by Merck Inc.) is employed as the liquid crystal material.

In the liquid crystal display device having the above configuration, the slits 30a to 30d of the pixel electrode 30 acting as the domain defining means are not formed at the edges of the pixel electrode 30 and its neighboring area, and the alignment singular points are formed there. Accordingly, difference of the domain states between the white monitored when the display of the pixel is changed from the black to the white and the white monitored when the display of the pixel is changed from the half tone to the white can be reduced to an unobtrusive level, so that the domain change can be reduced up to a undistinguishable level as the residual image.

Here, the domain defining means of the liquid crystal molecules is not limited to the linear slits in the pixel electrode. For example, the structure may be employed in which the linear dielectric projections like the first embodiment are provided in place of the slits on the pixel electrode. In this case, if the separated portions that are not intersected with the edges of the pixel electrode are formed as the projections, the alignment singular point of s=−1 is formed at the edge portion of the pixel electrode on the prolonged line of the projection.

Also, in place of forming the projections 31 on the common electrode 15 being formed on the opposing substrate 12 side, the slits may be formed in the common electrode 15.

Fourth Embodiment

In the third embodiment, the alignment singular point of s=−1 is formed at the intersecting portions between the structures or the slits formed on the pixel electrode and the edges of the pixel electrode. In contrast, in a fourth embodiment, such a configuration will be explained hereunder that the alignment singular point of s=+1 is formed at the intersecting portions between the structures or the slits formed on the substrate opposing to the substrate having the pixel electrode and the edges of the pixel electrode.

Figure 27:
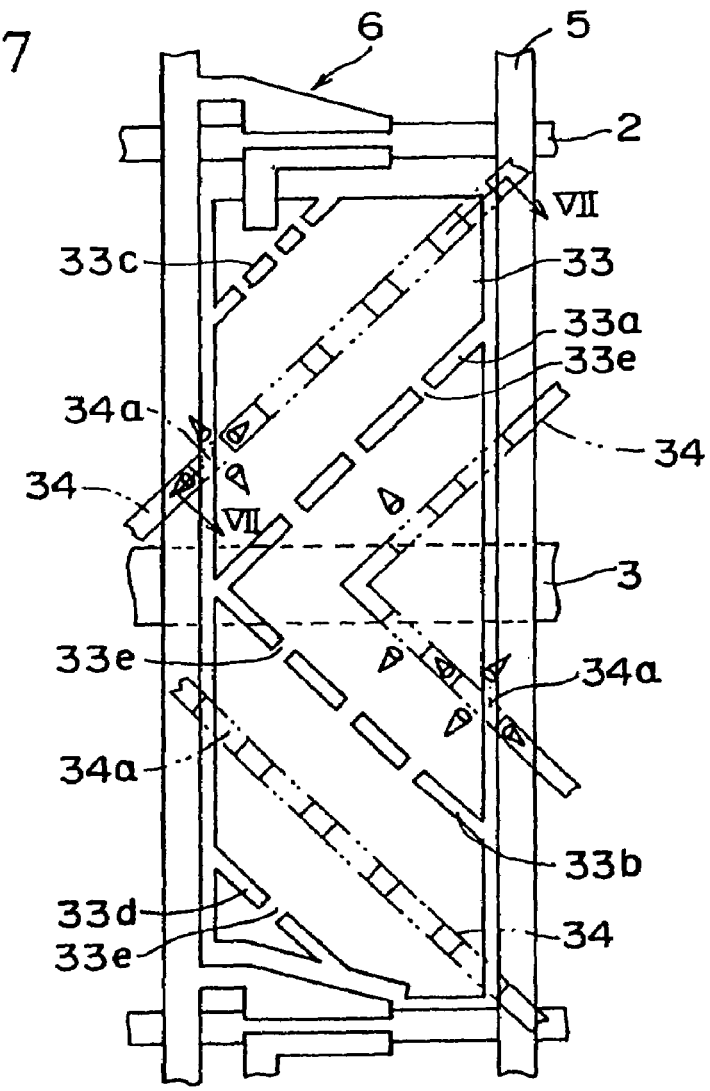
FIG. 27 is a plan view showing a pixel area of a liquid crystal display device according to a fourth embodiment of the present invention.
Figure 28:
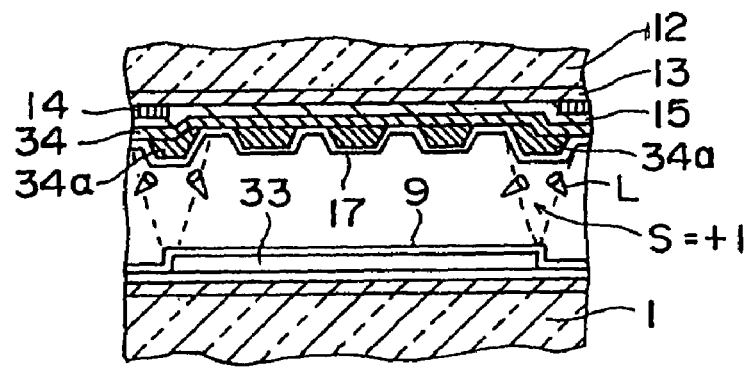
FIG. 28 is a sectional view showing the pixel area of the liquid crystal display device according to the fourth embodiment of the present invention, taken along a VII-VII line in FIG. 27.

FIG. 27 is a plan view showing the pixel area of the liquid crystal display device according to the fourth embodiment of the present invention. FIG. 28 is a sectional view taken along a VII-VII line in FIG. 27.

In FIG. 27, slits 33a, 33b that extend like the V-shape from the edge areas of the pixel electrode 33 existing on the capacitive bus line 3 are formed in the pixel electrode 33. Slits 33c, 33d are formed in parallel with these slits 33a, 33b in the area of the pixel electrode 33 near the gate bus line 2. The slit width is 10 μm, for example. The slits 33a to 33d are also formed on the edges of the pixel electrode 33. The slits 33a to 33d are separated by the connecting portions 33e.

Also, as shown in FIG. 27 and FIG. 28, in the dielectric projections (structures) 34 formed on the opposing substrate 12 side, the alignment singular point in the neighborhood of the edge of the pixel electrode 33 is formed as s=+1 by setting a portion 34a opposing to the edge of the pixel electrode 33 higher than other areas. A height of the portion of the projection 34 to oppose to the edge of the pixel electrode 33 is set to 2.5 μm, and a height of other portion is set to 1.5 μm.

The projections 34 are formed of the same constituent material as the projections 31 in the third embodiment. First, the pattern of the projections 34 are formed on the common electrode 15 to have a height of 1.5 μm, and then projections 34a of 1.0 μm height is selectively stacked in areas opposing to the edges of the pixel electrode 33.

In this manner, since a portion of the projection 34 on the opposing substrate 12 side, that opposes to the edge of the pixel electrode 33, is set higher than other portions, the alignment singular point of s=+1 is formed on the edge of the pixel electrode 33, as shown in FIG. 27 and FIG. 28. As a result, the influence of the alignment of the liquid crystal molecules L at the edge of the pixel electrode 33 upon the liquid crystal molecules at the inside of the pixel electrode 33 can be prevented by the alignment singular point, so that generation of the residual images caused when the display is changed from the half tone display to the white display can be prevented.

In the case that the slits are formed in the common electrode 15 on the opposing substrate 12 in place of the projections 34, the similar operation and effect can be achieved if such slits are divided at portions opposing to the pixel electrode 33.

By the way, a combination of the TFT substrate in the third embodiment and the opposing substrate in the fourth embodiment can provide the best structure. More particularly, the preferable structure can be obtained by separating the linear slits or the linear projections formed on the TFT substrate side not to intersect with the edge of the pixel electrode and also separating the linear slits in the common electrode on the common electrode side not to intersect with the pixel electrode or forming portions of the linear projections, that oppose to the edge of the pixel electrode, on the common electrode side thicker than other portions.

Fifth Embodiment

In the third embodiment, bending portions of the slits formed on the pixel electrode, i.e., intersecting portions of prolonged lines of the slits in two directions are formed to coincide with the edge of the pixel electrode. In this case, such intersection points may be shifted inward from the edge of the pixel electrode.

Figure 29:
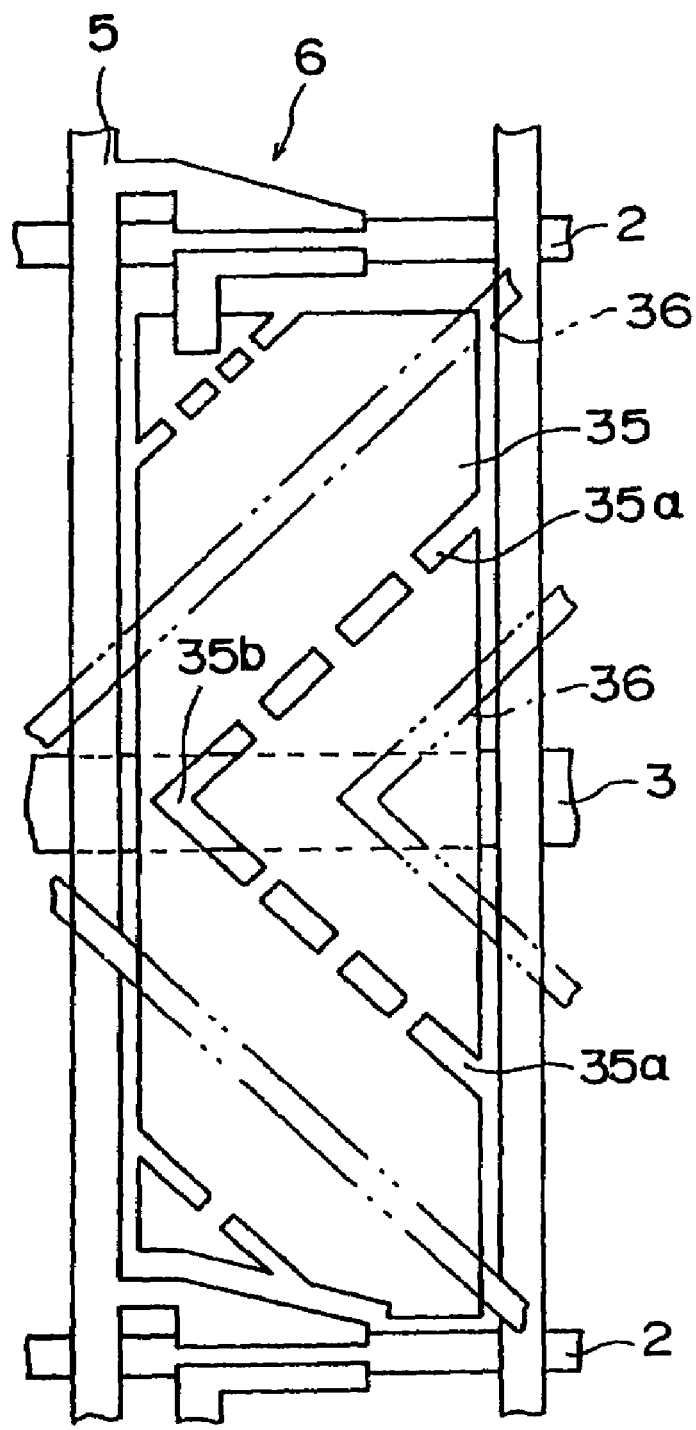
FIG. 29 is a plan view showing a pixel area of a liquid crystal display device according to a fifth embodiment of the present invention.

FIG. 29 is a plan view showing a pixel electrode and its neighboring area of a liquid crystal display device according to a fifth embodiment of the present invention.

In FIG. 29, a bending portion 35b of a slit 35a opened in the pixel electrode 35 is formed to retreat inward from the edge of a pixel electrode 35. For example, a distance from the bending portion 35b to the edge of the pixel electrode 35 is set to 4 μm and a width of the slit 35a is set to 10 μm.

Also, like the first embodiment, projections 36 are formed on the opposing substrate 12 side at positions passing through between the slits 35a.

According to this, the influence of the electric field by the edge of the pixel electrode 35 upon the bending portion 35b of the slit 35a can be reduced and thus generation of the residual images can be suppressed.

In FIG. 29, the structure in which the slits are formed in the pixel electrode 35 is employed. In the event that the dielectric projections are formed on the pixel electrode 35 instead of the slits like the first embodiment, the influence of the electric field by the edge of the pixel electrode 35 upon the bending portion of the projections can be reduced and thus generation of the residual images can be suppressed if the bending portions of the projections are formed to retreat inward from the edge of the pixel electrode.

Figure 30:
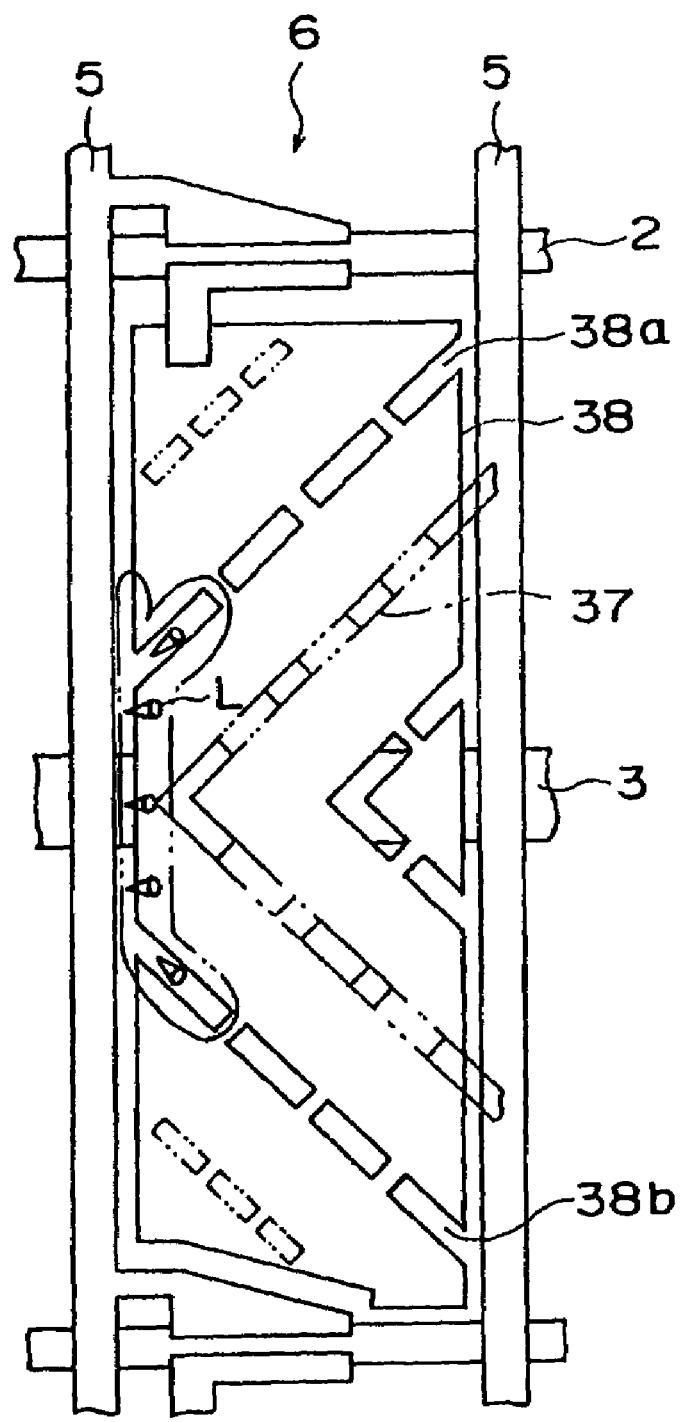
FIG. 30 is a plan view showing another pixel area of the liquid crystal display device according to the fifth embodiment of the present invention.

Also, as shown in FIG. 30, for example, as the shape of a dielectric projection 37 formed as the alignment controlling means on the opposing substrate 12, if the projection 37 is bent in the area opposing to the pixel electrode such that the bending portion is arranged to be shifted inward from the edge of a pixel electrode 38, the influence of the electric field by the edge of the pixel electrode 38 upon the bending portion can be reduced and thus the residual image suppressing effect can be achieved. In this case, for example, a width of the projection 37 is set to 10 μm and a distance from the bending portion to the edge of the pixel electrode 38 is set to 4 μm.

It may be considered that the slits are formed in the common electrode 15 shown in FIG. 24 as the alignment controlling means on the opposing substrate 12 in place of the dielectric projections 37. However, since normally the color filter 13 is formed under the common electrode 15, it is not preferable from aspects of precision and reliability to form the slit in the common electrode 15.

In FIG. 30, because the bending portions (intersecting portions) of the slits 38a, 38b formed on the pixel electrode 38 to extend in two directions are positioned on the outside of the pixel electrode 38, the influence of the electric field by the edge of the pixel electrode 38 upon the bending portions can be eliminated. Accordingly, generation of the alignment state that is different from the essential alignment control and generated by the projections or the slits can be reduced, and also the residual images caused when the display is changed from the half tone display to the white display can be eliminated.

Sixth Embodiment

Figure 31A:
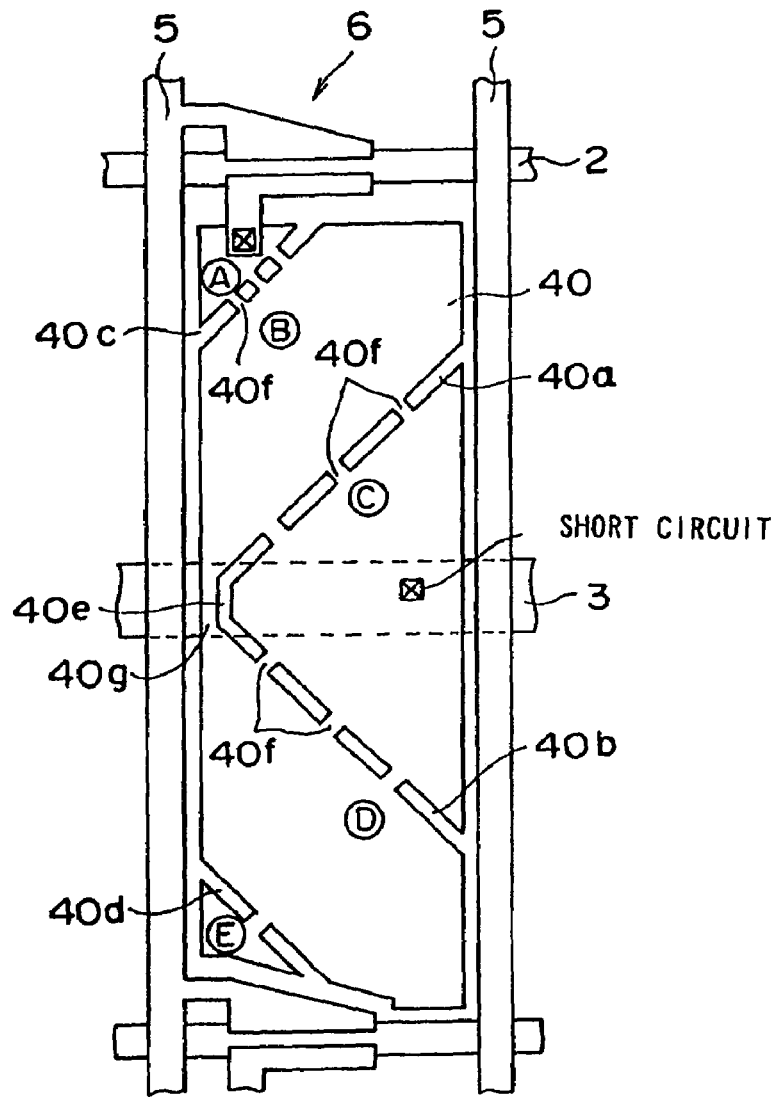
FIG. 31A is a plan view showing a pixel area of a liquid crystal display device according to a sixth embodiment of the present invention.

FIG. 31A is a plan view showing a pixel electrode and its neighboring area of a liquid crystal display device according to a sixth embodiment of the present invention.

In FIG. 31A, such a structure is employed that intersecting portions of a first slit 40a and a second slit 40b, that are formed like a V-shape near the center of a pixel electrode 40, are connected via a slit 40e, that is formed in parallel with the edge of the pixel electrode 40, at a position inner than the edge. A distance of a clearance 40g between the slit 40e and the edge of the pixel electrode 40 is set to 4 μm, for example.

Also, third and fourth slits 40c, 40d are formed in the pixel electrode 40 near the gate electrode 2.

These first to fourth slits 40a to 40d are separated by connecting portions 40f at plural portions. Therefore, the pixel electrode 40 is divided into five areas A to E by the first to fourth slits 40a to 40d, and these areas A to E are electrically connected by the connecting portions 40f.

The area C divided by the first and second slits 40a, 40b is opposed electrically and structurally to the storage capacitance forming electrode (capacitive bus line) 3. Also, at least two electrical connecting paths are opposed electrically to the storage capacitance forming electrode 3.

Figure 31B:
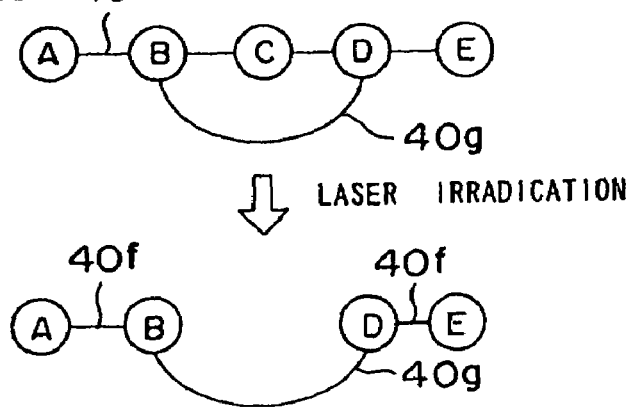
FIG. 31B is a view showing connection between areas in the pixel electrode in the pixel area.

Accordingly, as shown in FIG. 31B, the area B and the area D of the pixel electrode 40 are connected via two routes of a route B-C-D and a route B-D. Then, if the area C of the pixel electrode 40 and the storage capacitance forming electrode 3 are short-circuited, four areas A, B, D, E of the pixel electrode 40 can be electrically connected via the existing connecting portion 40f and the clearance 40g by disconnecting the electrical connections of B-C and C-D by the laser irradiation onto the connection portion 40f. Therefore, it is possible to drive the liquid crystal molecules in most portions other than the area C.

Such pixels that can be driven in areas other than such area C have slightly different display characteristic in contrast to the normal state in which the area C of the pixel electrode 40 and the storage capacitance forming electrode 3 are not short-circuited. However, since such different display can be improved up to a level to clear the display defect standard according to the number of defective pixels and the generation location, the improvement in yield of the TFT substrate can be achieved. This can be attained by such a structure that plural areas of the pixel electrode divided by the slits are connected the edge portion of the pixel electrode, whereby this respect is different from the structure in the prior art.

In this case, if the pixel electrode 40 is divided into at least three areas by the first and second slits 40a, 40b, for example, such yield improving effect can be attained.

Next, change of the domain on the slits when the present invention is applied will be explained with reference to FIGS. 32A and 32B hereunder.

Figure 10A:
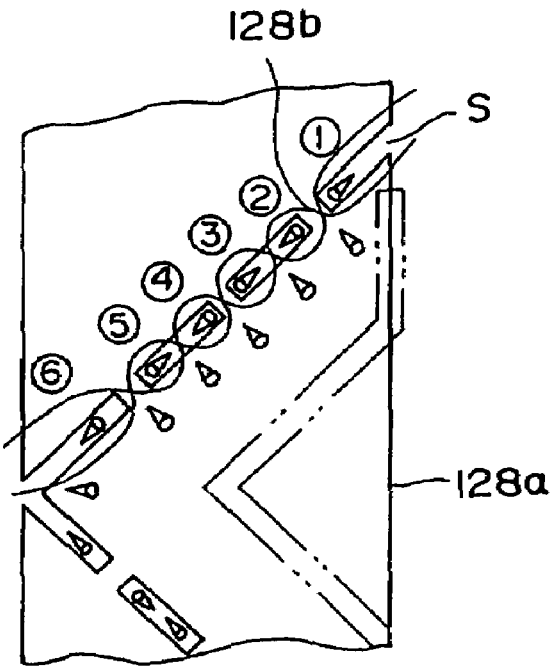
FIGS. 10A and 10B are views showing changes in the alignment direction of liquid crystal molecules in the MVA liquid crystal panel in the prior art.
Figure 10B:
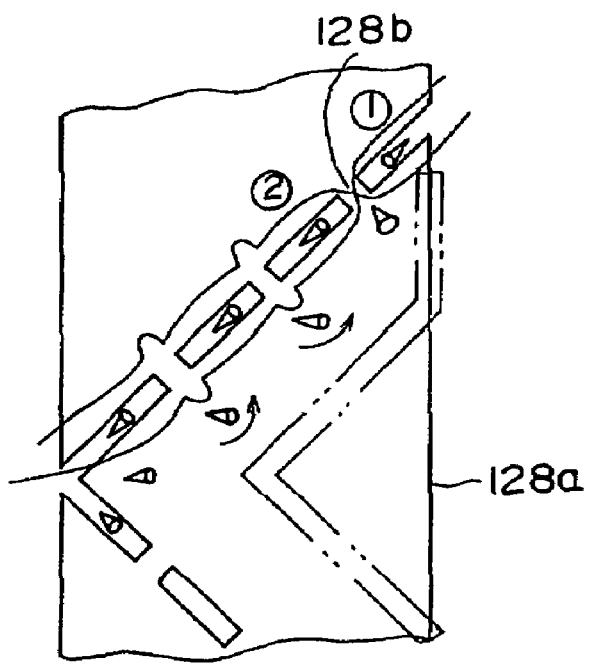
Figure 11:
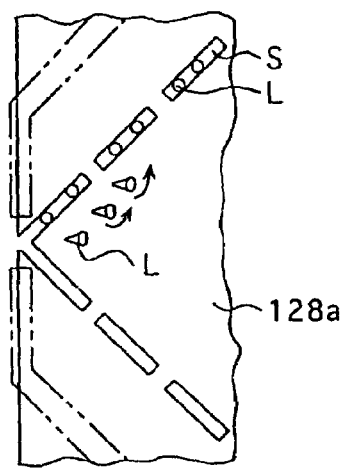
FIG. 11 is a view showing the alignment direction of the liquid crystal molecules in half tone display of the MVA mode in the prior art.
Figure 12:
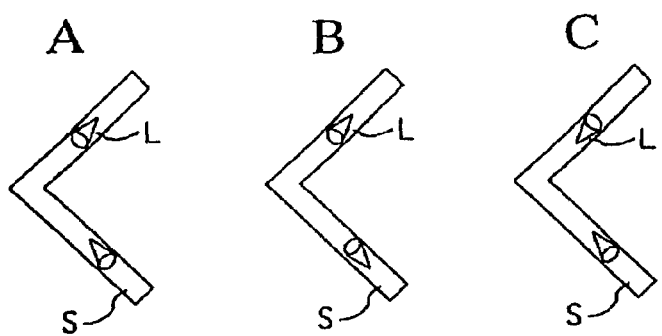
FIGS. 12A to 12C are views showing combinations of the alignment direction of the liquid crystal molecules on a slit on a pixel electrode in the MVA mode in the prior art.
Figure 13:
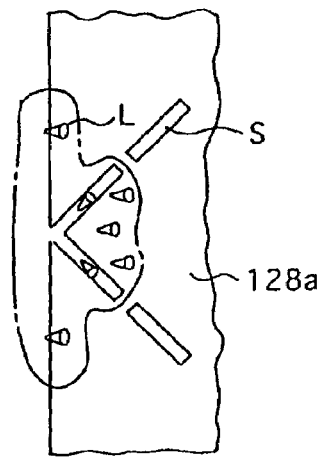
FIG. 13 is a view showing the alignment direction of the liquid crystal molecules in vicinity of an edge of the pixel electrode after the liquid crystal display in the VA mode in the prior art is changed from the half tone display to the white display.
Figure 14A:
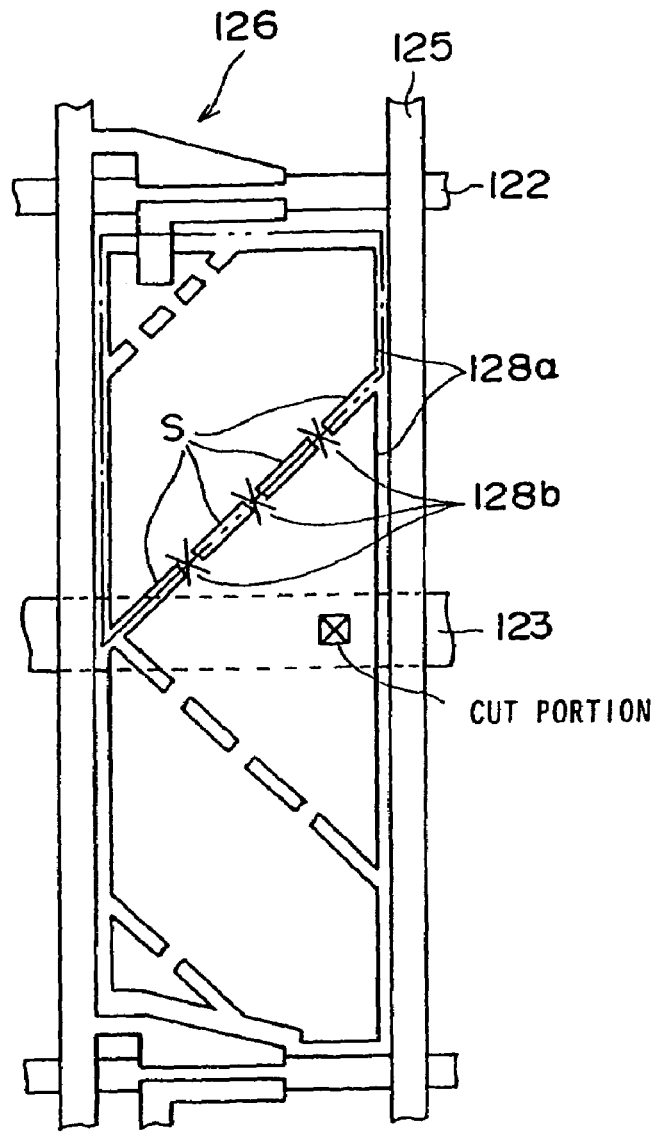
FIG. 14A is a plan view showing a cut-off state of the pixel electrode in the VA mode in the prior art.
Figure 14B:
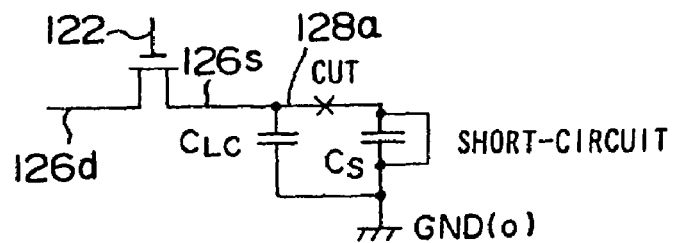
FIG. 14B is an equivalent circuit diagram in this state.
Figure 32A:
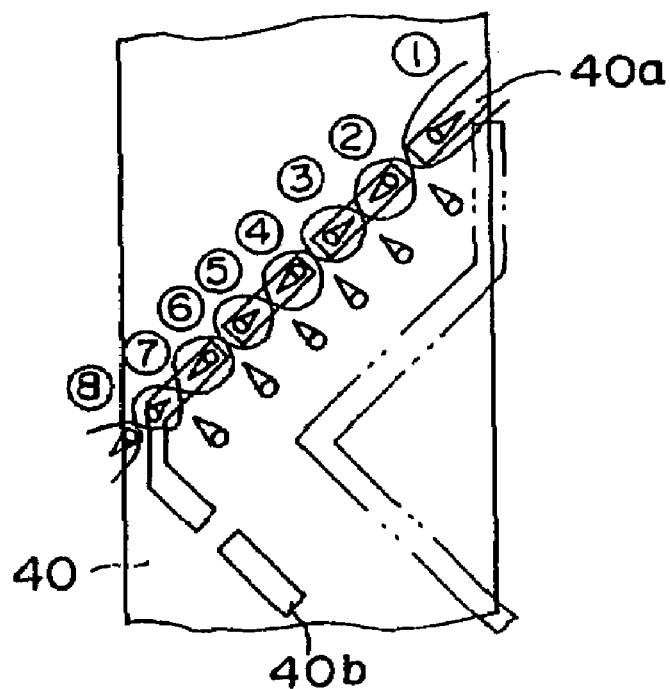
FIGS. 32A and 32B are views showing an example of an effect achieved by the sixth embodiment of the present invention.

First, as shown in FIG. 32A, when the display is changed from the black display to the white display, the number of domains divided by the connecting portions on the slit 40a is eight such as ① to ⑧. Also, according to FIG. 32A, the domains ⑧ and ⑨ are increased in number rather than the prior art shown in FIG. 10A. This is because the singular point s=−1 of the alignment vector is formed at the edge of the pixel electrode.

Figure 32B:
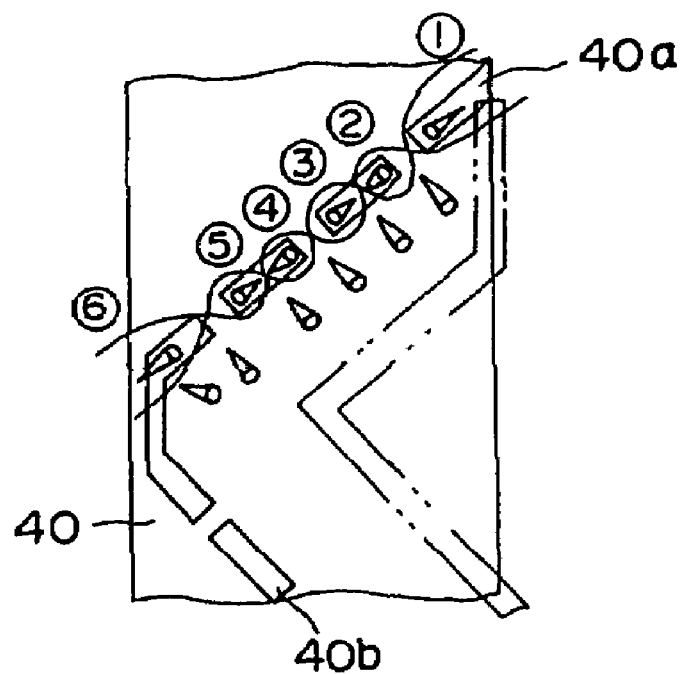

Then, as shown in FIG. 32B, when the display is changed from the black display to the white display via the half tone display, the domains ⑥ and ⑧ are connected and thus the domain ⑦ disappears. In other words, the change of domains on the slits can be suppressed at a very small level rather than FIG. 10A in the neighborhood of the edge of the pixel electrode.

According to the present invention, in the display mode in which the liquid crystal molecules alignment is controlled by the structures or the slits provided on the substrate, the improvement of the response characteristic can be achieved by forming the alignment singular points, at which the liquid crystal molecules become s=−1 or s=+1, on the intersecting portions between the prolonged lines of the structures or the slits and the pixel electrode, etc.

Besides, in the present invention, two routes, i.e., the route passing through the area in which the storage capacitance forming electrode and the capacitance are formed and the route not passing through such area are provided as the electrical connecting paths of the pixel electrode. Therefore, if the electric short-circuit between the storage capacitance forming electrode and the pixel electrode is generated, the area in which the capacitance is formed can be disconnected electrically from other areas, and thus other areas can be employed as the area in which the liquid crystal molecules can be driven. As a result, the improvement in yield of the TFT substrate manufacture can be achieved.

Seventh Embodiment

Next, a liquid crystal display device according to a seventh embodiment of the present invention will be explained with reference to FIG. 33 to FIG. 36 hereunder.

Figure 33:
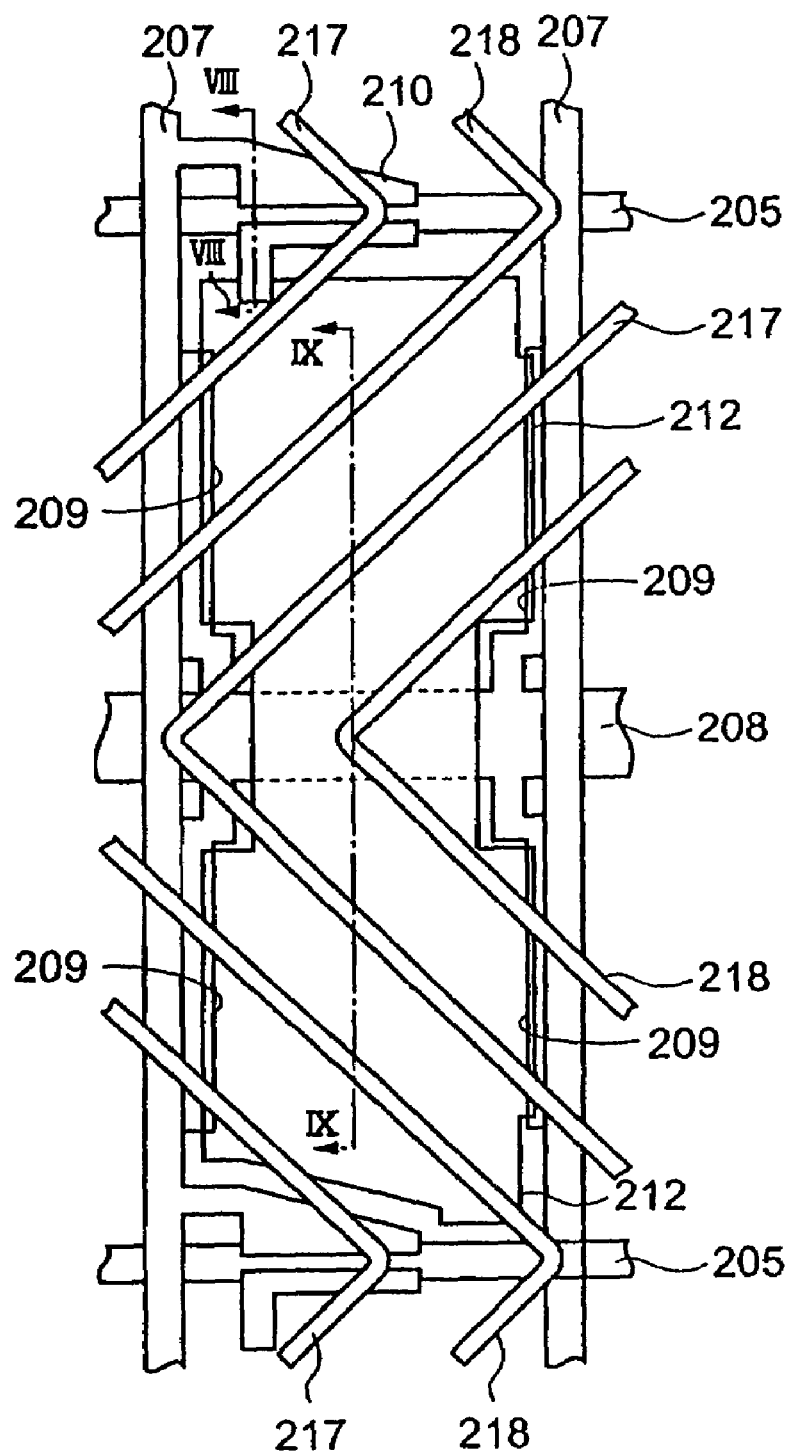
FIG. 33 is a plan view showing an MVA liquid crystal display device according to a seventh embodiment of the present invention.

FIG. 33 is a plan view showing an MVA liquid crystal display device according to the seventh embodiment. A plurality of gate bus lines 205 are formed to extend along the row direction (lateral direction) in FIG. 33. A capacitive bus line 208 extending in the row direction is arranged between two neighboring gate bus lines 205. The gate bus lines 205 and the capacitive bus lines 208 are covered with an insulating film. A plurality of drain bus lines 207 that extend along the column direction (longitudinal direction) in FIG. 33 are arranged on this insulating film.

TFTs 210 are provided to correspond to intersecting portions between the gate bus line 205 and the drain bus line 207. A drain region of the TFT 210 is connected to the corresponding drain bus line 207. The gate bus line 205 is also used as a gate electrode of the corresponding TFT 210.

The drain bus lines 207 and the TFTs 210 are covered with an interlayer insulating film. A pixel electrode 212 is arranged in an area surrounded by two gate bus lines 205 and two drain bus lines 207. The pixel electrode 212 is connected to a source region of the corresponding TFT 210.

Auxiliary capacitive branch lines 209 branched from the capacitive bus lines 208 extend along the edge of the pixel electrode 212. The capacitive bus lines 208 and the auxiliary capacitive branch lines 209 constitute an auxiliary capacitance between the pixel electrodes 212. The potential of the capacitive bus lines 208 is fixed at any potential.

When the potential of the drain bus line 207 is varied, the potential of the pixel electrode 212 is also varied by the capacitive coupling due to the stray capacitance. In the configuration in FIG. 33, since the pixel electrode 212 is connected to the capacitive bus lines 208 via the auxiliary capacitance, variation in the potential of the pixel electrode 212 can be reduced.

TFT substrate side projections 217 and CF substrate side projections 218 are formed on the opposing surfaces of the TFT substrate and the opposing substrate (the opposing substrate is called a color filter (CF) substrate in some cases since normally the color filter is provided on the opposing substrate side) along zig-zag patterns extending along the column direction respectively. The TFT substrate side projections 217 are arranged at an equal distance in the row direction, and bending points are positioned on the gate bus line 205 and the capacitive bus lines 208. The CF substrate side projection 218 has an almost congruent pattern to the TFT substrate side projection 217 and is arranged in the almost middle of two neighboring TFT substrate side projections 217. The projections 217 and 218 have a width of about 10 μm respectively.

The polarizing plates are arranged on both sides of the liquid crystal cell. The polarizing plates are cross-nicol-arranged such that their polarization axes intersect with straight portions of the projections 217, 218 by an angle of 45 degrees.

Figure 34:
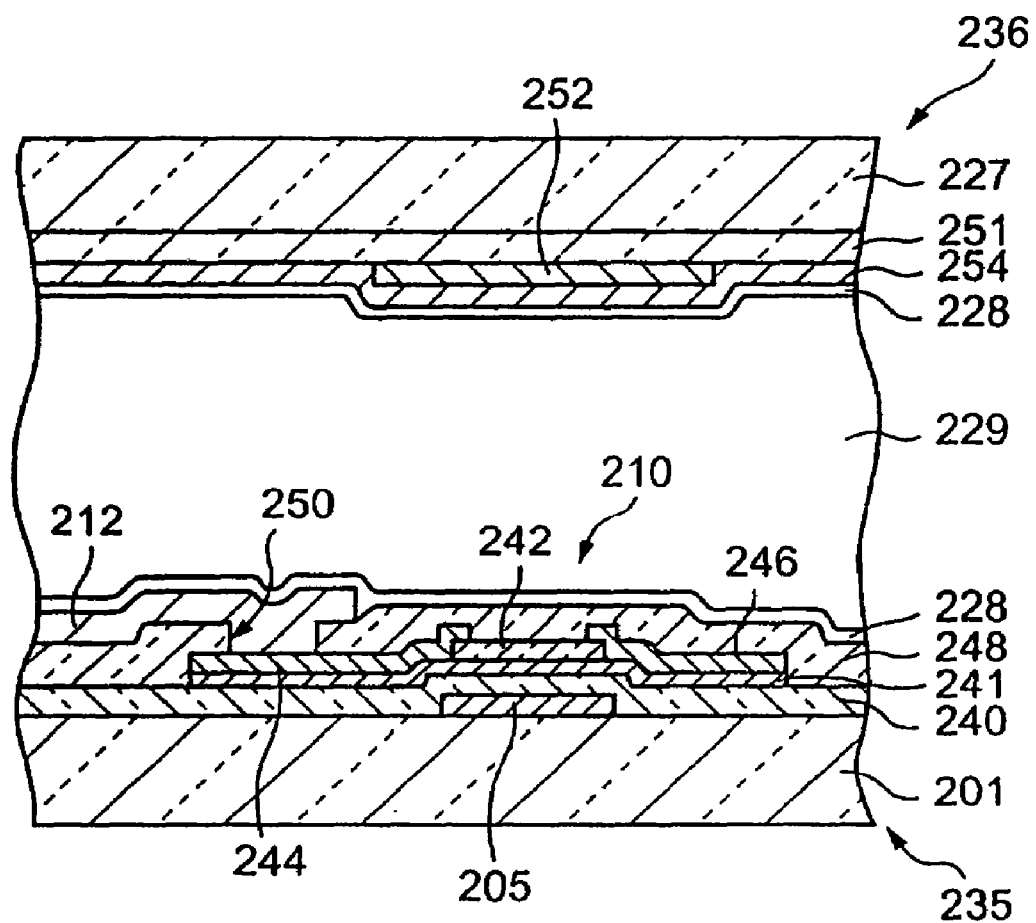
FIG. 34 is a sectional view showing a TFT portion of the MVA liquid crystal display device according to the seventh embodiment of the present invention.
Figure 35:
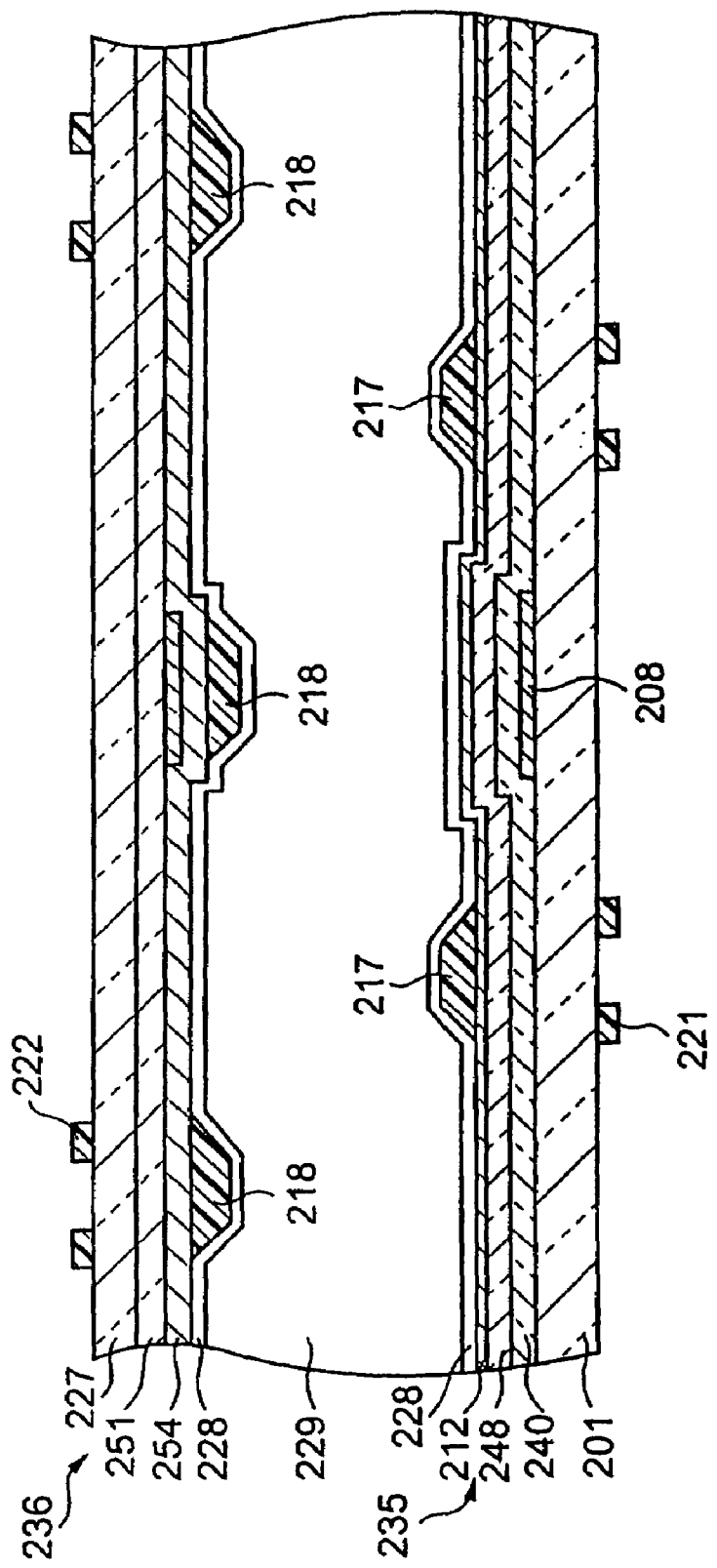
FIG. 35 is a sectional view showing a pixel electrode portion of the MVA liquid crystal display device according to the seventh embodiment of the present invention.

FIG. 34 is a sectional view showing the TFT portion taken along a VIII-VIII line in FIG. 33, and FIG. 35 is a sectional view showing the pixel electrode portion taken along a IX-IX dot-dash line in FIG. 33. The TFT substrate 235 and the opposing substrate 236 are arranged in parallel at a distance. Liquid crystal material 229 is filled between the TFT substrate 235 and the opposing substrate 236. The liquid crystal molecules in the liquid crystal material 229 have the negative dielectric anisotropy.

As shown in FIG. 34, the gate bus lines 205 are formed on the opposing surface of the glass substrate 201. The gate bus lines 205 are formed by depositing an Al film of 100 nm thickness and a Ti film of 50 nm thickness by virtue of the sputtering and then patterning these two layers. The etching of the Al film and the Ti film is carried out by the RIE using a mixed gas of $BCl_3$ and $Cl_2$.

A gate insulating film 240 is formed on the glass substrate 201 to cover the gate bus lines 205. The gate insulating film 240 is formed of an SiN film of 400 nm thickness, and is formed by the PE-CVD method. An active area 241 is arranged on a surface of the gate insulating film 240 to cross the gate bus line 205. The active area 241 is formed of an undoped amorphous Si film of 30 nm thickness, and is formed by the PE-CVD method. A surface of the active area 241 over the gate bus lines 205 is covered with a channel protection film 242. The channel protection film 242 is formed of an SiN film of 140 nm thickness. The channel protection film 242 is patterned to cover the channel region of the TFT 210 in FIG. 33.

Formation of the channel protection film 242 is carried out by the following method. First, a surface of the SiN film formed on the overall surface of the substrate is covered with the photoresist film. An edge of the resist pattern parallel to the row direction in FIG. 33 can be defined by exposing the photoresist from a back surface of the glass substrate 201 using the gate bus lines 205 as a photo mask. An edge of the resist pattern parallel to the column direction in FIG. 33 can be defined by exposing the photoresist using the normal photo mask.

After the photoresist film is developed, the SiN film is patterned by-etching the photoresist film using the buffer hydrofluoric acid etchant. In this case, the SiN film may be patterned by the RIE using a fluorine group gas. After the SiN film is patterned, the resist pattern is removed. The channel protection film 242 is formed by the steps performed until now.

A source electrode 244 and a drain electrode 246 are formed on the upper surface of the active area 241 on both side areas of the channel protection film 242 respectively. Both the source electrode 244 and the drain electrode 246 have a laminated structure which is formed by laminating an $n^+$-type amorphous Si film of 30 nm thickness, a Ti film of 20 nm thickness, an Al film of 75 nm thickness, and a Ti film of 80 nm thickness in sequence. The TFT 210 consists of the gate bus line 205, the gate insulating film 240, the active area 241, the source electrode 244 and the drain electrode 246.

The active area 241, the source electrode 244 and the drain electrode 246 are patterned by using one etching mask. The etching of these films is carried out by the RIE using the mixed gas of $BCl_3$ and $Cl_2$. At this time, the channel protection film serves as an etching stopper over the gate bus line 205.

The pixel electrode 212 is formed on the protection insulating film 248. The pixel electrode 212 is formed of an ITO film of 70 nm thickness, and is connected to the source electrode 244 via a contact hole 250 provided in the protection insulating film 248. Formation of the ITO film is performed by the DC magnetron sputtering. The patterning of the ITO film is performed by the wet etching using the oxalic acid group etchant. The pixel electrode 212 and the protection insulating film 248 are covered with an alignment film 228.

Then, a configuration of the opposing substrate 236 will be explained hereunder. A color filter 251 is formed on the opposing surface of the glass substrate 227. A light shielding film 252 made of Cr, etc. is formed on a surface of the color filter 251 in an area opposing to the TFT 210. A common electrode 254 made of ITO is formed on the surface of the color filter 251 to cover the light shielding film 252. A surface of the common electrode 254 is covered with the alignment film 228.

The pixel electrode portion shown in FIG. 35 will be explained hereunder. The capacitive bus line 208 is formed on the surface of the glass substrate 201. The capacitive bus line 208 is formed by the same steps as those applied to the gate bus line 205 shown in FIG. 34. The gate insulating film 240 and the protection insulating film 248 are formed on the surface of the glass substrate 201 to cover the capacitive bus line 208. The pixel electrode 212 is formed on the surface of the protection insulating film 248.

The TFT substrate side projections 217 are formed on the surface of the pixel electrode 212. The TFT substrate side projections 217 are formed by coating the polyimide-based photoresist and then patterning the resist film, as shown in FIG. 33. The surfaces of the TFT substrate side projections 217 and the pixel electrodes 212 are covered with the alignment film 228.

The color filter 251 is formed on the opposing surface of the glass substrate 227 opposing to the TFT substrate 235. The light shielding film 252 is formed on a part of the surface of the color filter 251. The common electrode 254 is formed on the surface of the color filter 251 to cover the light shielding film 252. The CF substrate side projections 218 are formed on the surface of the common electrode 254. The CF substrate side projections 218 are formed by the same method as the formation of the TFT substrate side projections 217. The surfaces of the CF substrate side projections 218 and the common electrode 254 are covered with the alignment film 228.

In order to execute the image display, a constant common voltage is applied to the common electrode 254 and a image signal whose polarity is inverted frame by frame is applied to the pixel electrode 212. If the voltage applied to the liquid crystal layer when the pixel electrode 212 is positive for the common electrode 254 is equal to that applied to the liquid crystal layer when the pixel electrode 212 is negative for the common electrode 254, the transmittance obtained when the pixel electrode 212 has a positive polarity becomes equal to that obtained when the pixel electrode 212 has a negative polarity. Thus, the stable display can be derived.

Compensating members 221 having the refractive anisotropy are formed on a surface of the glass substrate 201 on the opposite side to the opposing surface. If viewed along the normal direction of the substrate, the compensating members 221 are formed along the edge of the TFT substrate side projections 217 or to overlap substantially with their inclined surfaces. The liquid crystal molecules in the neighborhood of the edges of the TFT substrate side projections 217 are tilted against the substrate surface by the influence of the inclined surfaces of the projections 217. The tilt has the double refraction effect on the light transmitted in the thickness direction of the liquid crystal layer. The compensating members 221 have the refractive anisotropy to reduce this double refraction effect. Similar compensating members 222 are formed on the surface on the opposite side to the opposing surface so as to correspond to the projections 218.

In the dark state, the double refraction effect caused by the liquid crystal layer in the neighborhood of the edges of the projections 217, 218 is canceled by the double refraction effect caused due to the refractive anisotropy of the compensating members 221 and 222. Therefore, leakage lights in the neighborhood of the edges of the projections 217, 218 in the dark state can be reduced.

In order to sufficiently compensate the double refraction effect when viewed from the oblique direction, it is preferable that the glass substrates 101, 227 should be formed as thin as possible. The case where the glass substrate is employed is explained with reference to FIG. 34 and FIG. 35. However, even if a thin film substrate of about several tens μm thickness is employed in place of the glass substrate, the double refraction effect can be sufficiently compensated in the oblique direction.

Figure 36:
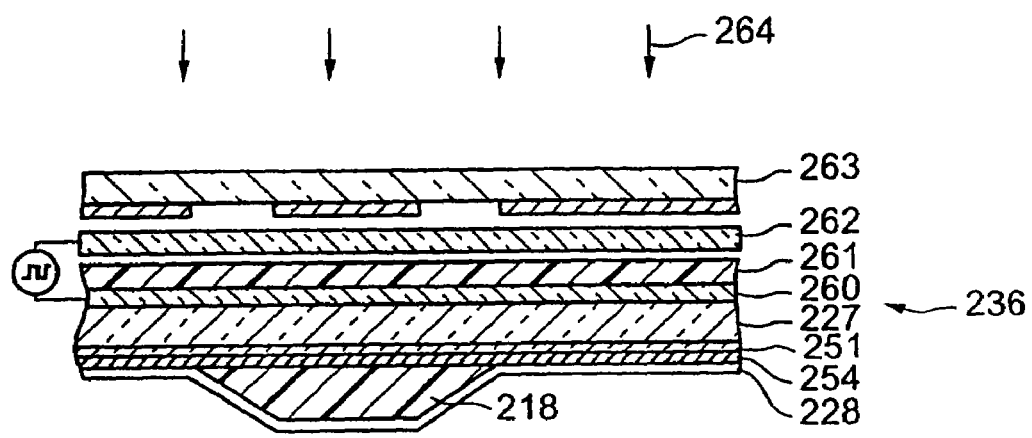
FIG. 36 is a sectional view showing a substrate and a mask to explain a method of manufacturing the MVA liquid crystal display device according to the seventh embodiment of the present invention.

Next, a method of manufacturing the compensating members 222 shown in FIG. 35 will be explained with reference to FIG. 36 hereunder. A method of manufacturing the compensating members 221 on the TFT substrate 235 side is similar to a method explained in the following.

The transparent electrode layer 260 formed of ITO to have a thickness of 100 nm is formed on the surface of the glass substrate 227, that is on the opposite side to the surface on which the projections 218 are formed. As shown in FIG. 33, the projection 218 contains locally a portion parallel to the first direction and a portion parallel to the second direction perpendicular to the first direction. First, all areas of the surface of the transparent electrode layer 260 are rubbed in the first direction.

Then, the area of the projection 218, in which portions being parallel to the first direction are aligned, is masked by the resist pattern. Then, areas not covered with the resist pattern are rubbed in the second direction. After this, the resist pattern is removed. In other words, the rubbing direction becomes locally parallel to the extending direction of the projections 218.

A ultraviolet (UV) curable liquid crystal layer 261 of 2.5 μm thickness is formed by coating the material, that is obtained by adding the photopolymerization initiator of 1 wt % into the UV curable liquid crystal material, on the surface of the transparent electrode layer 260. As the UV curable liquid crystal material, for example, monoacrylate expressed by the following chemical formula (1) may be employed.

$$CH_2=CHCOO-C_6H_4-C_6H_4-C_3H_7 \qquad (1)$$

This monoacrylate exhibits a liquid crystal phase at the room temperature. The phase transition temperature Tni of the liquid crystal material is 52° C., the refractive anisotropy Δn of the liquid crystal material is 0.160, and the dielectric anisotropy Δε of the liquid crystal material is 0.7. The liquid crystal molecules in the UV curable liquid crystal layer 261 are aligned such that their director becomes parallel to the rubbing direction of the transparent electrode layer 260.

A transparent electrode plate 262 is arranged on the UV curable liquid crystal layer 261 to come into contact with its surface. A rectangular wave voltage having a peak value 60 V is applied between the transparent electrode layer 260 and the transparent electrode plate 262. The liquid crystal molecules in the UV curable liquid crystal layer 261 are tilted by the voltage application. A tilt angle depends upon the applied voltage.

The ultraviolet rays are irradiated onto the UV curable liquid crystal layer 261 via a photo mask 263 under the condition that the voltage is applied. The light shielding pattern is formed in the areas of the surface of the photo mask 263, except the areas corresponding to the inclined surfaces of the projections 218. The intensity of the irradiated ultraviolet rays is 0.8 mW/cm$^2$, for example.

The polymerization reaction occurs in the portions of the UV curable liquid crystal layer 261, that correspond to the inclined surfaces of the projections 218, according to the irradiation of the ultraviolet rays. Then, the UV curable liquid crystal material that has not been polymerized is removed by cleaning the substrate. In this manner, the compensating members 222 shown in FIG. 35 are formed.

The compensating members 222 formed in the above conditions have the refractive anisotropy that has the direction parallel to the projections 218 as the lag phase axis. The retardation is about 10 nm. The refractive anisotropy Δn of the compensating members 222 can be changed by changing the voltage applied between the transparent electrode layer 260 and the transparent electrode plate 262.

Eighth Embodiment

Next, a liquid crystal display device according to an eighth embodiment will be explained with reference to FIG. 37 and FIG. 38 hereunder. In the liquid crystal display device according to the eighth embodiment, the compensating members 221, 222 shown in FIG. 35 in the seventh embodiment are not provided. The double refraction effect of the liquid crystal layer can be compensated by the refractive anisotropy of the projection itself. Other configuration is similar to the configuration of the liquid crystal display device according to the seventh embodiment.

Figure 37:
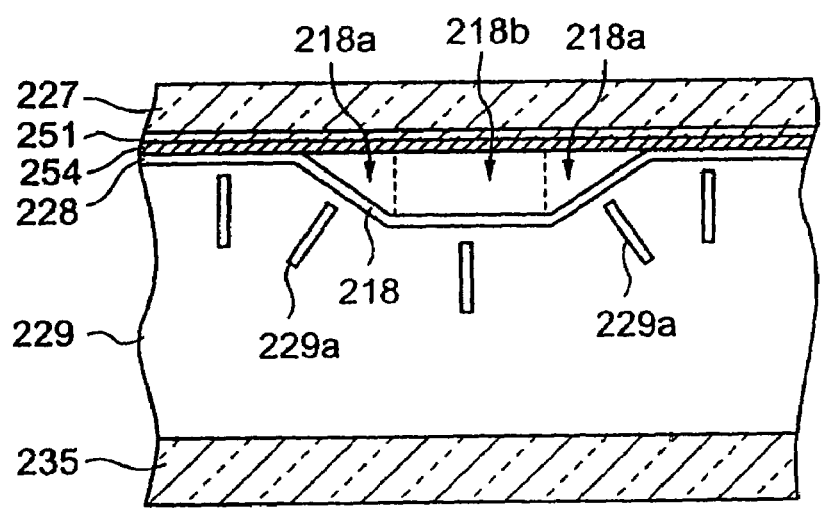
FIG. 37 is a sectional view showing a projection of an MVA liquid crystal display device according to an eighth embodiment of the present invention.
Figure 38:
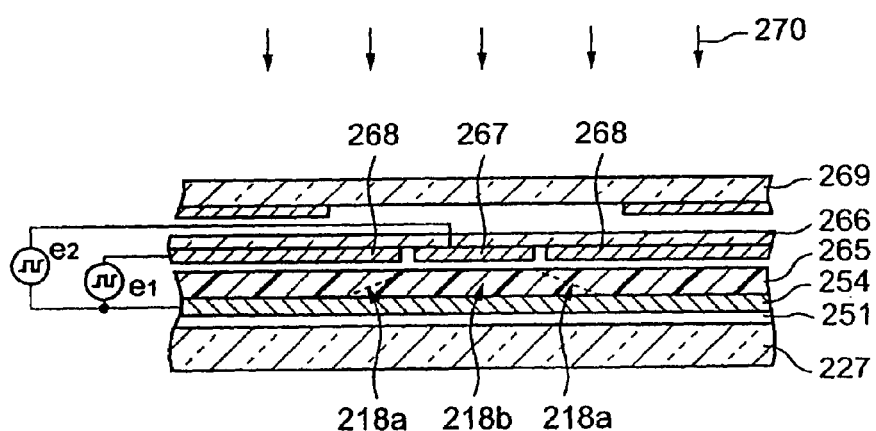
FIG. 38 is a sectional view showing a substrate and a mask to explain a method of manufacturing the MVA liquid crystal display device according to the eighth embodiment of the present invention.

FIG. 37 is a sectional view showing a projection 218 and its neighborhood of an MVA liquid crystal display device according to the eighth embodiment. In this case, a projection on the TFT substrate 235 side has the structure similar to that of the projection 218 shown in FIG. 37.

The projection 218 is separated into edge portions 218a positioned in the peripheral areas, and an inner portion 218b positioned between the edge portions 218a on both sides. The edge portions 218a has the refractive anisotropy, but the inner portion 218b has hardly the refractive anisotropy. The double refraction effect due to tilted liquid crystal molecules 229a in the neighborhood of the edge portions 218a can be compensated by the double refraction effect due to the refractive anisotropy of the edge portions 218a.

Then, a method of manufacturing the projections of the liquid crystal display device according to the eighth embodiment will be explained with reference to FIG. 38 hereunder. The surface of the common electrode 254 is rubbed in the direction parallel to the projections. A UV curable liquid crystal layer 265 of 1.5 μm is formed on the surface of the common electrode 254. The UV curable liquid crystal layer 265 is formed of the same material as the UV curable liquid crystal layer 261 shown in FIG. 36 in the seventh embodiment.

An electric plate 266 is arranged to substantially come into contact with the surface of the UV curable liquid crystal layer 265. A transparent electrode pattern 267 that corresponds to an area serving as the inner portions 218b of the projections and another transparent electrode pattern 268 arranged on both sides of the transparent electrode pattern 267 are provided on the electric plate 266.

A rectangular wave voltage e1 is applied between the common electrode 254 and the transparent electrode pattern 267, and a rectangular wave voltage e2 is applied between the common electrode 254 and the transparent electrode pattern 268. The voltage e1 is higher than the voltage e2. The large electric field is generated in the area serving as the inner portions 218b of the UV curable liquid crystal layer 265 in the thickness direction. Therefore, the liquid crystal molecules in this portion are aligned substantially perpendicularly to the substrate surface. Since only the relatively small electric field is generated in the area serving as the inner portions 218b, the liquid crystal molecules in this portion are tilted to the substrate surface.

Under this condition, the ultraviolet rays are irradiated onto the area of the UV curable liquid crystal layer 265, in which the projections are to be formed, via the photo mask 269. The polymerization reaction is caused in the area of the UV curable liquid crystal layer 265, in which the projections are to be formed, by the irradiation of the ultraviolet rays. After the irradiation of the ultraviolet rays, the UV curable liquid crystal material in which the polymerization is not caused is removed by cleaning the substrate. In this manner, the projections shown in FIG. 37 are formed.

Projections 217 on the TFT substrate 235 are manufactured by the similar method. In this case, the pixel electrodes that are separated every pixel are formed on the TFT substrate 235. Therefore, after all TFTs are brought into their conductive state, the rectangular wave voltage is applied between the drain bus line and the electrode plate 266. since the TFTs are set to their conductive state, the rectangular wave voltage is applied to all pixel electrodes, and the electric field is generated in the UV curable liquid crystal layer.

As described above, according to the present invention, the double refraction effect of the liquid crystal layer due to the tilt of the liquid crystal molecules in the neighborhood of the edges of the projections in the MVA liquid crystal display device can be reduced, and the leakage light in the dark state can be prevented.

Ninth Embodiment

Next, a liquid crystal display device according to a ninth embodiment will be explained with reference to FIGS. 39A and 39B hereunder. In the seventh embodiment, as shown in FIG. 35, both the projections 217, 218 are formed of dielectric material. In the ninth embodiment, a surface of one projection is formed of conductive material and other configurations are similar to the case in the seventh embodiment. In this case, the compensating members 221, 222 shown in FIG. 35 may be arranged as occasion demands.

Figure 39A:
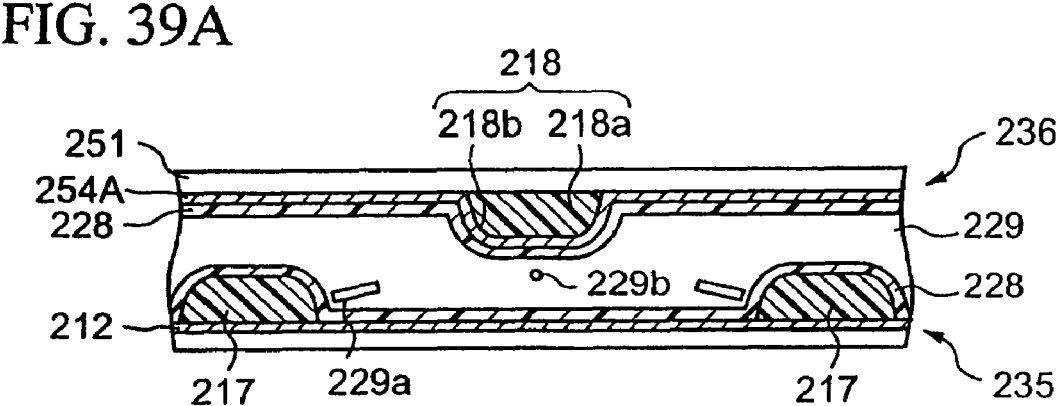
FIG. 39A is a sectional view showing a liquid crystal display device according to a ninth embodiment of the present invention.

FIG. 39A is a schematic partial sectional view showing a liquid crystal display device according to the ninth embodiment. Projections 217 are formed on the pixel electrode 212 on the TFT substrate 235. A vertical alignment film 228 on the TFT substrate 235 side is formed to cover the projections 217 and the pixel electrode 212. Projections 218a formed of dielectric material are formed on a surface of a color filter 251 on the opposing substrate 236 side.

A common electrode 254A is formed to cover the pixel electrode 212 and the projections 218a. The dielectric projection 218a and a portion 218b of the common electrode 254A for covering the dielectric projections 218a constitute a CF substrate side projection 218. An alignment film 228 on the opposing substrate 236 side is formed to cover the common electrode 254A.

Figure 39B:
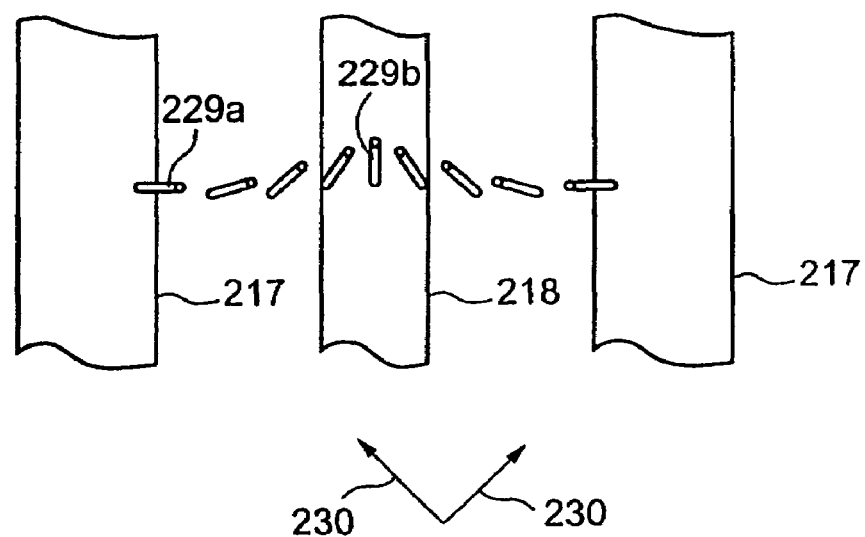
FIG. 39B is a plan view showing a liquid crystal layer to show tilt directions of liquid crystal molecules.

FIG. 39B is a plan view showing the liquid crystal layer to show the tilt directions of the liquid crystal molecules when the voltage is applied. When a predetermined voltage is applied between the pixel electrode 212 and the common electrode 254A, the liquid crystal molecules in the liquid crystal layer 229 are tilted. The liquid crystal molecules 229a in the neighborhood of the inclined surfaces of the projections 217 are tilted such that end portions that are remote from the pixel electrode 212 are positioned far from the center of the projection 217.

The surfaces of the projections 218 are formed of the conductive material, the electric field concentrates into the surfaces of the projections 218 and thus equipotential surfaces are generated along the surfaces of the projections 218. Therefore, the liquid crystal molecules in the neighborhood of the surfaces of the projections 218 are fallen into the direction parallel to the surfaces of the projections 218. The liquid crystal molecules 229b in the neighborhood of the top surfaces of the projections 218 are affected equally by the liquid crystal molecules on both sides of the projections 218. Therefore, the liquid crystal molecules 229b are tilted along the extending direction of the projections 218.

The liquid crystal molecules in the area between the projections 217 and the projections 218 are tilted in the middle direction between the tilt directions of the liquid crystal molecules 229a and the liquid crystal molecules 229b. That is, the liquid crystal molecules are aligned like a bend orientation in the direction of the substrate surface.

Figure 2A:
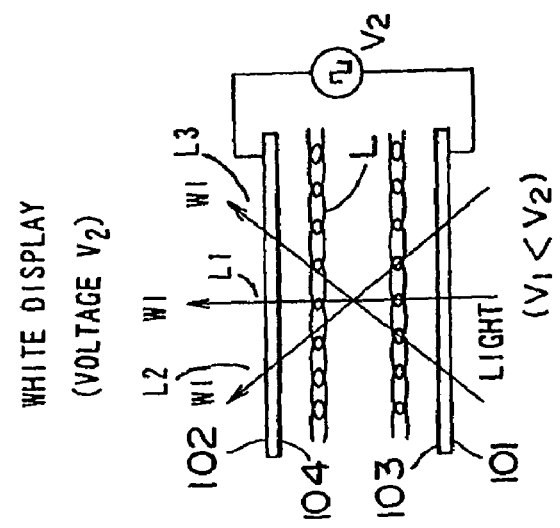
FIGS. 2A to 2C are views showing driving states of the VA liquid crystal display device in the prior art.
Figure 2B:
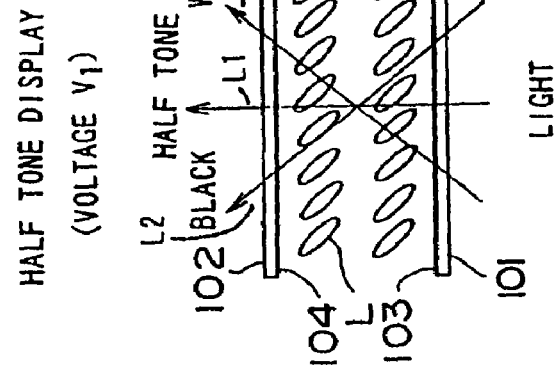
Figure 2C:
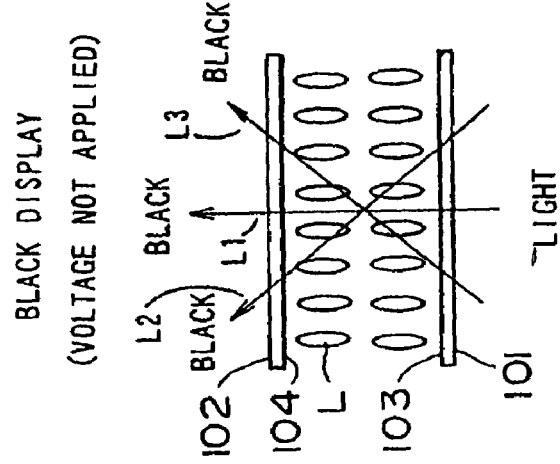
Figure 4A:
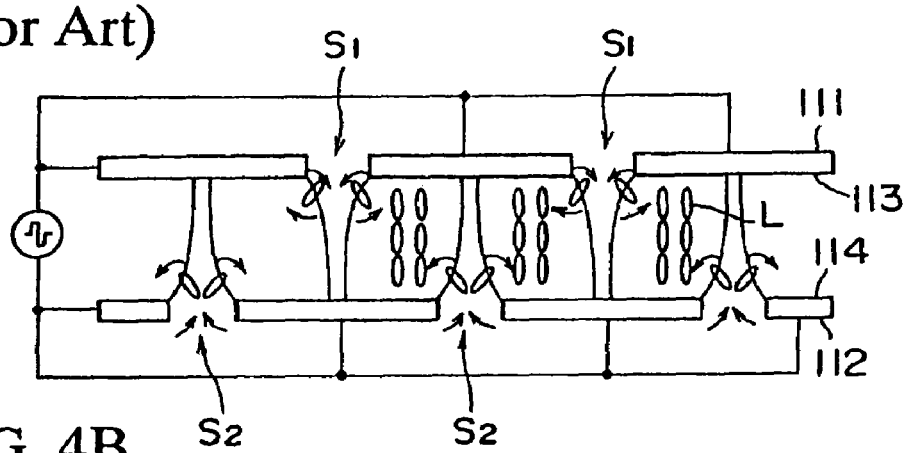
FIGS. 4A to 4C are views showing various modes of alignment division in the prior art.
Figure 4B:
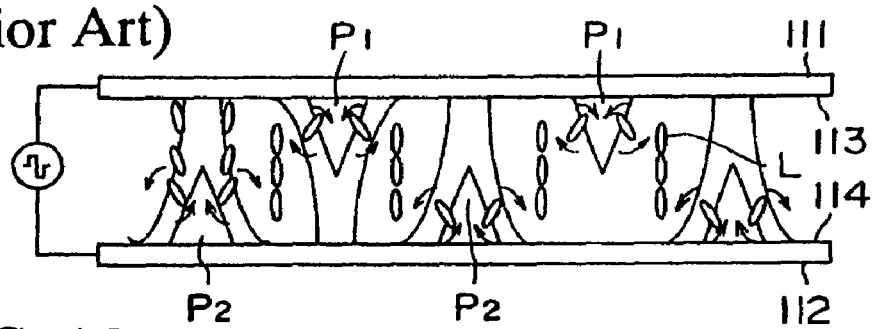
Figure 4C:
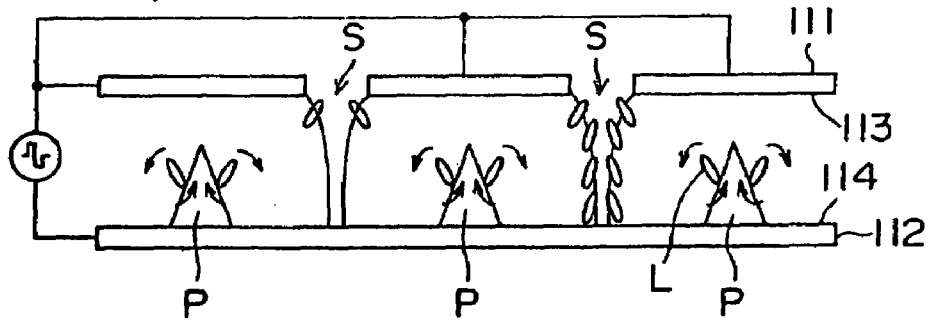
Figure 5:
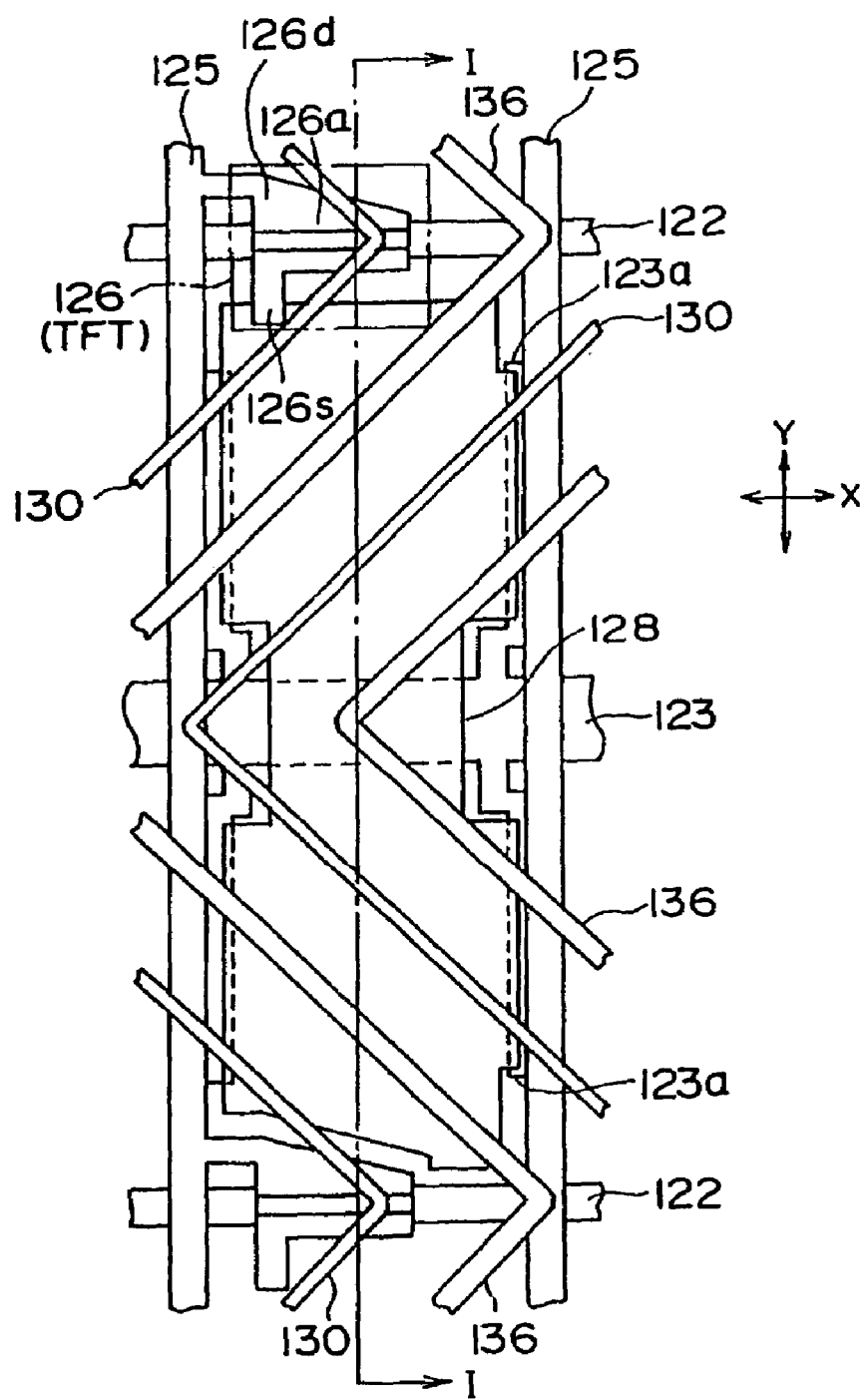
FIG. 5 is a plan view showing a pixel portion in the MVA mode in the prior art.
Figure 6:
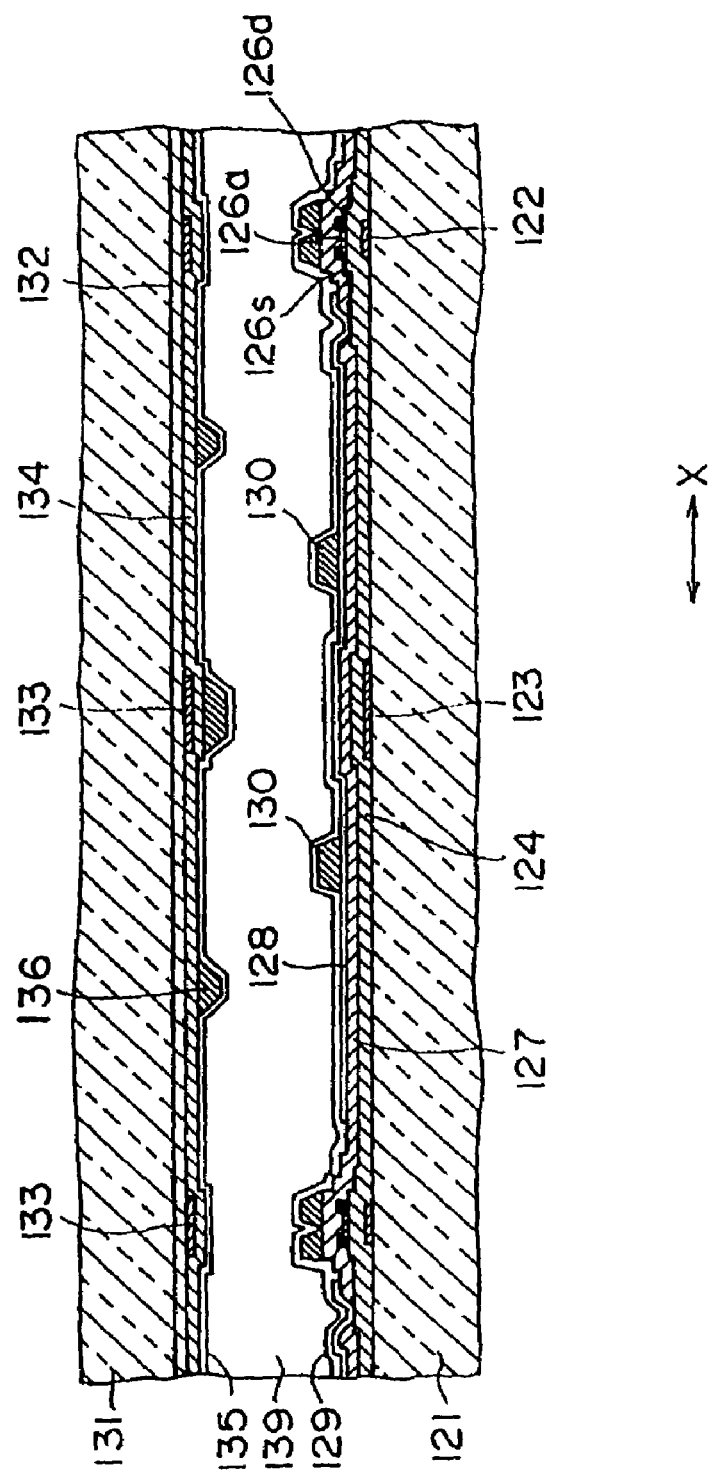
FIG. 6 is a sectional view showing the pixel portion in the MVA mode in the prior art, taking along a I-I line in FIG. 5.
Figure 7:
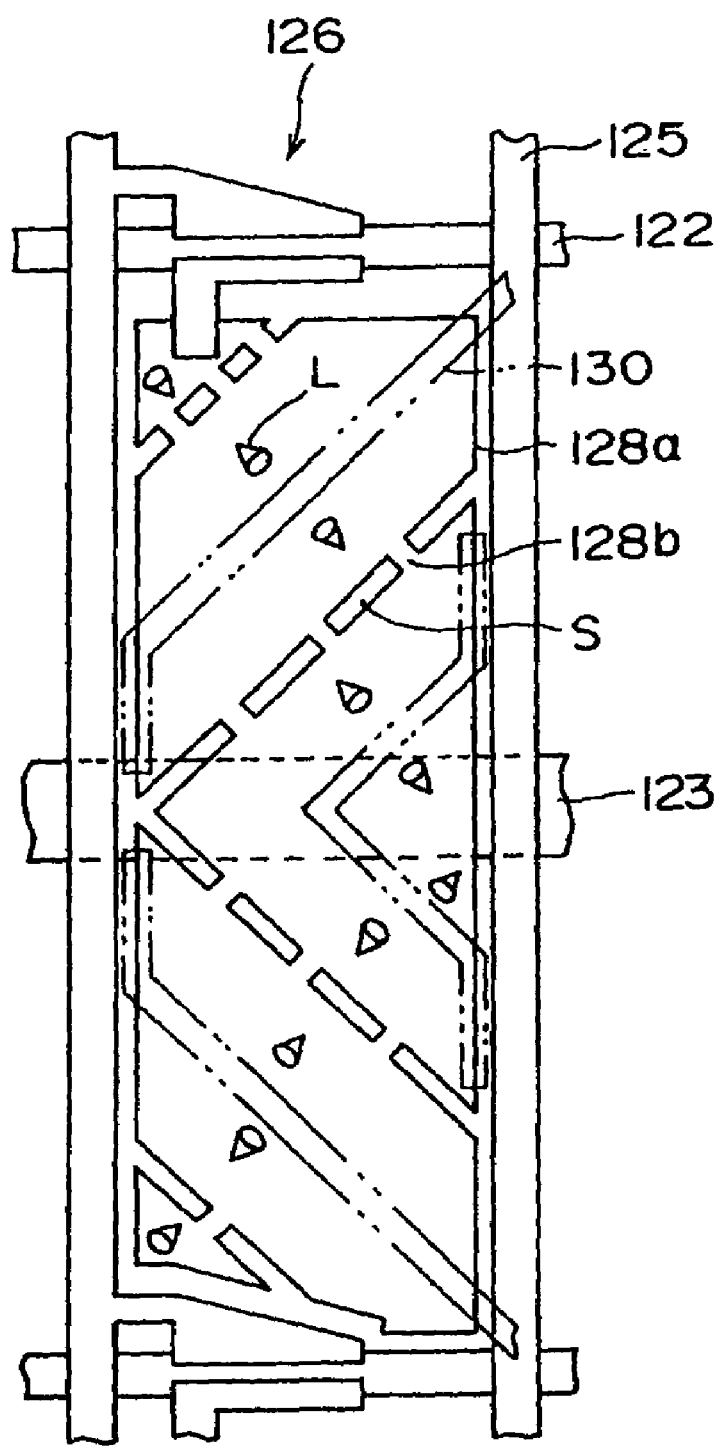
FIG. 7 is a plan view showing a pixel portion in the MVA mode in the prior art.
Figure 8:
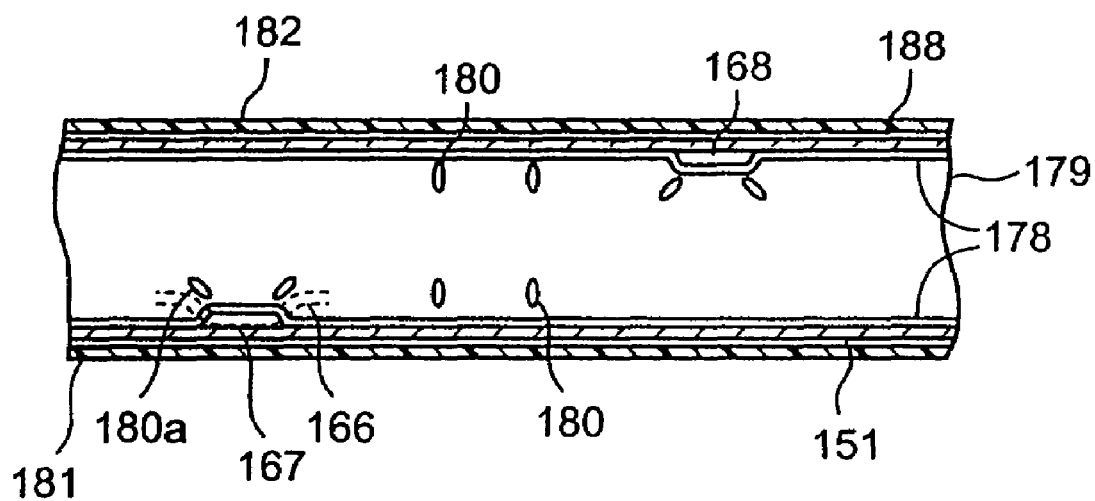
FIG. 8 is a sectional view showing an MVA liquid crystal display device in the prior art.
Figure 9A:
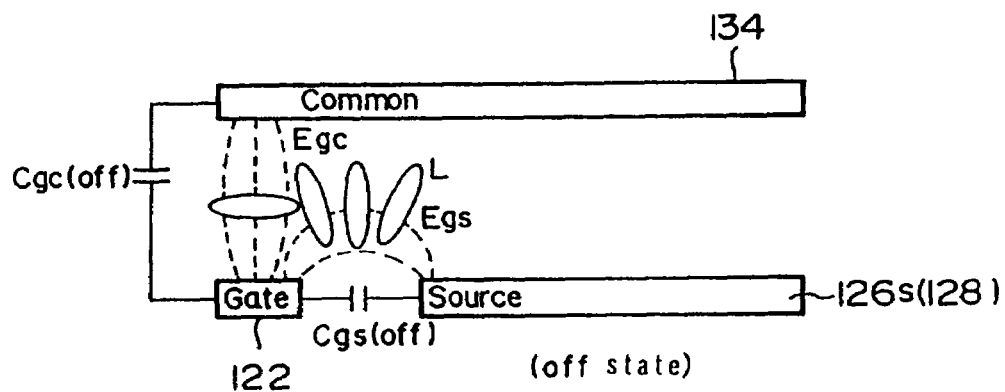
FIGS. 9A and 9B are views showing an OFF state and an ON state of an MVA liquid crystal panel in the prior art.
Figure 9B:
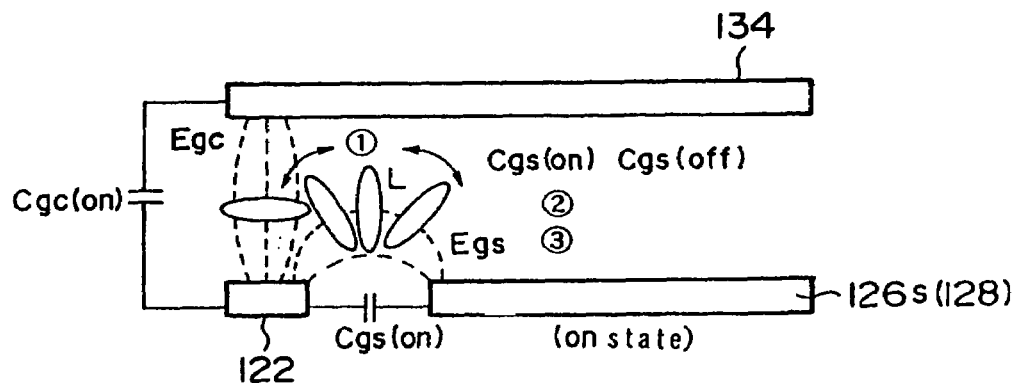

Like the liquid crystal display device shown in FIG. 8 in the prior art, the polarizing plates are cross-nicol-arranged on the outside of the TFT substrate 235 and the opposing substrate 236. The polarization axes 230 of the polarizing plates intersect with the extending direction of the projections 217 and the projections 218 in FIG. 39B by 45 degrees. When the light transmits through the area, in which the liquid crystal molecules are tilted in the direction in parallel with the polarization axes 230 of the polarizing plates, along the thickness direction of the liquid crystal layer, such light does not rotate the polarization axis. Therefore, the area in which the liquid crystal molecules are tilted to intersect with the polarization axis by 45 degrees becomes dark, and thus the black line appears between the projection 217 and the projection 218.

The response time of the liquid crystal display device in the ninth embodiment measured when the display is changed from the dark state to the ¼ half tone state and then returned again to the dark state is shorter than the response time of the MVA liquid crystal display device shown in FIG. 8 in the prior art. The reason for this may be considered such that, since the liquid crystal molecules are bend-oriented in the substrate surface when the voltage is applied, the tilt direction can be defined more quickly.

In the ninth embodiment, the tilt direction of the liquid crystal molecules 229b shown in FIG. 39B become parallel with the length direction of the dielectric projections 218, but the vertical direction, i.e., the upward or downward direction in FIG. 39B is not decided. Therefore, there is the case where two domains in which the tilt direction is different by 180 degrees are generated. If the locations of domain boundaries are not fixed, display quality is degraded. In order to prevent the degradation of the display quality due to variation of the locations of the domain boundaries, another dielectric projections intersecting with the projections 217, 218 may be provided on the opposing surface of another substrate. Since the liquid crystal molecules on both sides of the intersecting dielectric projections tends to tilt toward two directions different by 180 degrees mutually, the domain boundaries are fixed at positions of the projections that intersect with the projections 217, 218.

In the above ninth embodiment, one projections are formed as the conductive projections. In place of the conductive projections, a dielectric film that has smaller dielectric constant than that of the liquid crystal layer may be formed on the opposing surface and then recess patterns may be formed on a surface of the dielectric film. In this case, when the voltage is applied between the substrates, the electric field having a distribution similar to the case where the dielectric projections are formed is generated. Therefore, the liquid crystal molecule alignment similar to the case where the dielectric projections are provided can be obtained.

Also, in the ninth embodiment, in order to define the boundaries of the domains, the projections made of dielectric material are formed on the opposing surface of the substrate. But the slits may be formed in the pixel electrode in lieu of the formation of the projections. The distribution of the electric field in the neighborhood of the slits when the slits are formed in the pixel electrode is similar to the distribution of the electric field generated in the case where the dielectric projections are provided. Therefore, even if the slits are formed in the pixel electrode, the alignment of the liquid crystal molecules similar to the case where the dielectric projections are formed can be achieved.

As described above, according to the present invention, when the voltage is applied, the response characteristic can be improved by providing the projections or the slits such that the liquid crystal molecules are bend-oriented in the direction of the substrate surface.

Tenth Embodiment

Figure 40:
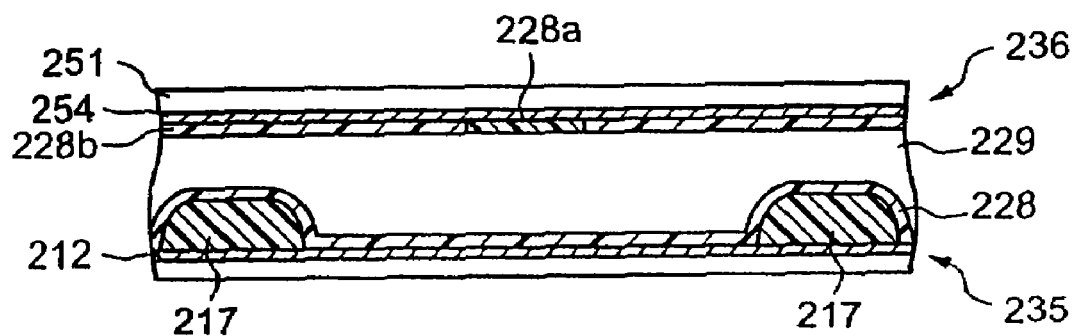
FIG. 40 is a sectional view showing a liquid crystal display device according to a tenth embodiment of the present invention.

Next, a liquid crystal display device according to a tenth embodiment will be explained with reference to FIG. 40 hereunder. FIG. 40 is a schematic partial sectional view showing the liquid crystal display device according to the tenth embodiment. The configuration of the TFT substrate 235 is similar to that of the TFT substrate 235 shown in FIGS. 39A and 39B in the ninth embodiment.

The common electrode 254 is formed on the surface of the color filter 251 on the opposing substrate 236. The vertical alignment film 228B is formed to cover the surface of the common electrode 254B. The alignment defining force is destroyed or weakened in the area 228a of the vertical alignment film 228B, that correspond to the conductive projections 218 in FIG. 39A. The area in which the alignment defining force is destroyed or weakened is called a nonalignment defining area. The nonalignment defining area can be formed by irradiating selectively the energy beam such as ultraviolet laser, infrared laser, etc. onto the vertical alignment film, for example.

When the voltage is not applied, the liquid crystal molecules in the area of the alignment film 228b other than the nonalignment defining area 228a are aligned substantially perpendicularly to the substrate surface. Since the liquid crystal molecules that come into contact with the nonalignment defining area 228a have the weak vertical alignment force, they are tilted to the substrate surface. It seems that, since the liquid crystal molecules in the almost middle of the nonalignment defining area 228a are affected by the liquid crystal molecules on both sides, the tilt direction of the liquid crystal molecules become parallel with the length direction of the nonalignment defining area 228a.

When the voltage is applied between the substrates, the liquid crystal molecules in the nonalignment defining area 228a are largely tilted toward the length direction of the nonalignment defining area 228a. As a result, the nonalignment defining area 228a can achieve the similar effect to the conductive projections 218 shown in FIG. 39A.

Eleventh Embodiment

Next, a liquid crystal display device according to an eleventh embodiment will be explained with reference to FIGS. 41A and 41B hereunder.

Figure 41A:
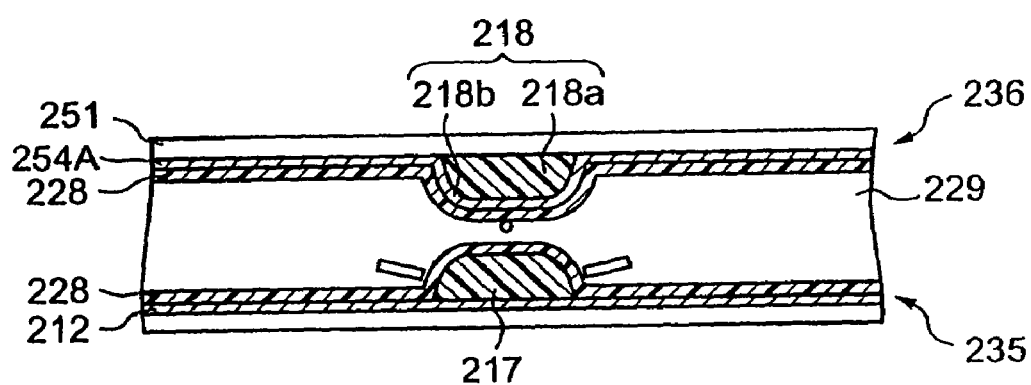
FIG. 41A is a sectional view showing a liquid crystal display device according to an eleventh embodiment of the present invention.

FIG. 41A is a partial sectional view showing the liquid crystal display device according to the eleventh embodiment. In the ninth embodiment, as shown in FIGS. 39A and 39B, the TFT substrate side projections 217 and the CF substrate side conductive projections 218 are arranged alternately in the substrate surface. In the eleventh embodiment, if viewed along the normal direction of the substrate, the TFT substrate side projections 217 and the CF substrate side conductive projections 218 are overlapped mutually.

Figure 41B:
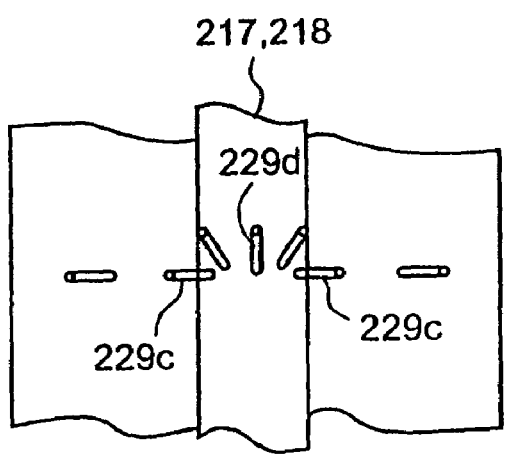
FIG. 41B is a plan view showing liquid crystal layers to show tilt directions of liquid crystal molecules.

FIG. 41B is a plan view showing the liquid crystal layer to show the tilt directions of liquid crystal molecules when the voltage is applied. If the predetermined voltage is applied between the pixel electrode 212 and the common electrode 254A, the liquid crystal molecules in the liquid crystal layer 229 are tilted. The liquid crystal molecules 229c in the neighborhood of the inclined surfaces of the projections 217 are tilted such that end portions that are remote from the pixel electrode 212 are positioned far from the center of the projection 217. The liquid crystal molecules 229d in the neighborhood of the top portions of the projections 218 are tilted toward the extending direction of the projections 218. The liquid crystal molecules in the area between the middle portions and the edge portions of the projections 217, 218 are tilted in the intermediate direction between the tilt direction of the liquid crystal molecules 229c and the tilt direction of the liquid crystal molecules 229d. That is, the liquid crystal molecules are splay-oriented in the neighborhood of the projections 217, 218.

In this manner, since the conductive projections 218 are arranged to overlap with the conductive 217, the tilt direction of the liquid crystal molecules in the almost middle area on the top portion of the projections are restricted in the extending direction of the projections 217, 218. Therefore, when the voltage is applied, the alignment change of the liquid crystal molecules can be accelerated much more rather than the case where the conductive projections 218 are not provided.

In addition, since the TFT substrate side projections 217 and the CF substrate side conductive projections 218 are overlapped mutually, the relatively large electric field is generated between two projections. For this reason, it may be considered that the alignment change of the liquid crystal molecules is carried out quickly and thus the response characteristic can be improved.

Twelfth Embodiment

Next, a liquid crystal display device according to a twelfth embodiment will be explained with reference to FIG. 42 and FIG. 43 hereunder.

Figure 42:
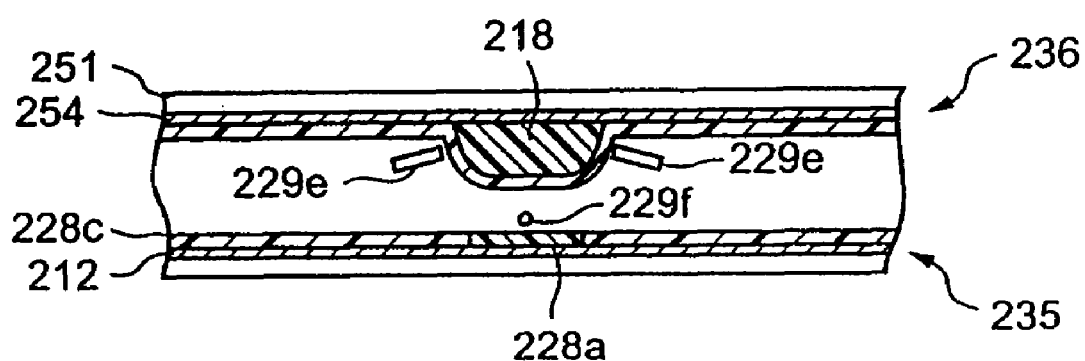
FIG. 42 is a sectional view showing a liquid crystal display device according to a twelfth embodiment of the present invention.

FIG. 42 is a sectional view showing the liquid crystal display device according to the twelfth embodiment. The nonalignment defining area 228a is formed in a part of the alignment film 228c on the TFT. substrate side, and the dielectric projections 218 are formed on the surface of the common electrode 254 on the opposing substrate 236. If viewed along the normal direction of the substrate, the nonalignment defining area 228a and the dielectric projections 218 are overlapped mutually.

Figure 43:
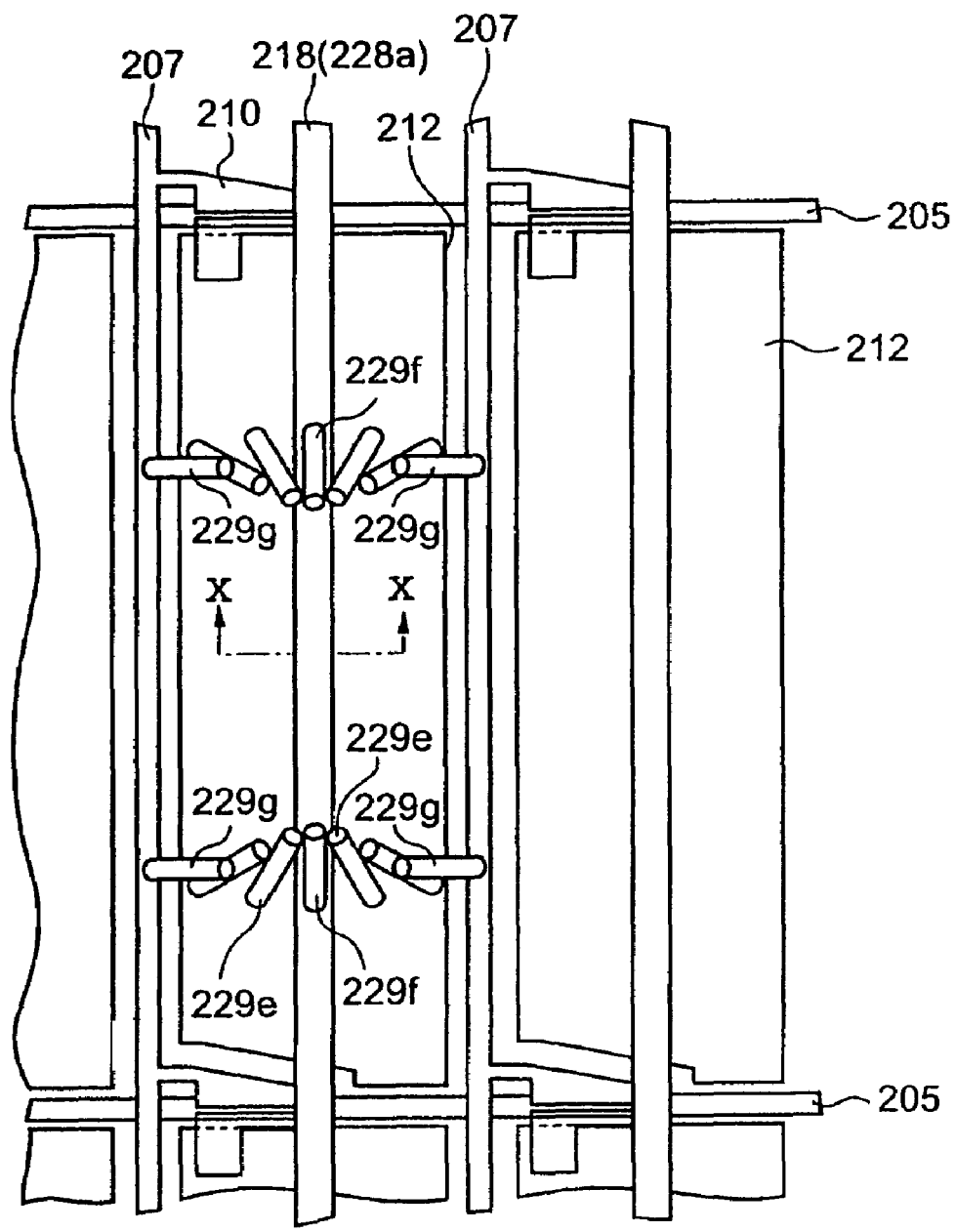
FIG. 43 is a plan view showing the liquid crystal display device according to the twelfth embodiment of the present invention.

FIG. 43 is a plan view showing the liquid crystal display device according to the twelfth embodiment. The configurations of the gate bus line 205, the drain bus line 207, the TFT 210, and the pixel electrode 212 are similar to those in the liquid crystal display device shown in FIG. 33 according to the seventh embodiment. In FIG. 43, the description of the capacitive bus line 208 shown in FIG. 33 is omitted. A sectional view taken along a X-X dot-dash line in FIG. 43 corresponds to FIG. 42. The CF substrate side dielectric projections 218 and the nonalignment defining area 228a extend longitudinally in the almost middle area of the pixel electrode 212 in the direction parallel to the drain bus line 207.

If the voltage is applied between the pixel electrode 212 and the common electrode 254, liquid crystal molecules 229e in the neighborhood of the inclined surfaces of the dielectric projections 218 are tilted such that end portions that are remote from the opposing substrate 236 are positioned far from the center of the dielectric projection 218. The liquid crystal molecules 229f in the neighborhood of the center portion of the nonalignment defining area 228a are tilted in the length direction (longitudinal direction in FIG. 43) of the nonalignment defining area 228a. Hence, like the case of the eleventh embodiment shown in FIG. 41, the liquid crystal molecules are splay-oriented. Therefore, when the voltage is applied, the alignment change of the liquid crystal molecules can be accelerated much more rather than the case where the nonalignment defining area 228a is not provided.

The liquid crystal molecules 229g in the neighborhood of the edge portions of the pixel electrode 212 are tilted toward the inside of the pixel electrode 212 by the disturbance of the electric field so as to orthogonally intersect with the edges. The liquid crystal molecules between the longitudinal edges of the pixel electrode 212 and the dielectric projections 218 are tilted in the middle direction between the tilt direction of the liquid crystal molecules 229f and the tilt direction of the liquid crystal molecules 229g.

In FIG. 43, the liquid crystal molecules in the neighborhood of the upper and lower edge portions of the pixel electrode 212 are tilted toward the inside of the pixel electrode 212. Therefore, the tilt direction of the liquid crystal molecules 229f in the middle portion of the projections 218 is defined in the longitudinal direction in FIG. 43, but their directions are opposite mutually. As a result, domain boundaries are generated in the inside of the pixel. Since the dielectric projections are arranged between the alignment film 228C of the TFT substrate 235 in FIG. 42 and the pixel electrode 212 so as to orthogonally intersect with the nonalignment defining area 228a, the domain boundaries can be fixed at the positions of the dielectric projections.

Thirteenth Embodiment

Next, a liquid crystal display device according to a thirteenth embodiment will be explained with reference to FIG. 44 hereunder.

Figure 44:
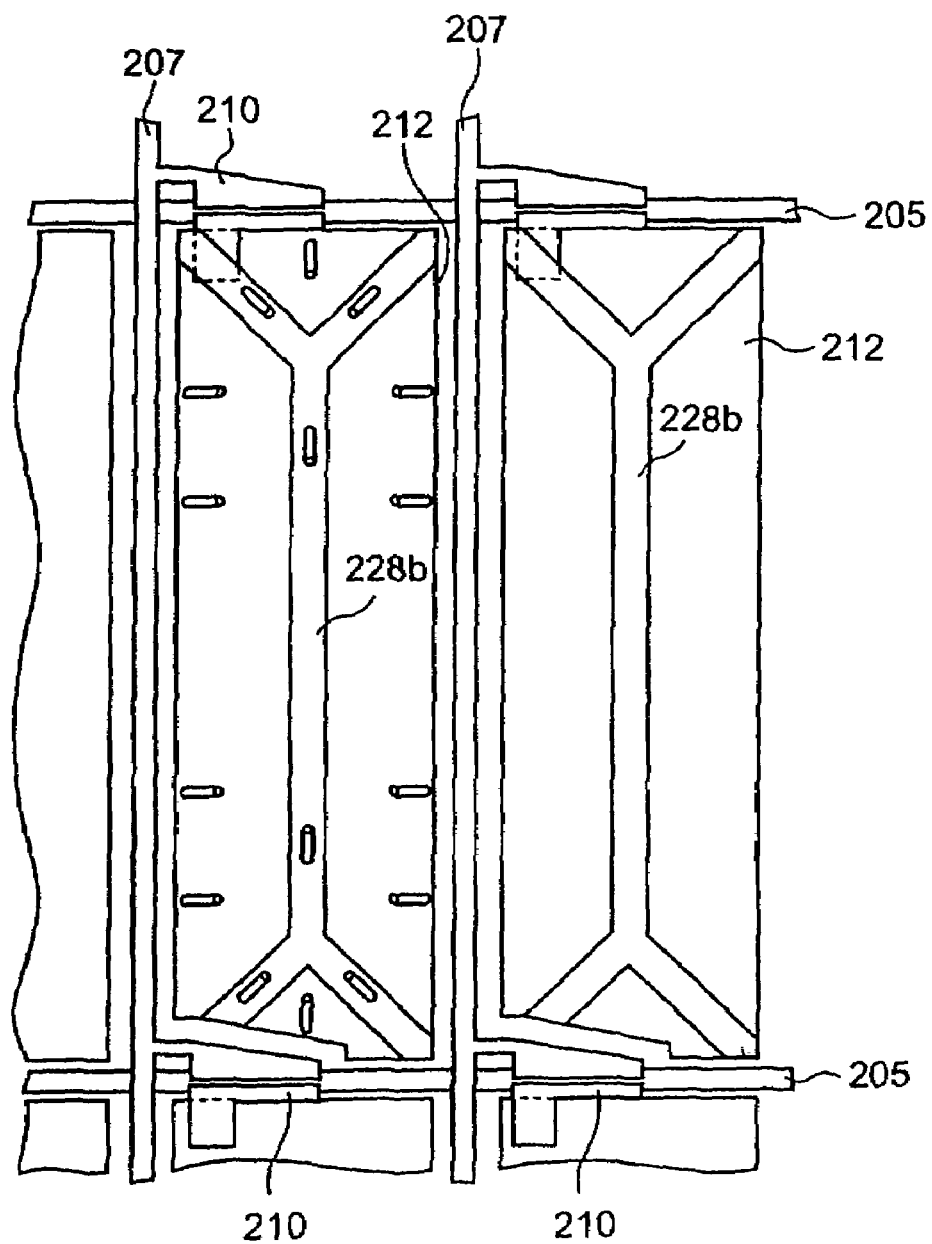
FIG. 44 is a plan view showing a liquid crystal display device according to a thirteenth embodiment of the present invention.

FIG. 44 is a plan view showing the liquid crystal display device according to the thirteenth embodiment. The configurations of the gate bus line 205, the drain bus line 207, the TFT 210, and the pixel electrode 212 are similar to those in the liquid crystal display device shown in FIG. 33 according to the seventh embodiment. In FIG. 44, the description of the capacitive bus line 208 shown in FIG. 33 is omitted. The nonalignment defining area 228b is formed in a part of the alignment film on the TFT substrate and the opposing substrate. In this case, the projections for defining the domain boundaries are not formed on both substrates.

The shape of the pixel electrode 212 has notches to match with the shape of the TFT 210, but is basically approximated by a rectangle. The nonalignment defining areas 228b extend from respective corners of the rectangle toward the inside of the pixel. The nonalignment defining areas 228b extending from respective corners are coupled mutually in the inside of the pixel.

The tilt directions of the liquid crystal molecules in the neighborhood of two sides intersecting with one corner of the pixel electrode 212 are not parallel mutually. Therefore, the domain boundaries are generated between two sides. In the thirteenth embodiment, since the nonalignment defining areas 228b extend from the corners toward the inside of the pixel, such nonalignment defining areas 228b act as the domain boundaries. That is, one domain can be defined by one side of the pixel electrode 212 and the nonalignment defining areas 228b.

In the thirteenth embodiment, the locations of the domain boundaries are restricted by the nonalignment defining areas 228b without the projections. Accordingly, reduction in the optical transmittance due to the projections can be prevented.

Fourteenth Embodiment

Next, a liquid crystal display device according to a fourteenth embodiment will be explained with reference to FIGS. 45A and 45B hereunder.

Figure 45A:
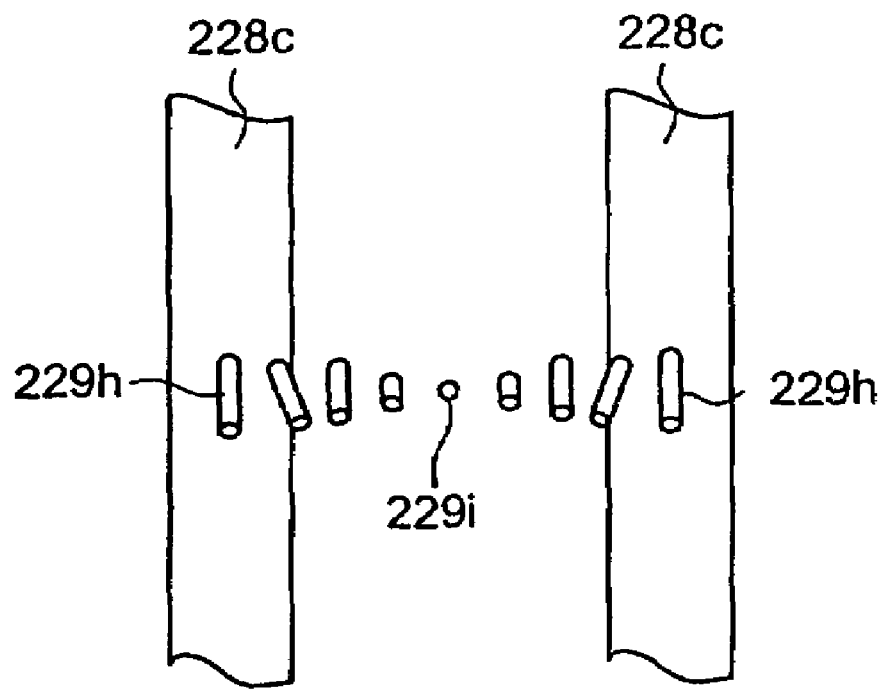
FIGS. 45A and 45B are plan views showing alignment states of the liquid crystal molecules in a liquid crystal display device according to a fourteenth embodiment of the present invention.
Figure 45B:
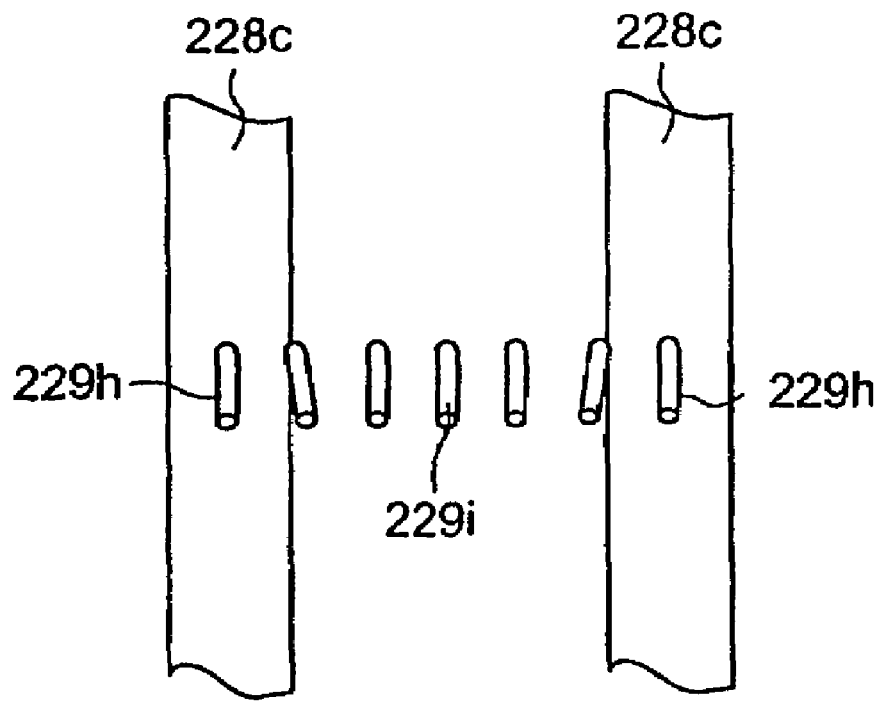

FIGS. 45A and 45B are plan views showing a local portion in one pixel of the liquid crystal display device according to the fourteenth embodiment. Two nonalignment defining areas 228c in which the alignment defining force of the vertical alignment film is destroyed or weakened are arranged in parallel with each other. When the voltage is not applied, as shown in FIG. 45A, the liquid crystal molecules 229i positioned between two nonalignment defining areas 228c are aligned substantially perpendicularly to the substrate surface.

The liquid crystal molecules 229h on the inside of the nonalignment defining area 228c are tilted slightly from the perpendicular direction since the vertical alignment defining force in this area is weak. The tilt direction coincides with the length direction of the nonalignment defining area 228c. This may be considered such that, since the tilt direction is affected equally by the liquid crystal molecules on both sides of the nonalignment defining areas 228c, such tilt direction is not shifted to one of both sides. Accordingly, it seems that, if the influence by the liquid crystal molecules on both sides is weakened, the tilt direction of the liquid crystal molecules on the inside of the nonalignment defining areas 228c become random. In order to restrict the tilt direction of the liquid crystal molecules by the nonalignment defining areas 228c, the width must be reduced narrower than a certain upper limit value. According to the experiment made by the inventors of this application, when the width of the nonalignment defining area 228c is 5 µm, the liquid crystal molecules on the inside are tilted to the length direction of the nonalignment defining areas 228c.

FIG. 45B shows the alignment states of the liquid crystal molecules when the voltage is applied. The liquid crystal molecules on the inside of the nonalignment defining areas 228c are largely tilted to the inclined direction when the voltage is not applied. The liquid crystal molecules 229i between two nonalignment defining areas 228c are affected by the inclination of the liquid crystal molecules 229h and are tilted to the direction parallel to the length direction of the nonalignment defining areas 228c.

In this way, it is possible to restrict the tilt direction of the liquid crystal molecules by providing not the nonalignment defining areas 228c but the projections. Since the projections are not provided, reduction in the optical transmittance due to the projections can be prevented.

With the use of JALS-684 manufactured by JSR Inc. as the alignment film and MJ961213R manufactured by Merck Inc. as the liquid crystal material, the liquid crystal cell in which a width of the nonalignment defining area 228c is 5 µm, an interval is 35 µm, and a cell thickness is 4.25 µm is fabricated. The polarizing plates are cross-nicol-arranged such that their polarizations axis directions intersect with the length direction of the nonalignment defining area 228c by an angle of 45 degrees. After the transmittance of the liquid crystal display device is measured, the maximum transmittance in excess of 25% has been confirmed. Here, the intensity of the ultraviolet rays irradiated to form the nonalignment defining area 228c is 4000 mJ/cm$^2$.

Fifteenth Embodiment

Next, a liquid crystal display device according to a fifteenth embodiment will be explained with reference to FIG. 46 hereunder.

Figure 46:
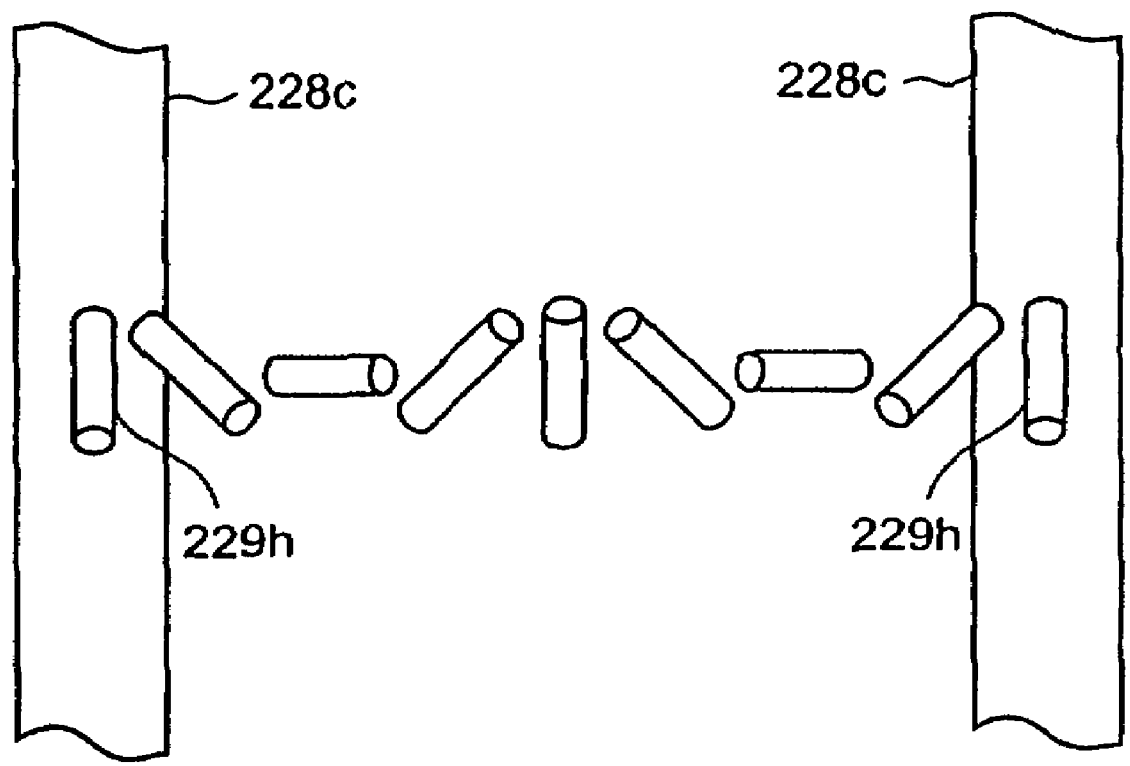
FIG. 46 is a plan view showing the alignment state of the liquid crystal molecules in a liquid crystal display device according to a fifteenth embodiment of the present invention.

FIG. 46 is a plan view showing the alignment state of the liquid crystal molecules in the light state of the liquid crystal display device according to the fifteenth embodiment. The liquid crystal display device according to the fifteenth embodiment is different from the liquid crystal display device according to the fourteenth embodiment in that a chiral agent is added into the liquid crystal layer. Other configurations are similar to those in the liquid crystal display device according to the fourteenth embodiment. CM31 manufactured by Chisso Inc. is employed as the chiral agent, and a concentration of the chiral agent used in the liquid crystal material is set to 4.8 wt %.

It has been found that, when the light state of the liquid crystal display device according to the fifteenth embodiment is monitored, the light transmits through the center portion of the nonalignment defining area 228c and thus four dark lines appear between two neighboring nonalignment defining areas 228c. Since the areas in which the tilt directions of the liquid crystal molecules are parallel with the polarization axes of the polarizing plates do not exhibit the double refraction property, such areas are the dark areas even when the voltage is applied. The reason for the appearance of four dark lines is that the director directions of the liquid crystal molecules are twisted in compliance with the displacement from one nonalignment defining area 228c to the neighboring nonalignment defining area 228c. Also, it seems that the liquid crystal molecules are tilted to the length direction of the nonalignment defining area 228c in the center portion of the nonalignment defining area 228c. A twisted angle may be 360 degrees between the neighboring nonalignment defining areas 228c because the number of the dark lines is four.

In the fifteenth embodiment, since the dark line appears in the light state, no improvement can be found in a respect of the transmittance rather than the prior art. However, it is expected that, since the tilt direction of the liquid crystal molecules is decided by the chiral agent, the response speed from the dark state to the half tone state can be accelerated.

Sixteenth Embodiment

Figure 47:
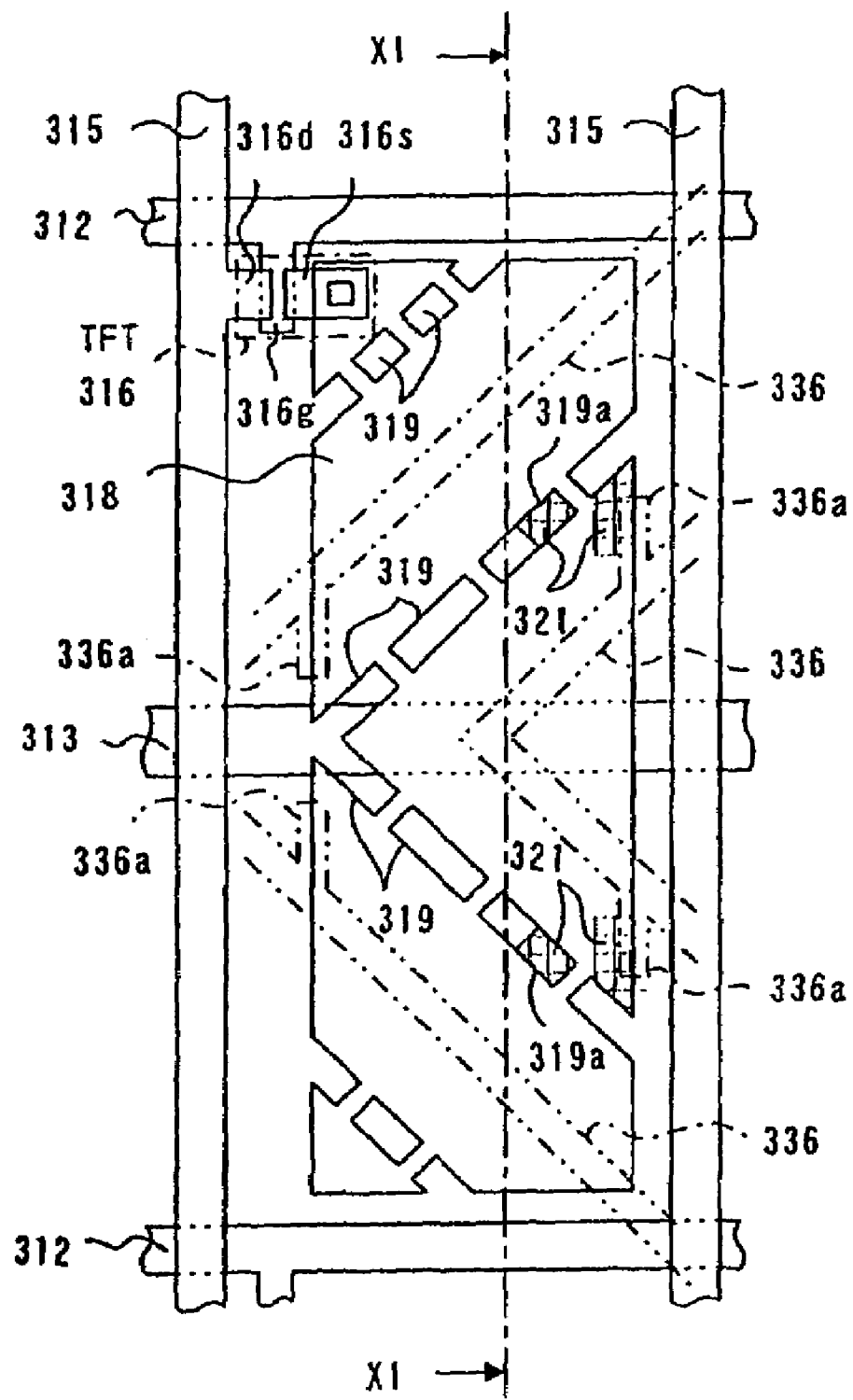
FIG. 47 is a plan view showing one pixel of an MVA liquid crystal display device according to a sixteenth embodiment of the present invention.
Figure 48:
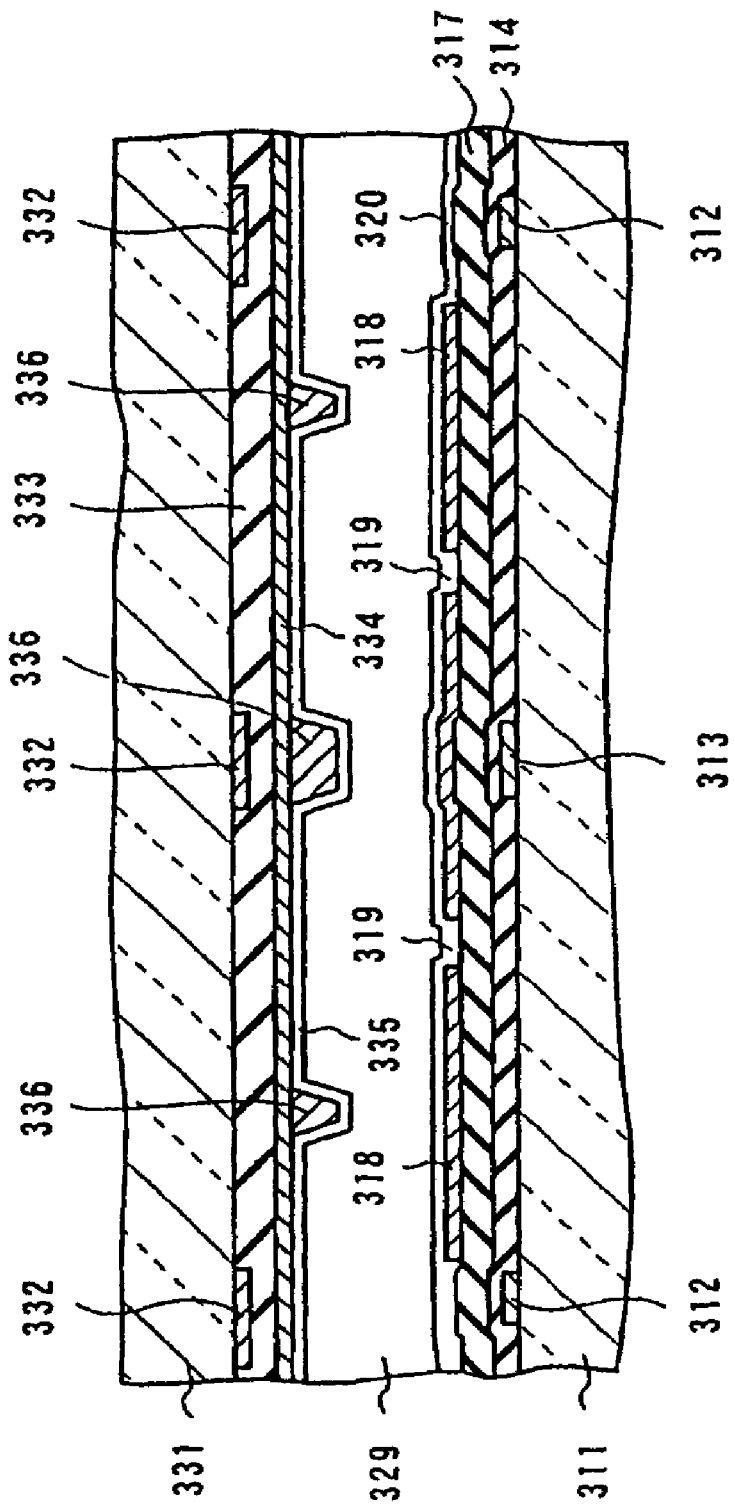
FIG. 48 is a sectional view showing a sectional shape at a position of a XI-XI line in FIG. 47.

FIG. 47 is a plan view showing an MVA liquid crystal display device according to a sixteenth embodiment of the present invention. FIG. 48 is a sectional view showing the liquid crystal display device. In this case, FIG. 48 shows a sectional shape at a position taken along a XI-XI line in FIG. 47. FIG. 47 shows one pixel of the liquid crystal display device, and a chain double-dashed line in FIG. 47 denotes a position of the projection (a domain defining projection and an auxiliary projection) formed on the opposing substrate side.

A plurality of gate bus lines 312 are formed in parallel with each other on a glass substrate (TFT substrate) 311. Also, capacitive bus lines 313 are formed in parallel with gate bus lines 312 between the gate bus lines 312 respectively. In addition, a gate electrode 316g of the TFT 316 is formed on the glass substrate 311. The gate electrode 316g is connected to the gate bus line 312. The gate bus line 312, the gate electrode 316g, and the capacitive bus line 313 are formed on the same wiring layer (first wiring layer). That is, the gate bus line 312, the gate electrode 316g, and the capacitive bus line 313 are formed by patterning the same conductive film. Also, the gate bus line 312, the gate electrode 316g, and the capacitive bus line 313 are covered with a first insulating film (gate insulating film) 314 formed on the glass substrate 311.

A silicon film (not shown) serving as the active area of the TFT 316 is formed on the first insulating film 314 over the gate electrode 316g. Also, a plurality of drain bus lines 315, and a source region 316s and a drain region 316d of the TFT 316 are formed on the insulating film 314. The drain bus lines 315 are formed to orthogonally intersect with the gate bus lines 312. The source region 316s and the drain region 316d are formed on both sides of the silicon film over the gate electrode 316g to be separated mutually. Then, the drain region 316d is connected to the drain bus line 315.

Rectangular areas partitioned by the gate bus lines 312 and the drain bus lines 315 are pixel areas respectively. The drain bus lines 315, and the source region 316s and the drain region 316d are formed on the same wiring layer (second wiring layer). The drain bus lines 315 and the TFT 316 are covered with the second insulating film 317 formed on the first insulating film 314.

The pixel electrodes 318 are formed on the second insulating film 317 every pixel area. For example, the pixel electrodes 318 are formed of transparent conductor such as ITO, etc. Slits 319 aligned on a straight line extending in the oblique direction are formed in the pixel electrode 318. In the sixteenth embodiment, the slits 319 are arranged in a vertically symmetric fashion in one pixel electrode 318. Also, the pixel electrode 318 is connected electrically to the source electrode 316s via a contact hole formed in the second insulating film 317.

A vertical alignment film 320 is formed on the pixel electrode 318. The vertical alignment film 320 is formed polyimide, for example. As described later, a process for revealing partially (a shaded portion 321 in FIG. 47) a pre-tilt angle (pre-tilt angle revealing process) is applied to the alignment film 320. As the pre-tilt angle revealing process, for example, there are UV irradiation, rubbing process, or the like. By applying the pre-tilt angle revealing process, under the condition that the voltage is not applied, the liquid crystal molecules are tilted to the predetermined direction and an angle between the alignment film 320 and the director of the liquid crystal molecules (pre-tilt angle) is more than 45 degrees and less than 90 degrees. In the sixteenth embodiment, the preferable range of the pre-tilt angle is 87 to 89 degrees.

In contrast, a black matrix 332 is formed under the glass substrate (opposing substrate) 331. The areas of the gate bus lines 312, the capacitive bus lines 313, the drain bus lines 315, and the TFTs 316 on the TFT substrate side and the outside area of the display area are light-shielded by the black matrix 332. In the sixteenth embodiment, it is assumed that the black matrix 332 is formed of a light-shielding metal film such as Cr (chromium), etc. However, the black matrix 332 may be formed of black resin. In addition, the black matrix 332 may be formed by laminating at least two-colored color filters out of red (R), green (G), and blue (B) color filters, to be described later.

Any one one-colored color filter 333 of red (R), green (G), and blue (B) color filters is formed under the glass substrate 331 every pixel. In the sixteenth embodiment, it is assumed that the red (R), green (G), and blue (B) color filters are arranged repeatedly in sequence in the horizontal direction and also the same-colored color filters are arranged in the vertical direction.

The common electrode 334 common to respective pixel electrodes is formed under the color filter 333. The common electrode 334 is also formed of transparent conductor such as ITO, etc. The domain defining projections (also called banks) 336 are formed under the common electrode 334. As shown in FIG. 47, the projections 336 are arranged at the middle position between the slits 319 provided in the pixel electrode 318 on the TFT substrate side. Also, auxiliary projections (called auxiliary banks) 336a are formed at positions that coincide with both edge portions of the pixel electrode 318 in the horizontal direction, more particularly, portions at which the projections 336 form an obtuse angle with the edge of the pixel electrode 318. The auxiliary projections 336a are formed simultaneously of the same material as the domain defining projections 336.

The vertical alignment film 335 is formed under the glass substrate 331. Surfaces of the common electrode 334, the projections 336, and the auxiliary projections 336a are covered with the alignment film 335. The alignment film 335 is formed of polyimide, for example.

Liquid crystal material 329 having the negative dielectric anisotropy is sealed between the TFT substrate (glass substrate 311) and the opposing substrate (glass substrate 331). Spherical spacers having a uniform diameter, for example, are arranged between the TFT substrate (glass substrate 311) and the opposing substrate (glass substrate 331), so that a distance (cell gap) between the TFT substrate and the opposing substrate is kept constant. Also, the polarizing plate (not shown) is arranged below the TFT substrate (glass substrate 311) and over the opposing substrate (glass substrate 331) respectively.

In the sixteenth embodiment, the pre-tilt angle revealing process is applied to the portion of the alignment film 320 on the TFT substrate side, which are the edge portions of the pixel electrode 318 on both sides in the horizontal direction and at which the projections 336 have an obtuse angle with the edge of the pixel electrode 318 (in other words, portions at which the slit series have an acute angle with the auxiliary projections 336a), and the adjacent pixel side half area on the inside of the slit 319a whose end portion on the pixel side next to the right side in FIG. 47 (referred to as the "adjacent pixel" hereinafter) is closed and which is closest to the adjacent pixel (shaded area indicated by a reference 321 in FIG. 47). The effect obtained by applying the pre-tilt angle revealing process to these areas will be explained with reference to schematic views of the pixel electrode shown in FIG. 49 to FIG. 51. In this case, in FIG. 49 to FIG. 51, it is indicated that the black dot portions of the liquid crystal molecules 328 are directed to the common electrode side.

Figure 49:
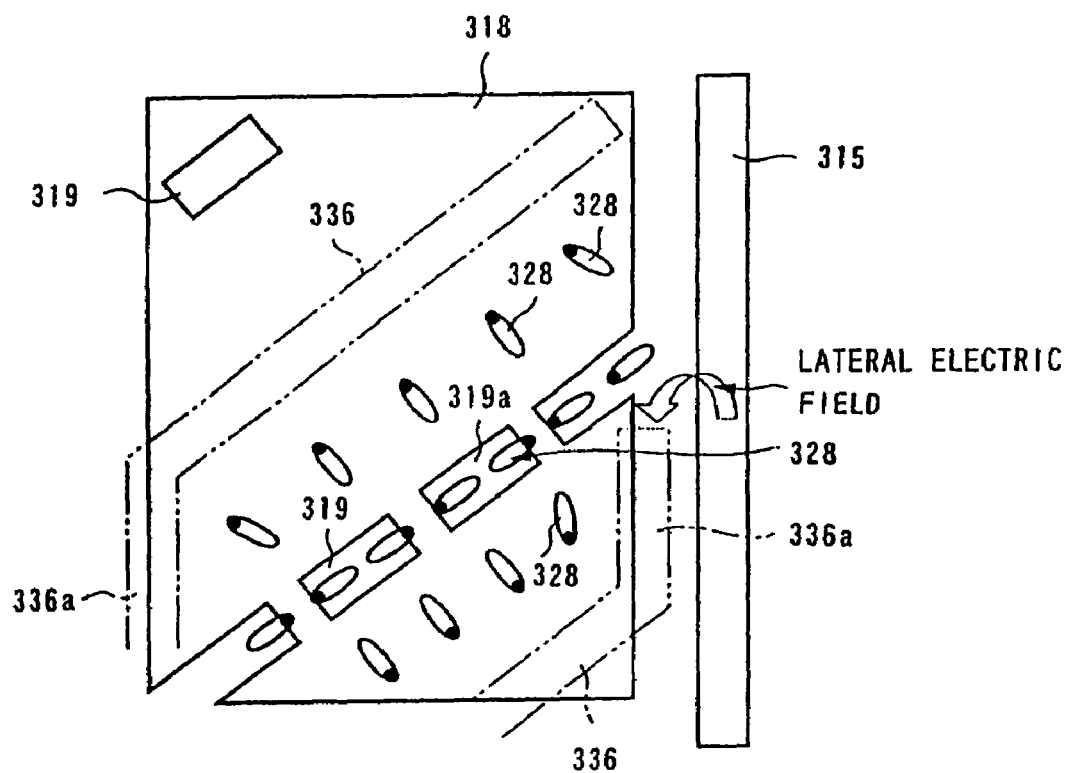
FIG. 49 is a view #1 showing an effect in the sixteenth embodiment of the present invention, wherein an alignment state of the liquid crystal molecules is shown when auxiliary projections are arranged at predetermined positions.

If there is no positional displacement when the TFT substrate and the opposing substrate are stuck together, the auxiliary projections 336a on the adjacent pixel side are arranged to coincide with the edge of the pixel electrode 318, as shown in FIG. 49. The liquid crystal molecules 328 are aligned in the direction perpendicular to the inclined surface of the auxiliary projections 336a in the neighborhood of the auxiliary projections 336a. Also, the liquid crystal molecules in the half area of the slit 319a whose end on the adjacent pixel side is closed and which is closest to the adjacent pixel on the adjacent pixel side are affected by the liquid crystal molecules 328 in the neighborhood of the auxiliary projections 336a and then aligned in the predetermined directions (directions shown in FIG. 49 respectively).

Figure 50:
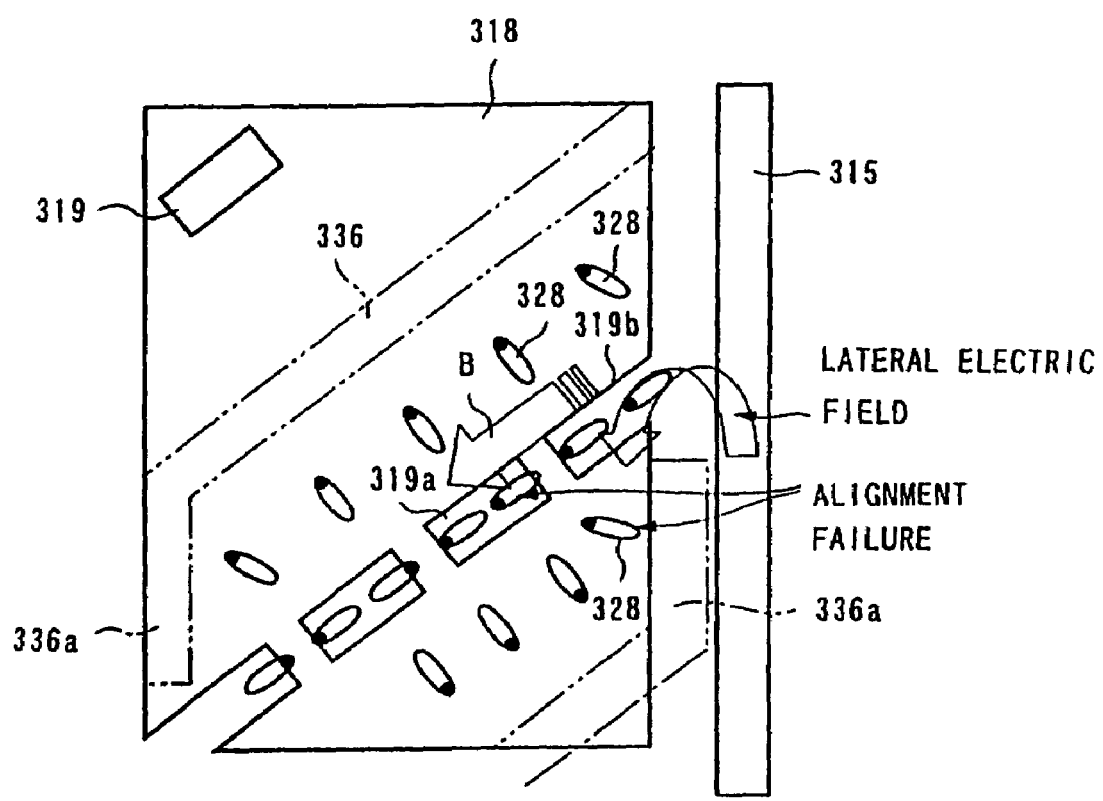
FIG. 50 is a view #2 showing an effect in the sixteenth embodiment of the present invention, wherein a state in which alignment failure of the liquid crystal molecules is generated is shown when the auxiliary projections are arranged at positions deviated from the predetermined positions.

In the case that the auxiliary projections 336a are not provided or positions of the auxiliary projections 336a are displaced toward the adjacent pixel side as shown in FIG. 50, when the voltage is applied between the pixel electrode 318 and the common electrode 334, the liquid crystal molecules in the neighborhood of the edge of the pixel electrode 318 are tilted to the direction (direction indicated by an arrow B in FIG. 50) to which the liquid crystal molecules 328 on the inside of the slit 319*b* closest to the drain bus line 315 of the adjacent pixel are tilted. However, since this direction is different from the direction to which the liquid crystal molecules are tilted by the electric field generated by the drain bus line 315 of the adjacent pixel, the alignment becomes unstable and thus the response characteristic is degraded or the alignment failure is generated.

Figure 51:
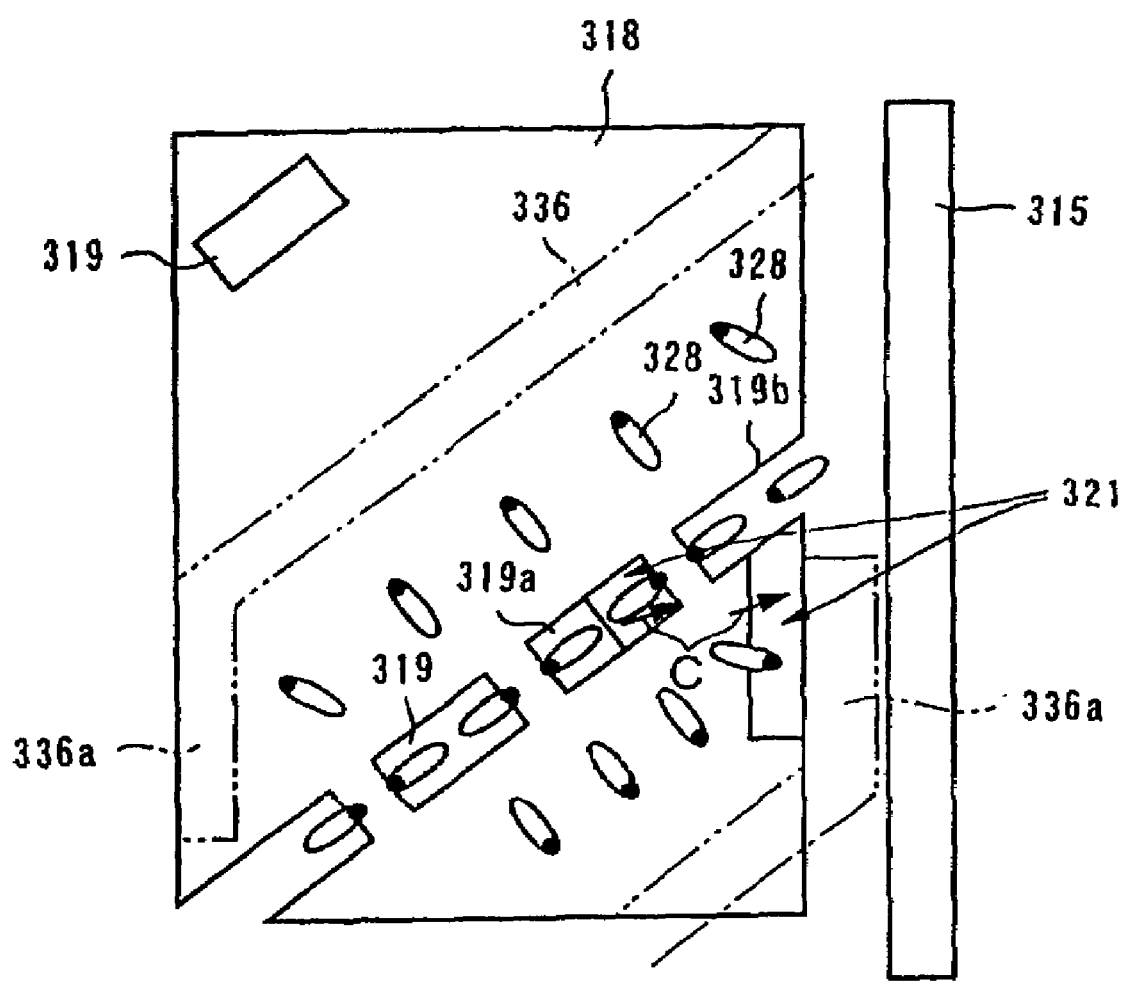
FIG. 51 is a view #3 showing an effect in the sixteenth embodiment of the present invention, wherein a state in which no alignment failure of the liquid crystal molecules is generated because of a pre-tilt angle revealing process is shown even when the auxiliary projections are arranged at the positions deviated from the predetermined positions.

As shown in FIG. 51, if the pre-tilt angle revealing process is applied the alignment film 320 in the portion 321 in which the alignment of the liquid crystal molecules becomes unstable due to the lateral electric field generated by the drain bus line 315 of the adjacent pixel, i.e., the inner portion of the slit 319*a* on the adjacent pixel side and the portion in which the projections 336 form an obtuse angle with the edge of the pixel electrode 318, the liquid crystal molecules are hardly affected by the lateral electric field generated by the drain bus line 315 of the adjacent pixel since the liquid crystal molecules are tilted to the predetermined direction (direction indicated by an arrow C in FIG. 51) in the initial state. As a result, the alignment failure can be avoided and the response characteristic can be improved.

Next, a method of manufacturing the liquid crystal display device according to the sixteenth embodiment will be explained with reference to FIG. 47 and FIG. 48 hereunder.

First, the gate bus line 312, the gate electrode 316*g* and the capacitive bus line 313 are formed by forming a Cr film of about 150 nm thickness, for example, as a conductive film on the glass substrate (TFT substrate) 311 by the PVD (Physical Vapor Deposition) method and then patterning the conductive film by the photolithography.

Then, an insulating film 314 serving as the gate insulating film of the TFT 316, an n$^-$-type amorphous silicon film serving as the active region of the TFT 316, and an insulating film serving as the channel protection film are formed in sequence on the overall upper surface of the glass substrate 311 by the plasma CVD method.

The insulating film 314 is formed of silicon nitride (SiN) or silicon oxide (SiO$_2$), for example, to have a thickness of about 100 to 600 nm. Also, a thickness of the n$^-$-type amorphous silicon film is about 15 to 50 nm. In addition, the insulating film serving as the channel protection film is formed of silicon nitride, for example, to have a thickness of about 50 to 200 nm.

Then, the channel protection film is formed by patterning the uppermost layer of the insulating film by the photolithography. Then, the conductive film having a triple-layered structure of Ti, Al and Ti is formed by forming an n$^+$-type amorphous silicon film serving as an ohmic contact layer of the TFT 316 to have a thickness of about 30 nm, and then stacking Ti, Al, and Ti in sequence on the n$^+$-type amorphous silicon film by the PVD method. For example, a thickness of the underlying Ti layer is 20 nm, a thickness of the Al layer is 75 nm, and a thickness of the overlying Ti layer is 20 nm. This conductive film may be formed of Al, Al alloy, or other low resistance metal.

Then, a resist film having a predetermined pattern is formed on the conductive film by using the photoresist. Then, as shown in FIG. 48, the source electrode 316*s* and the drain electrode 316*d* of the TFT 316 as well as the drain bus lines 315 are formed by etch the conductive film, the n$^+$-type amorphous silicon film, and the n$^-$-type amorphous silicon film using the resist film as an etching mask. The conductive film, the n$^+$-type amorphous silicon film, and the n$^-$-type amorphous silicon film are etched by the dry etching using a mixed gas of Cl$_2$ and BCl$_3$, for example. After this, the resist film used as the etching mask is removed.

Then, for example, a silicon nitride film as the insulating film (protection film) 317 is formed on the overall upper surface of the glass substrate 311 by the CVD method to have a thickness of about 100 to 600 nm. Then, a contact hole is formed in the insulating film 317 to reach the source electrode 316*s* of the TFT 316.

Then, the ITO film of about 70 nm thickness is formed on the overall upper surface of the glass substrate 311 by the PVD method. Then, as shown in FIG. 47, the pixel electrode 318 having the slits 319 is formed by patterning the ITO film by the photolithography.

In turn, the alignment film 320 is formed on the overall upper surface of the glass substrate 311. Then, the pre-tilt angle revealing process is applied to predetermined portions (portions indicated by a reference 321 in FIG. 47) of the alignment film 320. As the pre-tilt angle revealing process, there are the UV irradiation and the rubbing process, for example. If the pre-tilt angle is revealed by the UV irradiation, material in which the pre-tilt angle is revealed by the UV irradiation, e.g., polyimide or polyamic acid that is alignment film material for the UV alignment is used as alignment film material, then covering the portions of the alignment film 320 other than the predetermined portions 321 with the light-shielding mask, and then irradiating the polarized UV onto the substrate 311 from the oblique direction, e.g., the direction indicated by an arrow C in FIG. 51. According to the material of the alignment film 320, the pre-tilt angle can be revealed by irradiating the non-polarized UV.

In contrast, if the pre-tilt angle is revealed by the rubbing process, for example, an alignment film JALS684 manufactured by JSR Inc. is used as alignment film material, then areas of the alignment film 320 other than the predetermined portions 321 is covered with the resist mask, etc., and then surfaces of the predetermined portions 321 of the alignment film 320 are rubbed by the nylon brush, etc. along the predetermined direction, e.g., the direction indicated by an arrow C in FIG. 51. At this time, the pre-tilt angle can be changed by adjusting the revolution number of the brush, the rubbing depth and the number of rubbing. In this manner, the TFT substrate can be completed.

In contrast, the opposing substrate having the projections 336, 336*a* is prepared. The opposing substrate can be manufactured by the well known method. More particularly, the black matrix 332 having a predetermined pattern is formed of light shielding material such as Cr, etc. on the glass substrate 331. Then, the red (R), green (G), and blue (B) color filters 333 are formed on the glass substrate 331 and then the common electrode 334 is formed of ITO on the color filters 333. Then, the domain defining projections 336 and the auxiliary projections 336*a* are formed on the common electrode 334, and then the surfaces of the common electrode 334, the projections 336, and the auxiliary projections 336*a* are covered with the alignment film 334 formed of polyimide. Accordingly, the opposing substrate can be completed.

Subsequently, the opposing substrate on which the domain defining projections are provided and the TFT substrate formed in the above manner are stuck together, and then the liquid crystal material is sealed between both substrates. Accordingly, the liquid crystal display device according to the sixteenth embodiment can be completed.

In the above manufacturing method, the projections 336 and the auxiliary projections 336*a* are formed of photoresist.

But they are not limited to the above. For example, the projections 336 and the auxiliary projections 336a may be formed of dielectric material except for the photoresist.

As described above, according to the liquid crystal display device of the present invention, the domain defining projections are provided on one substrate and the slits are formed on the electrode of the other substrate, and also the pre-tilt angle revealing process is applied to the alignment film on the other substrate in the area in which the alignment of the liquid crystal molecules becomes unstable by the lateral electric field from the bus line. Therefore, the alignment failure due to the lateral electric field from the bus line can be avoided, and the large aperture ratio, the good viewing angle characteristic, and the good picture quality can be achieved.

Seventeenth Embodiment

Figure 52:
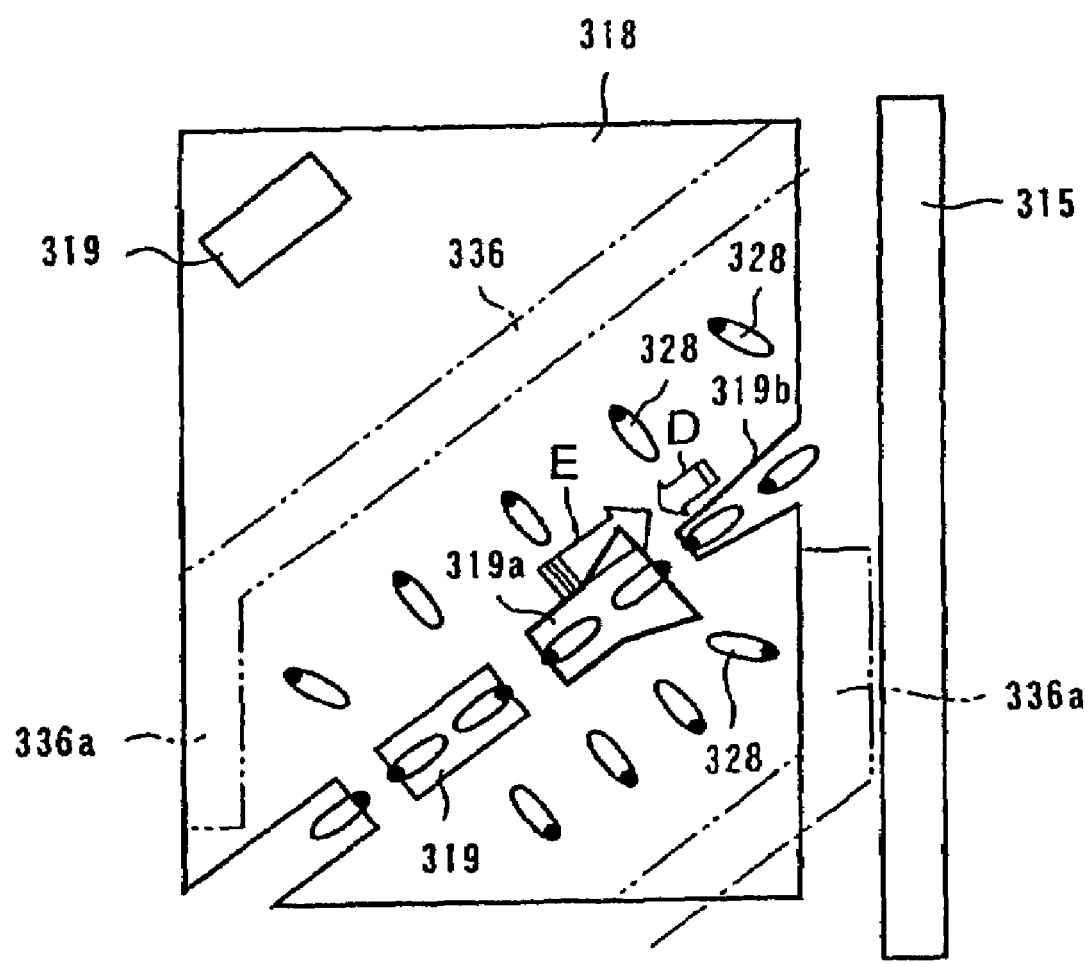
FIG. 52 is a plan view showing a liquid crystal display device according to a seventeenth embodiment of the present invention.

FIG. 52 is a plan view showing a liquid crystal display device according to a seventeenth embodiment of the present invention. A difference of the seventeenth embodiment from the sixteenth embodiment is that the slits formed in the pixel electrode have a different shape, and thus the explanation of portions overlapped with the sixteenth embodiment will be omitted. Also, in FIG. 52, the case is shown where the auxiliary projections 336a are arranged at the positions deviated to the drain bus line 315 side of the adjacent pixel.

In the seventeenth embodiment, as shown in FIG. 52, the shape of the slit 319b which is formed in the pixel electrode 318 and is closest to the adjacent pixel (i.e., the slit whose end portion on the adjacent pixel side is opened) has a taper shape in which a width of the end portion on the adjacent pixel side (referred to as the rear end side hereinafter) is wide and a width of the end portion opposite to the adjacent pixel (referred to as the top end side hereinafter) is narrow. Also, the slit 319 that is adjacent to the slit 319b, i.e., the slit 319a whose rear end side is closed and which is closest to the adjacent pixel, has a shape having a large width on the rear end side. That is, in the seventeenth embodiment, a width of the top end side of the slit 319b is set wider than that of the rear end side of the slit 319a.

When the voltage is applied between the pixel electrode 318 and the common electrode 334, as shown in FIG. 52, the liquid crystal molecules 328 on the inside of the slit 319b are tilted toward the direction indicated by an arrow D in FIG. 52. In contrast, the liquid crystal molecules 328 on the rear end side of the slit 319a are tilted toward the direction indicated by an arrow E in FIG. 52. At this time, since the width of the slit 319a on the rear end side is larger than that of the slit 319b on the top end side and also the number of the liquid crystal molecules 328 on the rear end side of the slit 319a is larger than that of the liquid crystal molecules 328 on the top end side of the slit 319b, the liquid crystal molecules 328 on the rear end side of the slit 319a are aligned in the predetermined direction (direction indicated by an arrow E). Also, the liquid crystal molecules in the neighborhood of the slit 319a are also affected by the liquid crystal molecules 328 on the inside of the slit 319a and then aligned in the predetermined direction. Therefore, the alignment failure can be avoided.

In the seventeenth embodiment, as described above, it is featured that the slit 319b and the slit 319a that are close to the adjacent pixel are formed like a taper shape. If the pre-tilt angle revealing process is applied to the predetermined portion of the alignment film, like the sixteenth embodiment, in addition to that the slit 319b and the slit 319a are formed like a taper shape, the alignment failure due to the lateral electric field from the drain bus line 315 of the adjacent pixel can be prevented without fail.

Besides, in the sixteenth and seventeenth embodiments, the slits are formed in the pixel electrode on the TFT substrate side and the domain defining projections and the auxiliary projections are provided on the opposing substrate side. But the present invention is not limited to the above. For example, the present invention may be applied to the liquid crystal display device in which the domain defining projections and the auxiliary projections are provided on the pixel electrode on the TFT substrate side and the slits are formed in the common pixel electrode on the opposing substrate side.

According to the liquid crystal display device of the present invention, the domain defining projections are provided on one substrate and also the slits are formed in the electrode on the other substrate, and the width of the end portion of the first slit closest to the bus line of the adjacent pixel on the opposite side to the bus line is set smaller than the width of the end portion of the second slit adjacent to the first slit on the bus line side. Therefore, the alignment failure due to the lateral electric field from the bus line of the adjacent pixel can be avoided, and the large aperture ratio, the good viewing angle characteristic, and the good picture quality can be achieved.

Eighteenth Embodiment

An eighteenth embodiment of the present invention will be explained hereunder.

In Patent Application Publication (KOKAI) Hei 11-84414, it has been proposed that the distribution of the dielectric constant of the resin is arranged symmetrically by changing gradually. However, there is no disclosure about the optimum combination with the projections and the slits.

Figure 53:
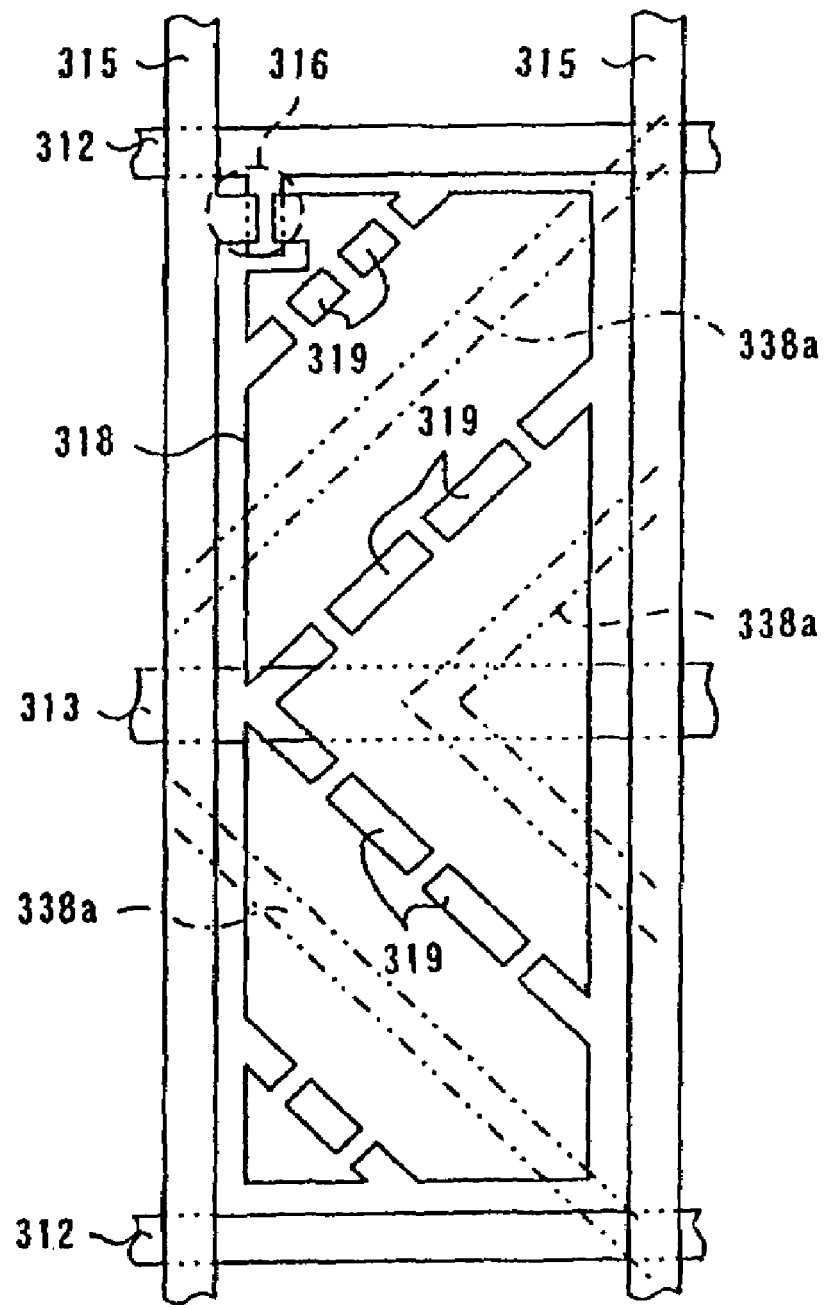
FIG. 53 is a plan view showing a liquid crystal display device according to an eighteenth embodiment of the present invention.
Figure 54:
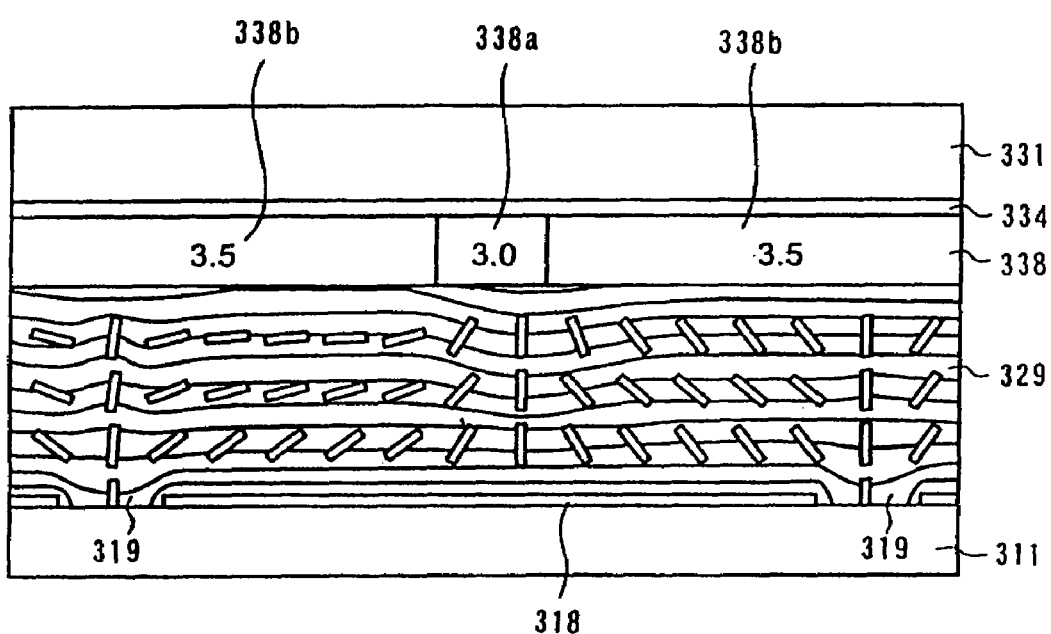
FIG. 54 is a schematic sectional view showing the liquid crystal display device according to the eighteenth embodiment of the present invention.

FIG. 53 is a plan view showing a liquid crystal display device according to an eighteenth embodiment of the present invention, and FIG. 54 is a schematic sectional view showing the liquid crystal display device according to the eighteenth embodiment. In this case, in FIG. 53 and FIG. 54, the same references are affixed to the same constituent elements as the sixteenth embodiment. Also, in FIG. 54, illustration of the insulating film and the alignment film on the TFT substrate side and the black matrix, the color filter, the alignment film, etc. on the opposing substrate side is omitted.

Like the sixteenth embodiment, the gate bus line 312, the drain bus line 315, the TFT 316, the pixel electrode 318 and the vertical alignment film are formed on the TFT substrate 311 side. Also, the domain defining slits 319 are formed in the pixel electrode 318. As shown in FIG. 53, these domain defining slits 319 are arranged such that they are aligned on a straight line extending in the oblique direction and are positioned symmetrically in one pixel electrode 318.

In contrast, the black matrix, the color filter, and the common electrode 334 are formed on the opposing substrate side, and the dielectric film 338 of about 2 to 3 μm thickness is formed under the common electrode 334. The dielectric film 338 consists of a low dielectric constant portion 338a and a high dielectric constant portion 338b. The low dielectric constant portion 338a is arranged in parallel with the slit 319 in the middle between the domain defining slits 319 on the TFT substrate 311 side. Also, the high dielectric constant portion 338b is arranged in the remaining area (containing the portion opposing to the slit 319). Then, the relative dielectric constant of the low dielectric constant portion 338a is 3.0, for example, and the relative dielectric constant of the high dielectric constant portion 338b is 3.5, for example.

As a method of forming the dielectric film 338 having the portions whose relative dielectric constant is different mutually, following methods may be considered.

As a first method, there is a method of patterning the substances having different relative dielectric constant by the lithography. More particularly, the high dielectric constant portion 338b is formed by forming the SiN film by the CVD method and then patterning the SiN film by the photolithography. Then, the photoresist is coated as material of the low dielectric constant portion 338a, and then the resist film coated on the high dielectric constant portion 338b is removed via the exposing and developing steps. Accordingly, the dielectric film 338 having the low dielectric constant portion 338a and the high dielectric constant portion 338b is formed. In this case, the relative dielectric constant of the SiN is about 7 and the relative dielectric constant of the resist is about 3.

As a second method, there is a method of changing partially the relative dielectric constant of the dielectric film by irradiating the light onto the dielectric film. For example, the dielectric film 338 is formed by coating polyvinyl cinnamate or polyimide having the photoreaction group, etc. on the common electrode 334. In the case of polyvinyl cinnamate, the bridge reaction is accelerated by irradiating the light and thus the relative dielectric constant of the light-irradiated portion is enhanced. In contrast, in the case of material that is split by the light such as polyimide, a molecular weight of the light-irradiated portion is reduced and thus the dielectric constant is lowered. As the material whose dielectric constant is changed by the light irradiation, there are acrylic resin (methacrylate), and others.

Figure 55:
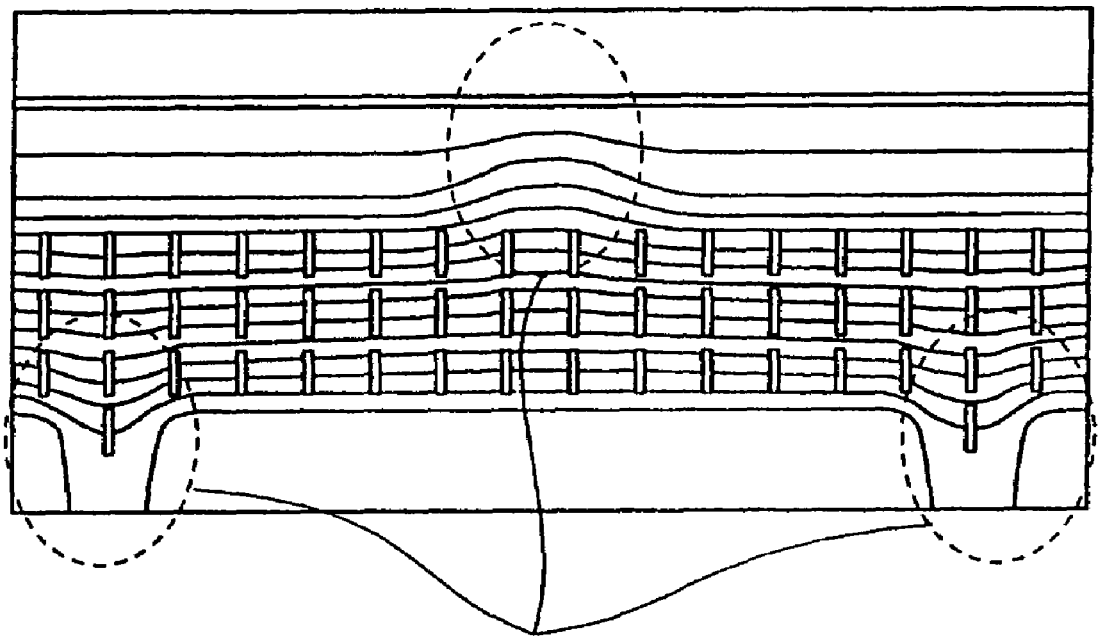
FIG. 55 is a view showing equipotential lines when a voltage is applied between a pixel electrode and a common electrode, in the eighteenth embodiment of the present invention.

FIG. 55 is a view showing equipotential lines when the voltage is applied between the pixel electrode and the common electrode. As shown in FIG. 55, the equipotential lines are pushed out to the outside from the liquid crystal layer in the portion of the slit 319 of the pixel electrode 318 and the low dielectric constant portion 338a in the dielectric film 338 (portion encircled by a broken line in FIG. 55). Because the liquid crystal molecules having the negative dielectric anisotropy tend to be aligned along the equipotential lines, as shown in FIG. 54, the alignment direction of the liquid crystal molecules is different respectively on both sides of the slit 319 and the low dielectric constant portion 338a, whereby alignment division (multi domain) can be attained.

In the eighteenth embodiment, since the alignment division (multi domain) can be attained by the dielectric film 338 having the low dielectric constant portion 338a and the high dielectric constant portion 338b in place of the domain defining projections, the aperture ratio can be improved and the liquid crystal display device which is bright and has high resolution can be implemented. Also, the portions having the different dielectric constant can be relatively easily formed by the photolithography or the light irradiation.

Figure 56:
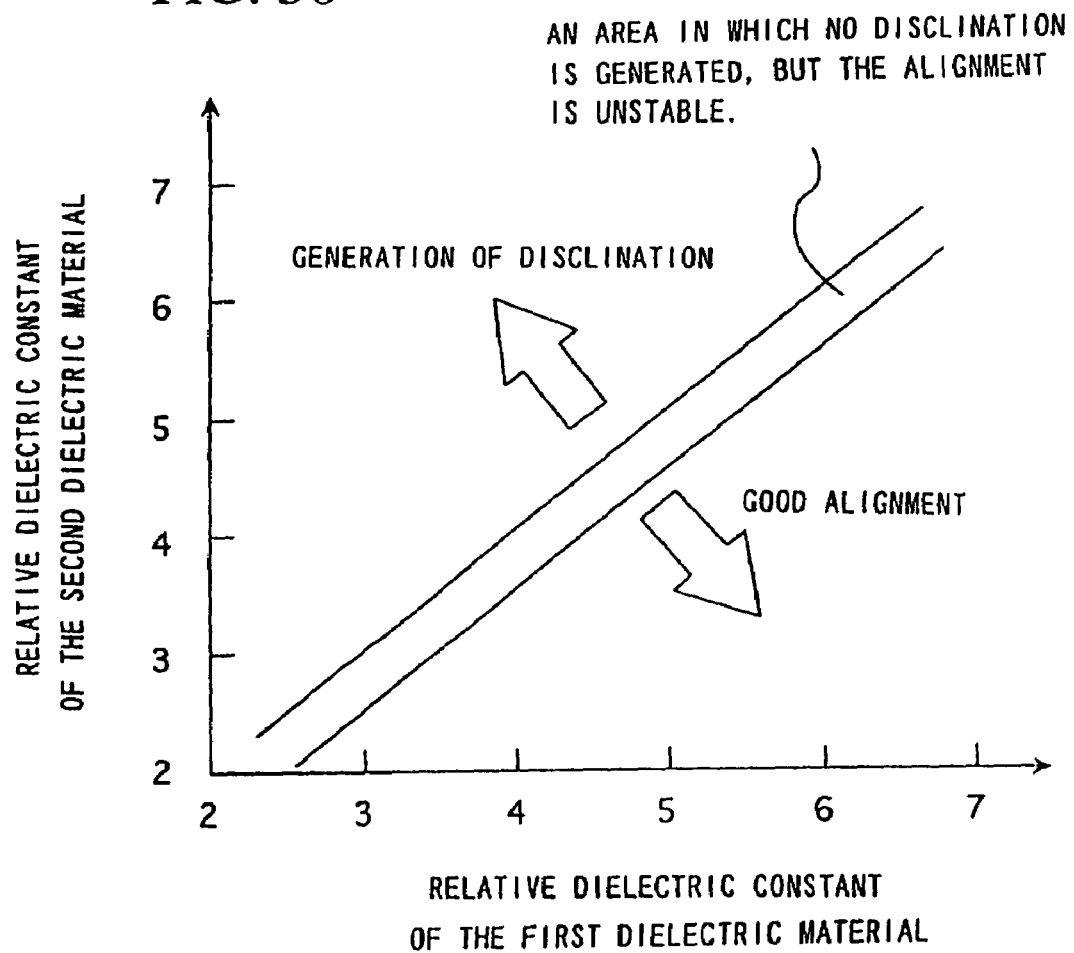
FIG. 56 is a graph showing a result to check whether or not disclination is generated after a dielectric film is formed by using two type dielectric materials.

FIG. 56 is a graph showing the result to check whether or not disclination is generated after the dielectric film 338 is formed by using two type dielectric materials. In FIG. 56, dielectric material that is arranged at the positions opposing to the slits is used as the first dielectric material, and dielectric material that is arranged in the middle of the slits is used as the second dielectric material.

As shown in FIG. 56, the relative dielectric constant of the second dielectric material is lower than that of the first dielectric material. If difference of relative dielectric constant between them is less than 0.5, no disclination is generated, but the area which has the unstable alignment state is generated.

In addition, if the relative dielectric constant of the second dielectric material is lower than that of the first dielectric material by more than 0.5, the disclination is not generated and the good display quality can be derived. If the relative dielectric constant of the second dielectric material is equal to or higher than that of the first dielectric material, the disclination is generated.

Figure 57:
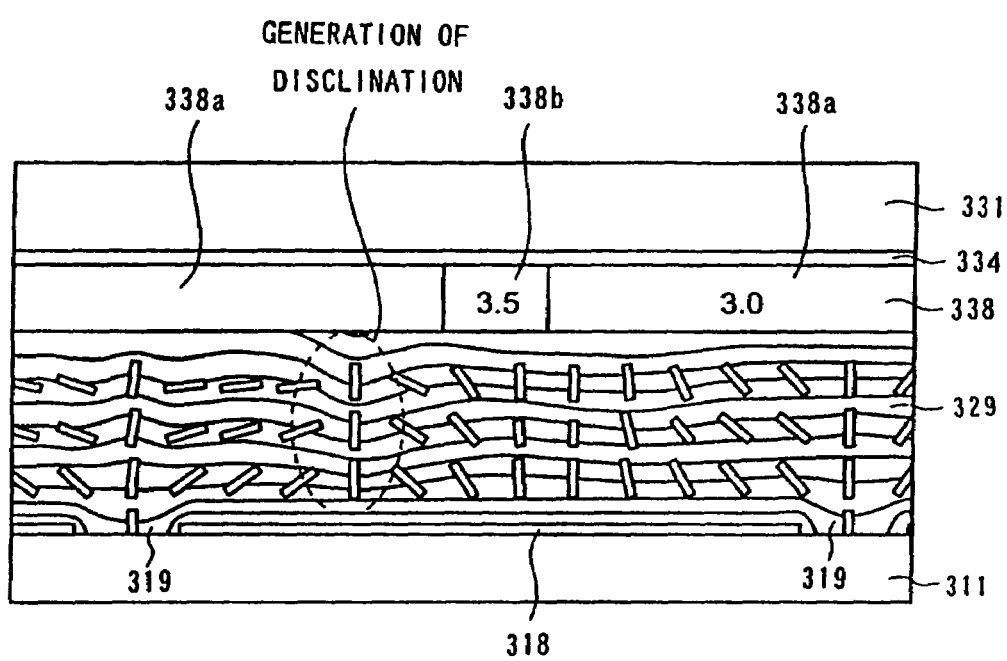
FIG. 57 is a view showing a problem caused when high dielectric portions are arranged in the center between slit rows and low dielectric portions are arranged at portions opposing to the slits.

In case the high dielectric constant portion 338b is arranged in the middle of the slits 319 and also the low dielectric constant portion 338a is arranged in the area opposing to the slit 319, as shown in FIG. 57, the disclination is generated as the singular point of the alignment state in the indefinite positions from the edge of the high dielectric constant portion 338b to the slit 319 (e.g., position encircled by a broken line in FIG. 57). Thus, there are caused the problems such that the display luminance is dark, the response is slow, etc. Accordingly, the low dielectric constant portion 338a must be arranged in the middle of the slits 319, the high dielectric constant portion 338b must be arranged in the position opposing to the slit 319, and the difference in the relative dielectric constant between the low dielectric constant portion 338a and the high dielectric constant portion 338b must be set to more than 0.5.

Figure 58:
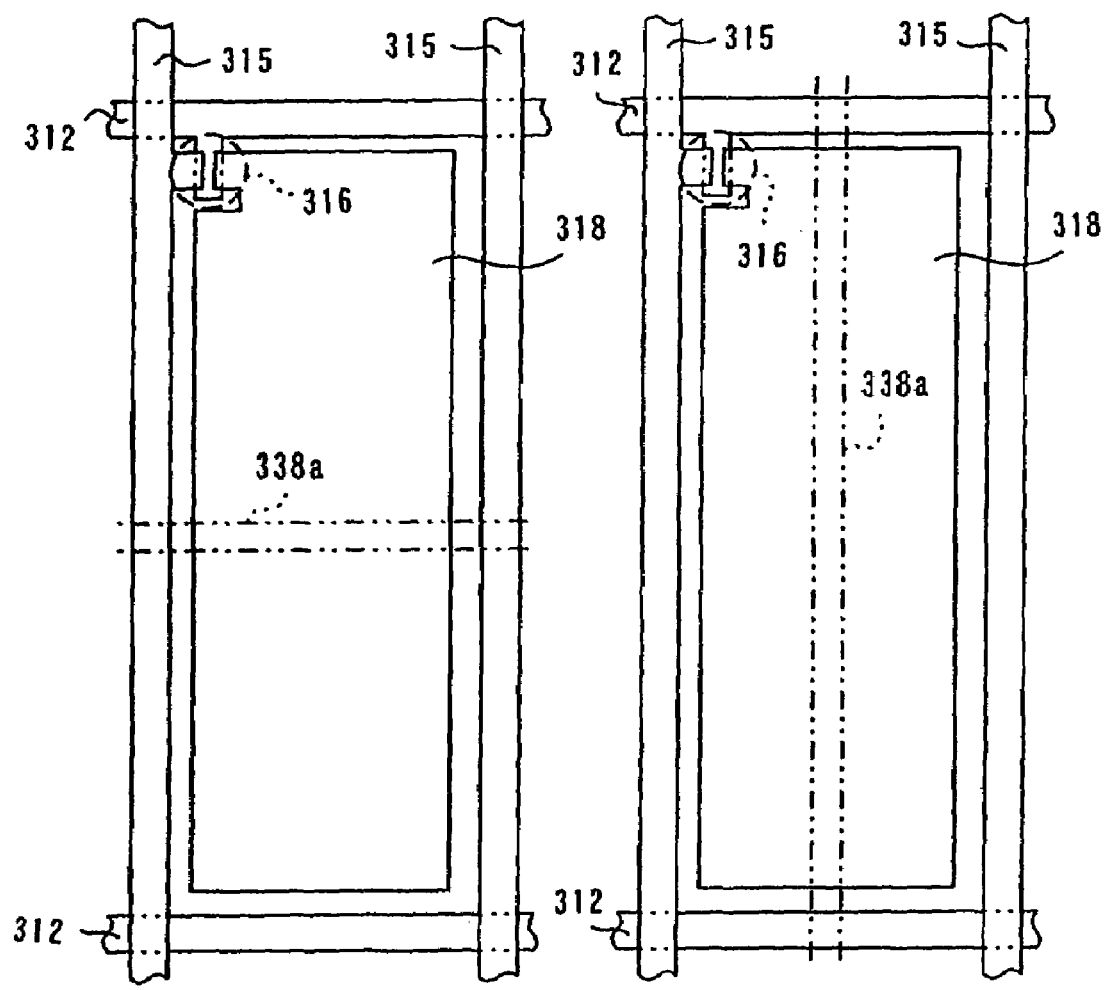
FIGS. 58A and 58B are views showing a variation #1 of the eighteenth embodiment of the present invention.
Figure 59:
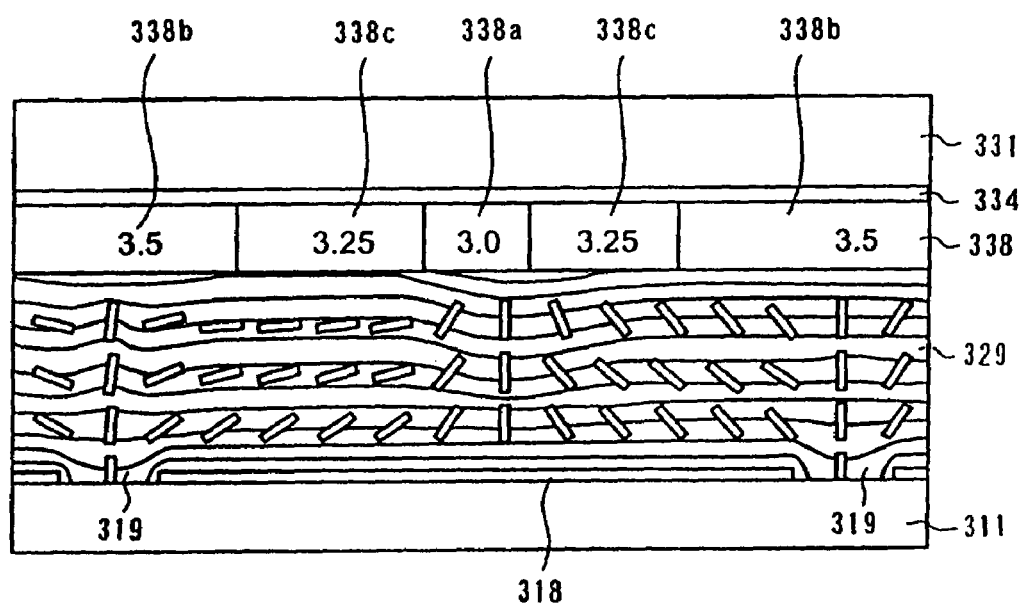
FIG. 59 is a view showing a variation #2 of the eighteenth embodiment of the present invention.

FIGS. 58A and 58B and FIG. 59 show a variation of the eighteenth embodiment respectively. FIG. 58A shows an example in which the low dielectric constant portion 338a is arranged in parallel with the gate bus line 312 in the middle of the pixel. FIG. 58B shows an example in which the low dielectric constant portion 338a is arranged in parallel with the drain bus line 315 in the middle of the pixel. In both cases, the dielectric film is formed on the opposing substrate side and the difference in the relative dielectric constant between the portion with the high dielectric constant and the portion with the low dielectric constant is set to more than 0.5. Accordingly, like the eighteenth embodiment, the disclination can be prevented.

FIG. 59 shows an example in which portions 338c with the middle dielectric constant (relative dielectric constant is 3.25) are arranged between the low dielectric constant portion 338a (relative dielectric constant is 3) arranged in the middle of the slits 319 and the high dielectric constant portion 338b (relative dielectric constant is 3.5) arranged to oppose to the slits. In this case, the similar effect to the above can be achieved.

In the above embodiments, the case is explained where the slits are formed in the pixel electrode on the TFT substrate side and the dielectric film having the portions with the different relative dielectric constant is formed on the opposing substrate side. However, if the dielectric film is formed on the TFT substrate side and the domain defining slits or projections are provided on the common electrode on the opposing substrate side, the same effect as the above embodiments can be obtained. Also, the dielectric film having the portions with the different relative dielectric constant may be formed on both the TFT substrate and the opposing substrate. In this case, the portion of the dielectric film with the low dielectric constant on the opposing substrate side is arranged so as to oppose to the portion of the dielectric film with the high dielectric constant on the TFT substrate side, and also the portion of the dielectric film with the high dielectric constant on the opposing substrate side is arranged so as to oppose to the portion of the dielectric film with the low dielectric constant on the TFT substrate side.

According to the liquid crystal display device of the present invention, since the domain defining portions are formed on one substrate and the dielectric film having the portion with the high dielectric constant and the portion with the low dielectric constant is formed on the other substrate, the alignment division (multi domains) can be attained by the domain defining portions and the dielectric film. Therefore, the large aperture ratio can be achieved and the good viewing angle characteristic and the good picture quality can be obtained.

What is claimed is:

1. A liquid crystal display device comprising:
a first substrate and a second substrate arranged in parallel with each other at a distance;
a liquid crystal layer formed by filling liquid crystal material having negative dielectric anisotropy between the first substrate and the second substrate;
a first electrode and a second electrode formed on opposing surfaces of the first substrate and the second substrate respectively to define a pixel by at least one of them;
an alignment film formed on at least one of the first substrate and the second substrate and having an alignment defining force to align the liquid crystal molecules of the liquid crystal layer perpendicularly to the film surface;
projections formed on the opposing surface of the first electrode;
a first domain defining means provided on the opposing surface of the first electrode and having a pattern elongated along one direction in at least a local area within a substrate surface, and for tilting the liquid crystal molecules in a neighborhood of an edge of the first domain defining means to such a direction that end portions positioned far from the first electrode go away from the first domain defining means when a voltage is applied between the first electrode and the second electrode; and
a second domain defining means provided on the opposing surface of the second electrode and arranged in parallel with or to be overlapped with the first domain defining means in at least a local area within the substrate surface when viewed along a normal direction of the substrate, and for tilting the liquid crystal molecules on an inside of the second domain defining means to a direction that is substantially parallel with a length direction of the second domain defining means.

2. A liquid crystal display device according to claim 1, wherein the first domain defining means contains projections formed of dielectric material formed on the first electrode or slits formed in the first electrode, and
the second domain defining means contains projections formed on the opposing surface of the second substrate and having a conductive surface, areas of the alignment film which are formed on the opposing surface of the second substrate and in which an alignment defining force is destroyed or weakened, or recess patterns on the surface of the dielectric film formed on the opposing surface of the second substrate.

3. A liquid crystal display device according to claim 1, further comprising:
a third domain defining means formed on the opposing surface of the first substrate to extend in a direction orthogonally intersecting with the first domain defining means in at least a local area within the substrate surface, and for tilting the liquid crystal molecules of the liquid crystal layer in a neighborhood of an edge of the third domain defining means to such a direction that end portions positioned far from the first electrode go away from the third domain defining means when the voltage is applied between the first electrode and the second electrode.

* * * * *